(12) United States Patent
Ashida et al.

(10) Patent No.: US 7,643,072 B2
(45) Date of Patent: Jan. 5, 2010

(54) SIGNAL PROCESSING METHOD FOR IMAGE CAPTURING APPARATUS, AND IMAGE CAPTURING APPARATUS INCLUDING CALCULATING IMAGE TRANSFER EFFICIENCY

(75) Inventors: Tetsuro Ashida, Asaka (JP); Kousuke Irie, Asaka (JP); Hitoshi Yamashita, Asaka (JP); Tooru Ueda, Asaka (JP); Kenkichi Hayashi, Asaka (JP); Takeshi Miyashita, Asaka (JP)

(73) Assignee: Fujifilm Corporation, Tokyo (JP)

( * ) Notice: Subject to any disclaimer, the term of this patent is extended or adjusted under 35 U.S.C. 154(b) by 483 days.

(21) Appl. No.: 11/488,688

(22) Filed: Jul. 19, 2006

(65) Prior Publication Data

US 2007/0040916 A1   Feb. 22, 2007

(30) Foreign Application Priority Data

Aug. 16, 2005  (JP)  .............................. 2005-235889
Aug. 16, 2005  (JP)  .............................. 2005-235890

(51) Int. Cl.
*H04N 5/235*  (2006.01)
*H04N 9/64*  (2006.01)
*H04N 3/15*  (2006.01)
*H04N 5/335*  (2006.01)
*H03K 23/46*  (2006.01)

(52) U.S. Cl. ..................... 348/243; 348/230.1; 348/250; 348/314; 377/63

(58) Field of Classification Search ............. 348/229.1, 348/230.1, 231.3, 231.6, 243, 242, 249, 250, 348/311, 314; 377/61–63
See application file for complete search history.

(56) References Cited

U.S. PATENT DOCUMENTS 4,224,585 A * 9/1980 Tanaka ........................ 333/165
5,504,527 A * 4/1996 Philbrick et al. ............. 348/313
5,515,102 A * 5/1996 Pearsall et al. .............. 348/241

(Continued)

FOREIGN PATENT DOCUMENTS

JP    05268641 A    * 10/1993

(Continued)

OTHER PUBLICATIONS

Levine, P.A.; "Measurement of CCD Tranfer Efficiency by Use of Feedback to Increase the Effective Number of Transfers"; Apr. 1973; IEEE Journal or Solid-State Circuits; vol. 8, Issue 2; pp. 104-108.*

*Primary Examiner*—John M Villecco
(74) *Attorney, Agent, or Firm*—Birch, Stewart, Kolasch & Birch, LLP

(57) ABSTRACT

The present invention provides an image capturing apparatus which enables a desired image quality to be maintained regardless of transfer efficiency of a CCD image capturing element. R, G and B signals (CCD-RAW data) are acquired from the CCD image capturing element. In addition, various information, namely transfer efficiency of the CCD image capturing element, camera sensitivity upon photography, drive frequency of the CCD image capturing element, WB gains of the acquired R, G and B signals, pixel count, internal temperature of camera or temperature of the CCD image capturing element, and CCD color filter array of the CCD image capturing element are acquired. Signal processing on the acquired R, G and B signals is changed according to the acquired information in order to suppress image quality deterioration due to transfer efficiency degradation.

17 Claims, 49 Drawing Sheets

PRE-CHANGE
$$\begin{bmatrix} A11 & A12 & A13 \\ A21 & A22 & A23 \\ A31 & A32 & A33 \end{bmatrix}$$

POST-CHANGE
$$\rightarrow \begin{bmatrix} B11 & B12 & B13 \\ B21 & B22 & B23 \\ B31 & B32 & B33 \end{bmatrix}$$

PRE-CHANGE
$$\begin{bmatrix} A11 & A12 & A13 \\ A21 & A22 & A23 \\ A31 & A32 & A33 \end{bmatrix}$$

POST-CHANGE
$$\rightarrow \begin{bmatrix} A11 & A12+a' & A13-a' \\ A21 & A22 & A23 \\ A31-c' & A32+c' & A33 \end{bmatrix}$$

U.S. PATENT DOCUMENTS

| | | | |
|---|---|---|---|
| 6,803,960 B2 * | 10/2004 | Shepherd et al. | 348/243 |
| 2006/0256218 A1 * | 11/2006 | Kobayashi | 348/294 |
| 2008/0002037 A1 * | 1/2008 | Ueda | 348/223.1 |

FOREIGN PATENT DOCUMENTS

| | | | |
|---|---|---|---|
| JP | 7-146139 A | | 6/1995 |
| JP | 10261087 A | * | 9/1998 |
| JP | 2004-295709 A | | 10/2004 |

\* cited by examiner

FIG.5A

PRE-CHANGE $$\begin{bmatrix} A11 & A12 & A13 \\ A21 & A22 & A23 \\ A31 & A32 & A33 \end{bmatrix}$$

POST-CHANGE $$\rightarrow \begin{bmatrix} B11 & B12 & B13 \\ B21 & B22 & B23 \\ B31 & B32 & B33 \end{bmatrix}$$

FIG.5B

PRE-CHANGE $$\begin{bmatrix} A11 & A12 & A13 \\ A21 & A22 & A23 \\ A31 & A32 & A33 \end{bmatrix}$$

POST-CHANGE $$\rightarrow \begin{bmatrix} A11 & A12+a' & A13-a' \\ A21 & A22 & A23 \\ A31-c' & A32+c' & A33 \end{bmatrix}$$

EXAMPLE OF LPF CHARACTERISTIC

SIGNAL PROCESSING METHOD FOR IMAGE CAPTURING APPARATUS, AND IMAGE CAPTURING APPARATUS INCLUDING CALCULATING IMAGE TRANSFER EFFICIENCY

BACKGROUND OF THE INVENTION

1. Field of the Invention

The present invention relates to a signal processing method for an image capturing apparatus, and an image capturing apparatus. In particular, the present invention relates to a technique for remedying problems due to insufficient transfer efficiency of CCD (charge coupled devices) image capturing elements.

2. Description of the Related Art

Conventionally, image capturing apparatuses using CCD image capturing elements, such as electronic cameras, digital cameras and camera-equipped mobile phones, have been developed. When performing image capturing using such an image capturing apparatus, signal charges are accumulated in each pixel of a CCD image capturing element according to exposure time. Signal charges accumulated in each pixel are transferred from a vertical transfer path to a horizontal transfer path, and are outputted to an image processing circuit.

Signal charges accumulated in each pixel are sequentially transferred via potential wells respectively formed at each transfer element of each transfer path. At this point, the signal charges are not completely transferred to the next transfer element, and a small portion is left behind. The ratio of the charges transferred to the next well to the charges that were in the original well is called transfer efficiency. When the transfer efficiency is reduced, crosstalk between adjacent pixels increase, and various problems such as image deterioration (deterioration of color reproducibility or resolution) occur.

In consideration of the above problems, for instance, a signal correction apparatus for distance measuring CCDs, arranged so as to correct image signal distortion due to transfer errors in order to eliminate inadequate distance measurement, is disclosed in Japanese Patent Application Laid-Open No. 7-146139. In addition, a signal processing method in which a sum of vertical transfer remaining amounts of image sensors lined in a TDI (time delay integration) stage direction is obtained in advance from the vertical transfer efficiency of a TDI image sensor, the sum is then subtracted from an output of the TDI image sensor upon performing image capturing of a sample by the TDI image sensor, and the output after subtraction is used to perform image processing, is disclosed in Japanese Patent Application Laid-Open No. 2004-295709.

SUMMARY OF THE INVENTION

However, since the invention described in Japanese Patent Application Laid-Open No. 7-146139 uses distance measuring CCDs, and deterioration of the transfer efficiency of distance measuring CCDs affects distance measurement, the invention is intended to correct distance measurement results but not to remedy image deterioration.

In addition, the invention described in Japanese Patent Application Laid-Open No. 2004-295709 is limited to TDI image sensors, and is particularly focused to solve the problem of transfer efficiency deterioration in vertical transfer paths. To do so, the invention calculates a remaining amount of vertical transfer and subtracts the remaining amount from sensor output. In other words, the invention described in Japanese Patent Application Laid-Open No. 2004-295709 is intended to obtain high-contrast images with no remaining amount of vertical transfer, and is not intended to obtain images with high color reproducibility which are not affected by fluctuations in transfer efficiencies. In addition, the invention requires an enormous amount of computation to calculate the remaining amount of vertical transfer.

A first object of the present invention is to provide a signal processing method for an image capturing apparatus, and an image capturing apparatus which are capable of maintaining a desired image quality regardless of transfer efficiencies of image capturing elements.

A second object of the present invention is to provide a signal processing method for an image capturing apparatus, and an image capturing apparatus, which are capable of performing signal processing in accordance with transfer efficiencies of image capturing elements and obtaining an image of a desired quality.

In order to achieve the first object, a signal processing method for an image capturing apparatus according to the present invention comprises: an image signal acquisition step for acquiring image signals from an image capturing element; an information acquisition step for acquiring one or more pieces of information among: transfer efficiency of the image capturing element, sensitivity of a camera upon photography, a drive frequency of the image capturing element, a WB parameter related to white balance correction of the acquired image signal, a number of pixels of the acquired image signal, an internal temperature of the camera or the temperature of the image capturing element upon photography, a CCD color filter array of the image capturing element, wherein the information acquisition step acquires at least the transfer efficiency; and a signal processing step for performing signal processing on the acquired image signals, the signal processing step which changes signal processing according to the acquired information to suppress deterioration of image quality due to degradation of the transfer efficiency.

In other words, while poor transfer efficiency in image capturing elements causes problems such as deterioration in color reproducibility or resolution as compared to cases where the transfer efficiency is good, the invention according to a first aspect is arranged to change signal processing according to transfer efficiency and other information to maintain a desired image quality.

Since transfer efficiency decreases when the sensitivity of the camera is high, when the drive frequency is high, when the WB gain is significant, or when the temperature is low, it is preferable that image processing is changed in consideration of such information. In addition, since the likelihood of being affected by transfer efficiency increases when a large number of pixels are involved as compared to cases with fewer pixels, and the pixels of colors mixed by a CCD color filter array differ during deterioration of transfer efficiency, it is preferable that image processing is changed in consideration of such information as well.

An image capturing apparatus according to the present invention comprises: a photographic optical system; an image capturing element onto which a subject image is formed by the photographic optical system; an image acquisition device for acquiring image signals from the image capturing element; an information acquisition device for acquiring one or more pieces of information among: transfer efficiency of the image capturing element, sensitivity of a camera upon photography, a drive frequency of the image capturing element, a WB parameter related to white balance correction of the acquired image signal, a number of pixels of the acquired image signal, an interior temperature of the camera or the temperature of the image capturing element upon photography, a CCD color filter array of the image capturing element, wherein the information acquisition device acquires at least the transfer efficiency; and a signal processing device for performing signal processing on the acquired image signals, the signal processing device which changes signal processing according to the acquired information to suppress deterioration of image quality due to degradation of the transfer efficiency.

In the image capturing apparatus according to the present invention, the information acquisition device may comprise a storage device for storing transfer efficiencies measured in advance, and a readout device for reading out the transfer efficiencies from the storage device. In addition, the signal processing device may comprise a matrix circuit for performing color correction, and change a matrix coefficient of the matrix circuit according to one or more pieces of acquired information among the transfer efficiency, the camera sensitivity, the drive frequency, the WB parameter, the number of pixels, the temperature and the CCD color filter array, wherein the information at least includes the transfer efficiency. Furthermore, the matrix circuit may be at least one of a linear matrix circuit and a color difference matrix circuit.

In order to achieve the second object, a signal processing method for an image capturing apparatus according to another aspect of the present invention comprises: an acquisition step for acquiring an image signal from an image capturing element; a transfer efficiency calculation step for calculating transfer efficiency of the image capturing element; and a processing step for processing the acquired image signal based on the calculated transfer efficiency.

In other words, while poor transfer efficiency in image capturing elements causes problems such as deteriorations in color reproducibility or resolution as compared to good transfer efficiency, the present invention is arranged to calculate transfer efficiency of an image capturing element, and process image signals based on the calculated transfer efficiency to acquire images with a desired image quality.

In addition, the signal processing method for the image capturing apparatus may further comprise a storage and retention step for storing and retaining the transfer efficiency calculated in advance, where the stored and retained transfer efficiency is read out and utilized upon processing of the acquired image signal.

The transfer efficiency calculation step performs calculations based on signals of pixels in an effective pixel region and signals of pixels in an optical black region of the image capturing element. In addition, the transfer efficiency calculation step according to the other aspect performs calculations based on signals of each single pixel on either side (in a horizontal direction) of a vertical boundary of the effective pixel region and the optical black region of the image capturing element, or on signals of a plurality of pixels in vertical directions of each single pixel on either side of the vertical boundary of the image capturing element. When using signals from a plurality of pixels of the effective pixel region-side and a plurality of pixels of the optical black region-side, the signals of each pixel will be averaged, enabling calculation of transfer efficiency at high accuracy.

In addition, the signal processing method for the image capturing apparatus may further comprise a selection step for selecting a transfer efficiency calculation mode, wherein the transfer efficiency calculation step performs transfer efficiency calculations based on image signals acquired from the image capturing element during photography in which the transfer efficiency calculation mode is selected. This enables separation of photography performed to calculate transfer efficiency from normal photography, and allows transfer efficiency calculations to be performed at any given point in time.

When performing photography to calculate transfer efficiency, a monochromatic chart is preferably photographed under predetermined photographing conditions.

Moreover, the signal processing method for an image capturing apparatus may further comprise a detection step for detecting changes in photography setting conditions related to transfer efficiency, wherein when a change in the photography setting conditions is detected, the transfer efficiency calculation step acquires image signals from the image capturing element and calculates transfer efficiency based on the acquired image signals before commencement of actual photography. In other words, while transfer efficiency changes according to various conditions such as camera sensitivity, CCD drive frequency, image capturing element temperature and the like, transfer efficiency calculations are newly performed when changes in such conditions are detected.

Furthermore, the signal processing method for an image capturing apparatus may further comprise a measurement step which measures elapsed time, wherein when the measured elapsed time exceeds a predetermined threshold, the transfer efficiency calculation step acquires image signals from the image capturing element and calculates transfer efficiency based on the acquired image signals before commencement of actual photography. In other words, since transfer efficiency changes according to various conditions as described above, and particularly since the temperature of an image capturing element will rise with the lapse of time, transfer efficiency calculations are newly performed when the elapsed time exceeds a predetermined threshold.

Additionally, the signal processing method for the image capturing apparatus may further comprise an automatic focus adjustment step which performs automatic focus adjustment prior to actual photography based on image signals from the image capturing element, wherein the transfer efficiency calculation step calculates transfer efficiency based on the image signals acquired from the image capturing element prior to conclusion of the focus adjustment in performing automatic focus adjustment. This enables transfer efficiencies appropriate for photography to be calculated every time actual photography is performed. Averaging of image signals of a predetermined region used for calculating transfer efficiency may be achieved by using image signals acquired prior to conclusion of the focus adjustment (image signals which are out of focus) when automatic focus adjustment is performed.

An image capturing apparatus according to another aspect of the present invention comprises: a photographic optical system; an image capturing element onto which a subject image is formed by the photographic optical system; an image acquisition device for acquiring image signals from the image capturing element; a transfer efficiency acquisition device which acquires transfer efficiency of the image capturing element; and a signal processing device which performs signal processing on the acquired image signals based on the acquired transfer efficiency.

The image capturing apparatus may further comprise a storage device which stores and retains transfer efficiency calculated in advance, wherein the transfer efficiency acquisition device reads out transfer efficiency from the storage device.

The image capturing apparatus may further comprise a transfer efficiency calculation device which calculates transfer efficiency of the image capturing element, wherein the transfer efficiency acquisition device acquires transfer efficiency from the transfer efficiency calculation device.

The transfer efficiency calculation device may perform calculations based on signals of pixels in an effective pixel region and signals of pixels in an optical black region of the image capturing element.

The transfer efficiency calculation device according to the other aspect may perform calculations based on signals of each single pixel on either side (in a horizontal direction) of a vertical boundary of the effective pixel region and the optical black region of the image capturing element, or on signals of a plurality of pixels in vertical directions of each single pixel on either side of the vertical boundary of the image capturing element.

The image capturing apparatus may further comprise a mode selection device which selects a transfer efficiency calculation mode, wherein the transfer efficiency calculation device performs transfer efficiency calculations based on image signals acquired from the image capturing element during photography in the transfer efficiency calculation mode selected by the mode selection device.

Moreover, the image capturing apparatus may further comprise a detection device which detects changes in photography setting conditions related to transfer efficiency, wherein when a change in the photography setting conditions is detected by the detection device, the transfer efficiency calculation device acquires image signals from the image capturing element and calculates transfer efficiency based on the acquired image signals before commencement of actual photography.

Furthermore, the image capturing apparatus may further comprise a measurement device which measures elapsed time, wherein when the measured elapsed time exceeds a predetermined threshold, the transfer efficiency calculation device acquires image signals from the image capturing element and calculates transfer efficiency based on the acquired image signals before commencement of actual photography.

Additionally, the image capturing apparatus may further comprise an automatic focus adjustment device which performs automatic focus adjustment prior to actual photography based on image signals from the image capturing element, wherein the transfer efficiency calculation device calculates transfer efficiency based on the image signals acquired from the image capturing element prior to conclusion of the focus adjustment in performing automatic focus adjustment.

The signal processing device may comprise a matrix circuit which performs color correction, and controls a matrix coefficient of the matrix circuit based on transfer efficiencies acquired by the transfer efficiency acquisition device.

Furthermore, the matrix circuit of the other aspect may be at least one of a linear matrix circuit and a color difference matrix circuit.

According to the present invention, deterioration of color reproducibility or resolution may be suppressed regardless of transfer efficiencies of image capturing elements, even when, for instance, transfer efficiencies decrease, and a desired image quality may be maintained. In addition, transfer efficiencies of image capturing elements may calculate to enable image processing corresponding to the transfer efficiencies to be performed on image signals acquired from the image capturing elements. This allows images of a desired image quality to be obtained regardless of transfer efficiency.

BRIEF DESCRIPTION OF THE DRAWINGS

FIGS. 5A and 5B are diagrams showing examples of changing a color correction matrix coefficient of a linear matrix circuit;

DETAILED DESCRIPTION OF THE PREFERRED EMBODIMENTS

Preferred embodiments of a signal processing method for an image capturing apparatus, and an image capturing apparatus according to the present invention will now be described with reference to the attached drawings.

While the following description will provide an example of an image capturing apparatus (digital camera), the present invention may also be applied to mobile phones equipped with image capturing apparatuses, personal data assistants (PDAs), or PC cameras and the like.

First Embodiment

Figure 1:
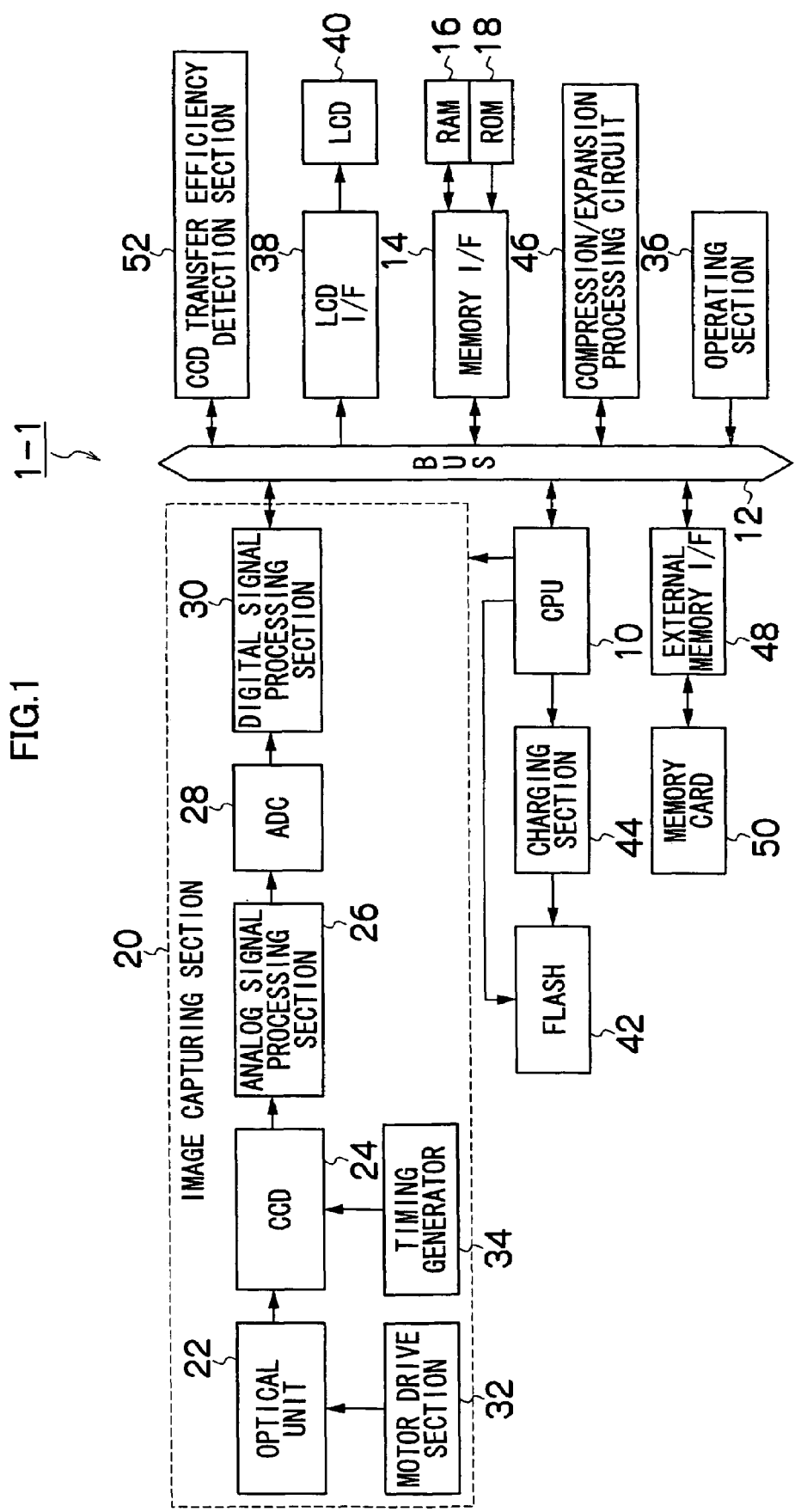
FIG. 1 is a block diagram showing a first embodiment of an image capturing apparatus according to the present invention.

FIG. 1 is a block diagram showing a first embodiment of an image capturing apparatus according to the present invention.

The image capturing apparatus 1-1 (hereinafter denoted to as camera 1-1) shown in FIG. 1 is a digital camera equipped with recording and playback functions for still images and moving images. A central processing unit (CPU) 10 exercises overall control of the operations of the entire camera. The CPU 10 functions both as a control device which controls the present camera system according to a predetermined program, and a processing device which performs various processing such as automatic exposure (AE), automatic focus adjustment (AF) and white balance (WB) adjustment.

A RAM (random access memory) 16 and a ROM (read only memory) 18 are connected to the CPU 10 via a bus 12 and a memory interface 14. The RAM 16 is used as a program deployment area and a work area for processing by CPU 10, and as a temporary storage area for image data. The ROM 18 stores various data required for programs and control executed by the CPU 10, as well as various constants/information or the like regarding the operation of the camera.

An image capturing section 20 comprises an optical unit 22 comprising a photographic lens and a diaphragm or the like, and a CCD image capturing element 24 (hereinafter simply referred to as "CCD") or the like. A focus lens or a diaphragm and the like of the optical unit 22 are driven via a motor drive section 32 according to AF instructions or AE instructions from the CPU 10.

Figure 2:
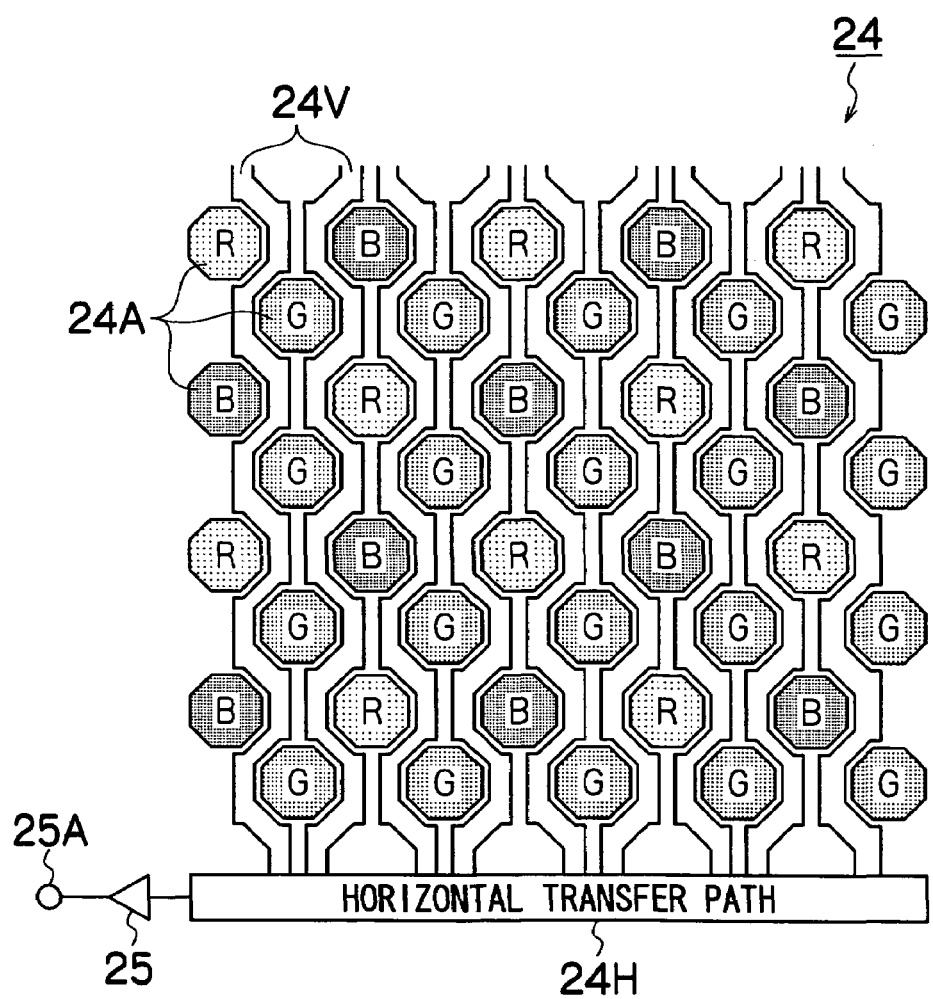
FIG. 2 is a diagram showing a configuration example of a CCD image capturing element.

As shown in FIG. 2, the CCD 24 is a CCD-type two-dimensional image capturing device (image sensor) in which a large number of light receiving elements (photodiodes) 24A are arranged in horizontal (row) and vertical (column) directions according to a constant arrangement cycle. The illustrated configuration is a pixel array called the honeycomb array, in which light receiving elements 24A are arranged so that the central points of the geometric shape thereof are displaced by one half of the pixel pitch (½ pitch) for every other pixel in both the row and column directions.

Each light receiving element 24A has an octagonal light receiving surface, and RGB primary color filters are arranged to correspond with each light receiving element 24A. As shown in FIG. 2, in the horizontal direction, a GGGG . . . row is arranged in the stage next to an RBRB . . . row, and a BRBR . . . row is arranged in the stage next to the GGGG . . . row, and so on. As for the arrangement pattern of the column direction, an RBRB . . . column, a GGGG . . . column and a BRBR . . . column are cyclically repeated.

A vertical transfer path (VCCD) 24V is formed to the right side (or left side) of each light receiving element 24A. The vertical transfer path 24V extends in a vertical direction in a zigzag-like serpentine pattern, staying in close proximity of each column of the light receiving elements 24A while avoiding the light receiving elements 24A. Although not shown, transfer electrodes necessary for 4-phase drive (φ1, φ2, φ3, φ4) are positioned on the vertical transfer path 24V. The transfer electrodes are provided so as to extend in a horizontal direction of FIG. 2 in a serpentine pattern, staying in close proximity of each row of the light receiving elements 24A while avoiding the apertures of the light receiving elements 24A.

Signal charges generated through photoelectric conversion at each light receiving element 24A are read out by a vertical transfer path 16V adjacent to the right side (or left side) of the light receiving elements 24A, and are transferred downwards (V direction) in FIG. 2 according to a transfer pulse.

In FIG. 2, a horizontal transfer path (HCCD) 24H which transfers in a horizontal direction signal charges transferred from the vertical transfer path 24V is provided at the lower end of the vertical transfer path 24V (most downstream-side of the vertical transfer path 24V).

The horizontal transfer path 24H is configured by 2-phase or 4-phase drive transfer CCDs, and the last stage (the leftmost stage in FIG. 2) of the horizontal transfer path 24H is connected to an output section 25. The output section 25 comprises an output amp, and performs charge detection of inputted signal charges and outputs the detected charges as a signal voltage to an output terminal 25A. In this manner, signals generated by each light receiving element 24A are outputted as dot-sequential signal columns. A signal outputted from the output terminal 25A will be a signal column of RGBGRGBG . . . .

Reverting now to FIG. 1, the CCD 24 comprises an electronic shutter function which controls a charge accumulation time (shutter speed) of each light receiving element. The CPU 10 controls the charge accumulation time of the CCD 24 via a timing generator 34.

CCD signals sequentially read out from the CCD 24 are applied to an analog signal processing section 26. The analog signal processing section 26 comprises a CDS circuit, an analog amp and the like, wherein the CDS circuit performs correlated double sampling processing on the CCD signals to be inputted, while the analog amp amplifies the CCD signals outputted by the CDS circuit using a photographic sensitivity setting gain applied by the CPU 10.

CCD signals analog-processed at the analog signal processing section 26 are applied to an A/D converter 28, where the signals are converted on a per-pixel basis to digital color image data (dot-sequential R, G and B signals).

The R, G, B signals are temporarily stored in the RAM 16 via a digital signal processing section 30. The R, G, B signals are inputted to the digital signal processing section 30 to undergo required signal processing. A detailed description of the signal processing performed at the digital signal processing section 30 will be provided later.

An operating section 36 of the camera 1-1 comprises: a shutter button; a mode switching lever for switching between a photography mode and a playback mode; a mode dial for selecting a photography mode (automatic photography mode, manual photography mode, continuous photography mode and the like); a menu button for displaying a menu screen on a display section (LCD) 40; a multi-function cross-shaped key for selecting a desired item from the menu screen; an OK button for finalizing a selected item or instructing execution of processing thereof; a BACK button for deleting a desired target such as a selected item or canceling instruction contents, or inputting an instruction to return to the previous operation status and the like. Output signals from the operating section 36 are inputted to the CPU 10 via the bus 12, and the CPU 10 causes appropriate processing for photography or playback and the like to be performed based on input signals from the operating section 36.

The camera 1-1 comprises a flash device 42 for illuminating a subject by a flash. Under flash instructions from the CPU 10, the flash device 42 receives power from a charging section 4 and emits flashlight.

Image data (luminance signal Y, color difference signals Cr and Cb) processed at the digital signal processing section 30 are applied to a compression/expansion processing circuit 46, which compresses the image data according to a predetermined compression format (for instance, JPEG method). The compressed image data is recorded onto a memory card 50 via an external memory interface 48.

The LCD 40 displays visual images (live views) during photography preparation using image signals applied via a LCD interface 38, and displays images recorded on the memory card 50 during playback mode.

Figure 3:
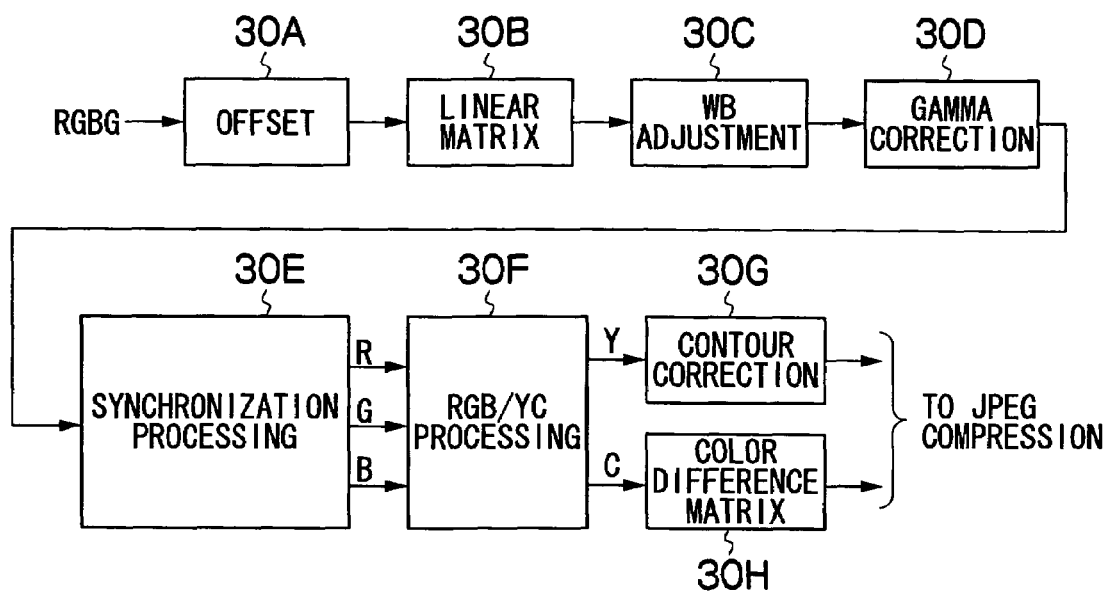
FIG. 3 is a block diagram showing a detailed circuit configuration of the digital signal processing section shown in FIG. 1.

FIG. 3 is a block diagram showing a detailed circuit configuration of the digital signal processing section 30 shown in FIG. 1.

As described earlier, R, G and B signals temporarily stored in the RAM 16 are applied in R, G, B dot-sequence to an offset processing circuit 30A of the digital signal processing section 30. Offset processing is performed on the R, G and B signals at the offset processing circuit 30A. R, G and B signals outputted from the offset processing circuit 30A (CCD-RAW data) are outputted to a linear matrix circuit 30B, which performs color tone correction processing for correcting the spectral characteristics of the CCD 24, and color correction processing according to the present invention.

In other words, the linear matrix circuit 30B performs matrix processing involving the R, G and B signals to be inputted and a 3 row×3 column color correction matrix coefficient (A11, A12, . . . , A33) to calculate color-compensated R, G and B signals.

A detailed description of the 3 row×3 column color correction matrix coefficient (A11, A12, . . . , A33) used in the matrix processing will be provided later.

The R, G, B signals are outputted from the linear matrix circuit 30B to a white balance (WB) adjustment circuit 30C. The WB adjustment circuit 30C performs white balance adjustment by respectively applying a white balance adjustment gain to the R, G and B signals. The R, G, B signals are outputted from the WB adjustment circuit 30C to a gamma correction circuit 30D, which performs gamma correction for correcting tones such as halftones. The gamma-corrected R, G, B signals are outputted to a synchronization processing circuit 30E.

The synchronization processing circuit 30E performs processing which involves interpolation of spatial deviations in the R, G, B signals due to the CCD color filter array (hereinafter simply referred to as "CCD array") of the single-plate CCD 24 to synchronously convert the R, G, B signals, and outputs the synchronized R, G, B signals to an RGB/YC conversion circuit 30F.

The RGB/YC conversion circuit 30F converts the R, G, B signals to a luminance signal Y and color difference signals Cr, Cb, and outputs the luminance signal Y to a contour correction circuit 30G and the color difference signals Cr, Cb to a color difference matrix circuit 30H. The contour correction circuit 30G performs processing for highlighting a contour section (a section with significant luminance changes) of the luminance signal Y.

The color difference matrix circuit 30H performs matrix processing of a 2 row×2 column color correction matrix coefficient and the color difference signals Cr, Cb to be inputted, and performs color correction in order to achieve favorable color reproducibility.

The contour-corrected luminance signal Y and the color difference matrix-converted color difference signals Cr, Cb are temporarily stored in the RAM 16, and then applied to the compression/expansion processing circuit 46 to undergo compression according to the JPEG method. The compressed image data is recorded onto a memory card 50 via an external memory interface 48.

Transfer efficiency of the horizontal transfer path 24H of the CCD 24 will now be described.

Signal charges of each line of the CCD 24 sent out from the vertical transfer path 24V to the horizontal transfer path 24H of the CCD 24 are transferred sequentially in a horizontal direction via potential wells formed on the horizontal transfer path 24H. At this point, the signal charges are not completely transferred to the next transfer element, and a small portion is left behind. The ratio of the charges transferred to the next well to the charges that were in the original well is called transfer efficiency. Transfer efficiencies change according to the charge quantity (signal quantity) that existed in the original well.

Figure 4:
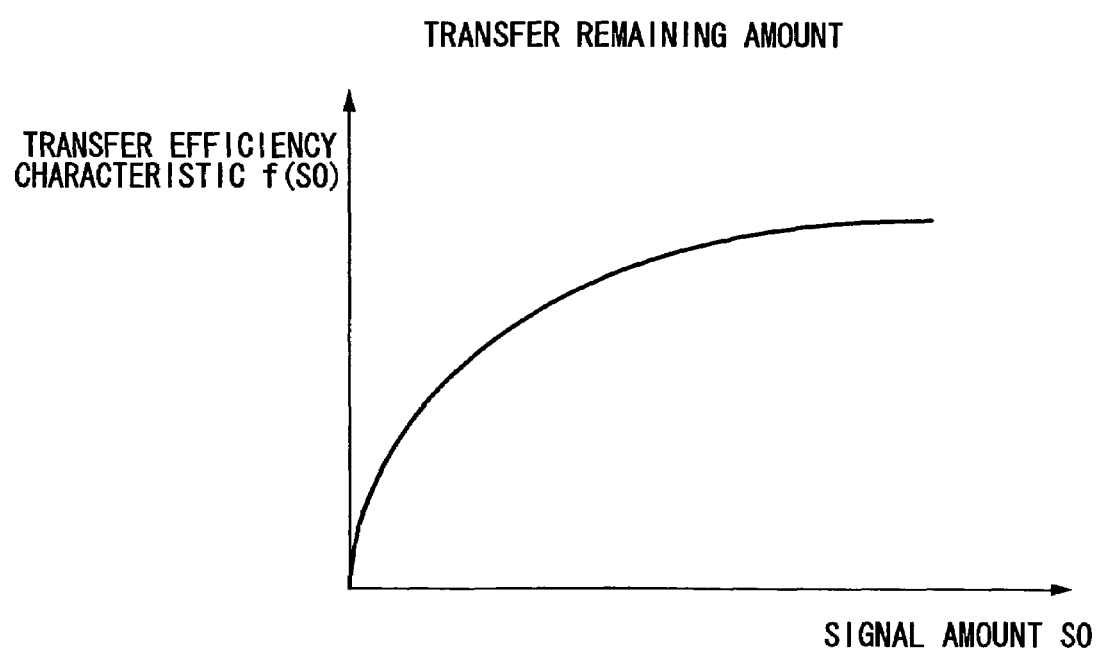
FIG. 4 is a graph showing transfer efficiency characteristics of a CCD image capturing element.

FIG. 4 is a graph showing transfer efficiency characteristics which indicate an example of a transfer remainder to a signal quantity. In FIG. 4, when the signal quantity that existed in the original well is represented by S0, and the transfer remaining quantity after the transfer of the signal quantity S0 is represented by f(S0), transfer efficiency may be expressed by the following equation.

$$\text{Transfer efficiency} = (1 - f(S0)/S0) \times 100 \ (\%) \quad \text{[Equation 1]}$$

As is apparent from the graph shown in FIG. 4, transfer efficiency drops when the signal quantity S0 is small. Transfer efficiency also drops when the CCD drive frequency is high or when the CCD temperature is low.

Since individual variability of transfer efficiencies exists among CCDs, for instance, a subject (e.g. a monochromatic chart) is photographed under predetermined conditions by the camera 1-1 prior to shipment in order to respectively acquire voltage values of a single pixel on the effective pixel region-side and a single pixel on the optical black (OB) region-side at a boundary region of the effective pixel region and the OB region of the CCD 24. The voltage value of the single pixel on the OB region-side contains a transfer remainder amount at the transfer of the single pixel on the effective pixel region-side. Therefore, the transfer efficiency of the CCD 24 may be calculated based on the voltage values of these pixels. The transfer efficiency calculated in this manner is stored either in the ROM 18 or a flash ROM or the like, not shown.

Reverting now to FIG. 1, a CCD transfer efficiency detection section 52 reads out the transfer efficiency of the CCD 24 from the ROM 18.

The digital signal processing section 30 performs signal processing based on the transfer efficiency acquired from the CCD transfer efficiency detection section 52 so as to suppress image quality deterioration caused when transfer efficiency drops below normal transfer efficiency.

In other words, since the horizontal transfer path 24H of the CCD 24 transfers signal charges in a sequence of GRGB-GRGB . . . , a reduced transfer efficiency will cause an increase in mixing between G and R, and G and B, resulting in deterioration in color reproducibility.

The present embodiment is arranged to suppress image quality deterioration by changing the 3 row×3 column color correction matrix coefficient used by the linear matrix circuit 30B (FIG. 3) of the digital signal processing section 30.

As shown in FIG. 5A, a color correction matrix coefficient (A11, A12, . . . , A33) is used when the transfer efficiency is good, while a color correction matrix coefficient (B11, B12, . . . , B33) is used when the transfer efficiency is bad.

In addition, when the correction amounts in regards to the color correction matrix coefficient (A11, A12 . . . , A33) are represented by a, c, and the transfer efficiency by x (%), the correction amounts a, c may be obtained by the following equation.

$$a = \alpha x + \beta$$
$$a' = a$$
$$c = \gamma x + \lambda$$
$$c' = c, \quad \text{[Equation 2]}$$

where a' and c' are final correction amounts, and $\alpha, \beta, \gamma, \lambda$ are coefficients (may be experimentally calculated).

Then, as shown in FIG. 5B, a color correction matrix coefficient (post-change) corrected by the final correction amounts a' and c' is used.

Incidentally, while a linear expression has been used as the equation for obtaining the correction amounts a and c, the equation may also be a polynomial expression, or an exponential or a logarithmic approximation.

Figure 6:
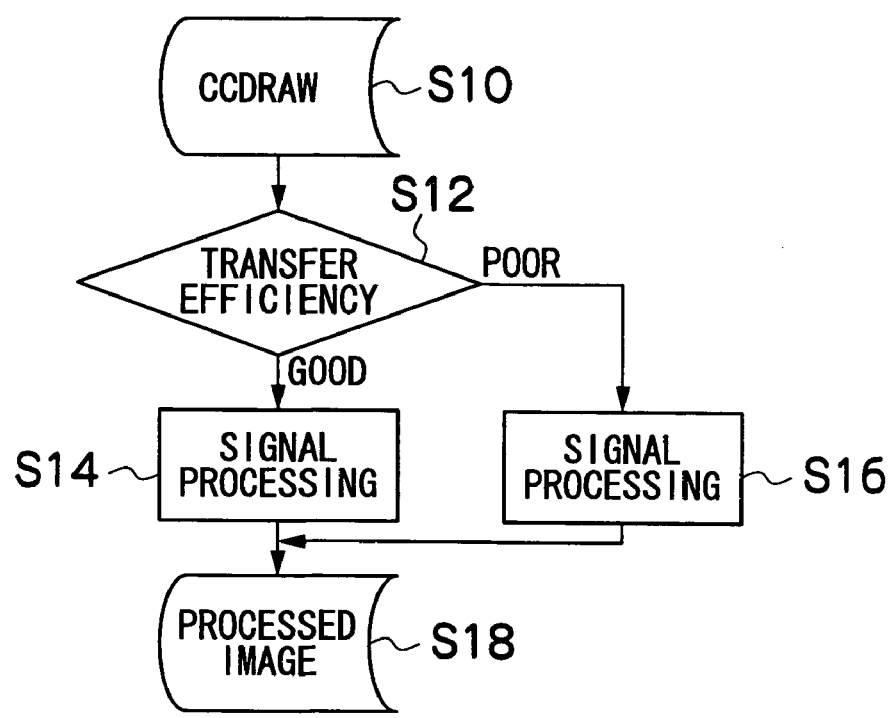
FIG. 6 is a flowchart showing a signal processing method according to the first embodiment of the present invention.

FIG. 6 is a flowchart showing a signal processing method according to the first embodiment of the present invention.

As shown in FIG. 6, the digital signal processing section 30 inputs R, G and B CCD-RAW data (step S10). The digital signal processing section 30 also determines whether the transfer efficiency of the CCD 24 is good or bad (step S12).

When the transfer efficiency is good, the linear matrix circuit 30B of the digital signal processing section 30 performs signal processing using a normal (pre-change) color correction matrix coefficient, as shown in FIGS. 5A and 5B (step S14).

On the other hand, when the transfer efficiency is poor, the linear matrix circuit 30B performs signal processing using a post-change color correction matrix coefficient, as shown in FIGS. 5A and 5B (step S16).

This enables output of processed images in which deterioration of image quality such as in color reproducibility or resolution and the like are suppressed even when the transfer efficiency is reduced (step S18).

Incidentally, while the present embodiment is arranged so that the color correction matrix coefficient of the linear matrix circuit 30B is changed according to transfer efficiency, the present embodiment is not limited to this arrangement, and the 2 row×2 column color correction matrix coefficient of the color difference matrix circuit 30H or the color correction matrix coefficients of both matrix circuits may be changed instead.

Second Embodiment

Figure 7:
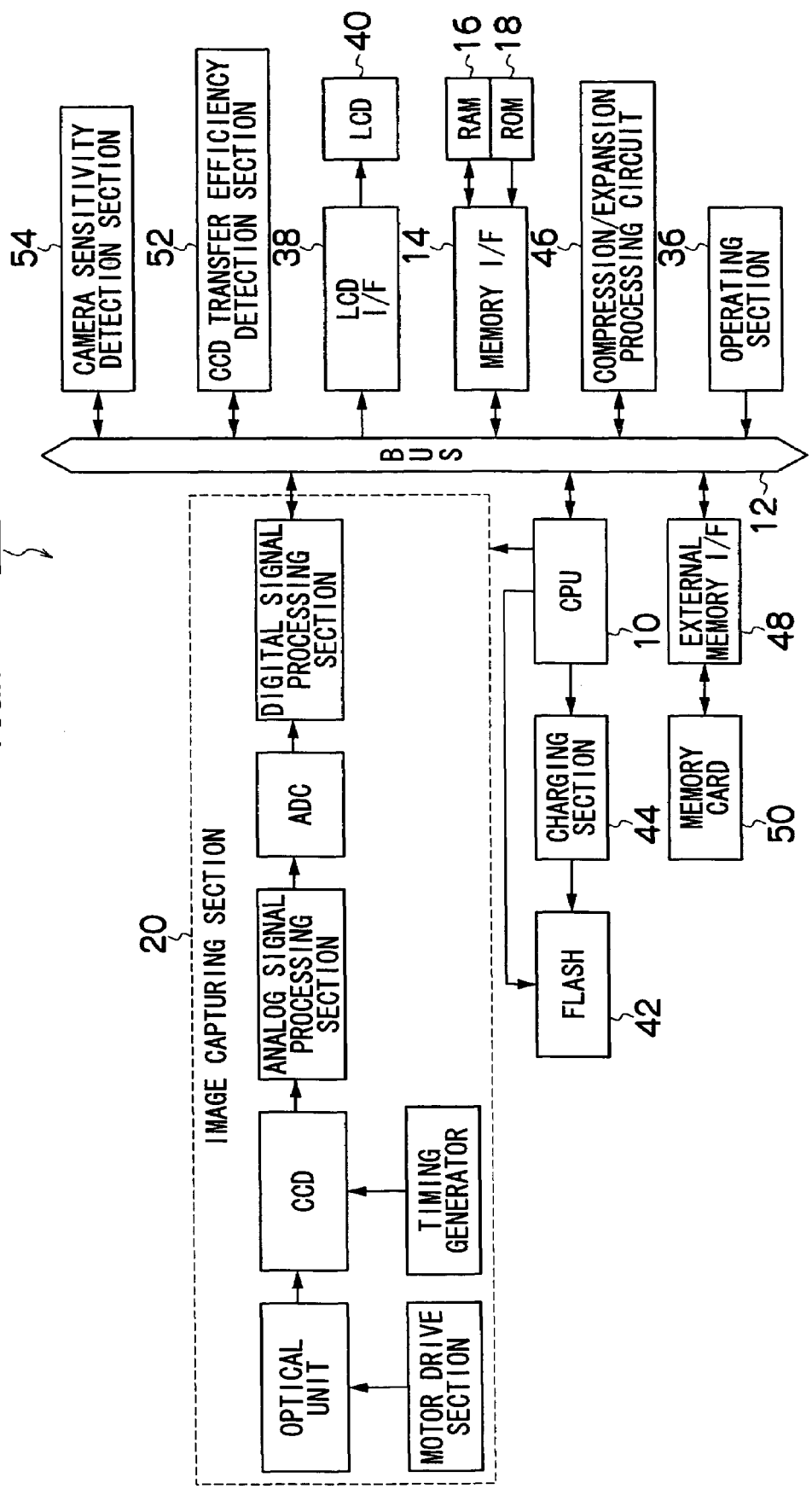
FIG. 7 is a block diagram showing a second embodiment of an image capturing apparatus according to the present invention.

FIG. 7 is a block diagram showing a second embodiment of an image capturing apparatus according to the present invention. Incidentally, like portions to the first embodiment shown in FIG. 1 are assigned like reference characters, and detailed descriptions thereof will be omitted.

A camera 1-2 of the second embodiment shown in FIG. 7 differs from the camera 1-1 of the first embodiment in that the camera 1-2 further comprises a camera sensitivity detection section 54.

As described in FIG. 4, the smaller the signal quantity S0 to be transferred, the larger the ratio of the transfer remaining quantity f (S0) to the signal quantity S0, and the transfer efficiency will be reduced, as is apparent from equation 1. Therefore, when photography is performed on a dark subject by increasing camera sensitivity (for instance to ISO 800 or ISO 1600), the transfer efficiency will drop.

Camera sensitivity is adjusted by a photography sensitivity setting gain which is set in the analog amp in the analog signal processing section 26 by the CPU 10.

The camera sensitivity detection section 54 detects the sensitivity of a camera used during photography. The digital signal processing section 30 performs signal processing based on the transfer efficiency acquired from the CCD transfer efficiency detection section 52 and the camera sensitivity detected by the camera sensitivity detection section 54 so as to suppress image quality deterioration caused when the transfer efficiency drops below normal transfer efficiency.

In the present embodiment, the final correction amount a' of the 3 row×3 column color correction matrix coefficient used by the linear matrix circuit 30B of the digital signal processing section 30 is obtained as follows in consideration of camera sensitivity.

$$a'=a\times\{2^{\wedge}(sv-9)\}, \quad [\text{Equation 3}]$$

where a is a correction amount according to transfer efficiency (refer to equation 2), and sv is camera sensitivity=$\log_2(ISO/3.125)$ As is apparent from equation 3, when the camera sensitivity is at ISO 1600, the final correction amount a' will be the correction amount a, and will become smaller as the camera sensitivity decreases.

The final correction amount c' shown in FIG. 5B is obtained in the same manner. Alternatively, as shown in FIG. 5A, a color correction matrix coefficient (B11, B12, . . . , B33) may be prepared for each camera sensitivity, and a color correction matrix coefficient corresponding to the camera sensitivity may be used.

Figure 8:
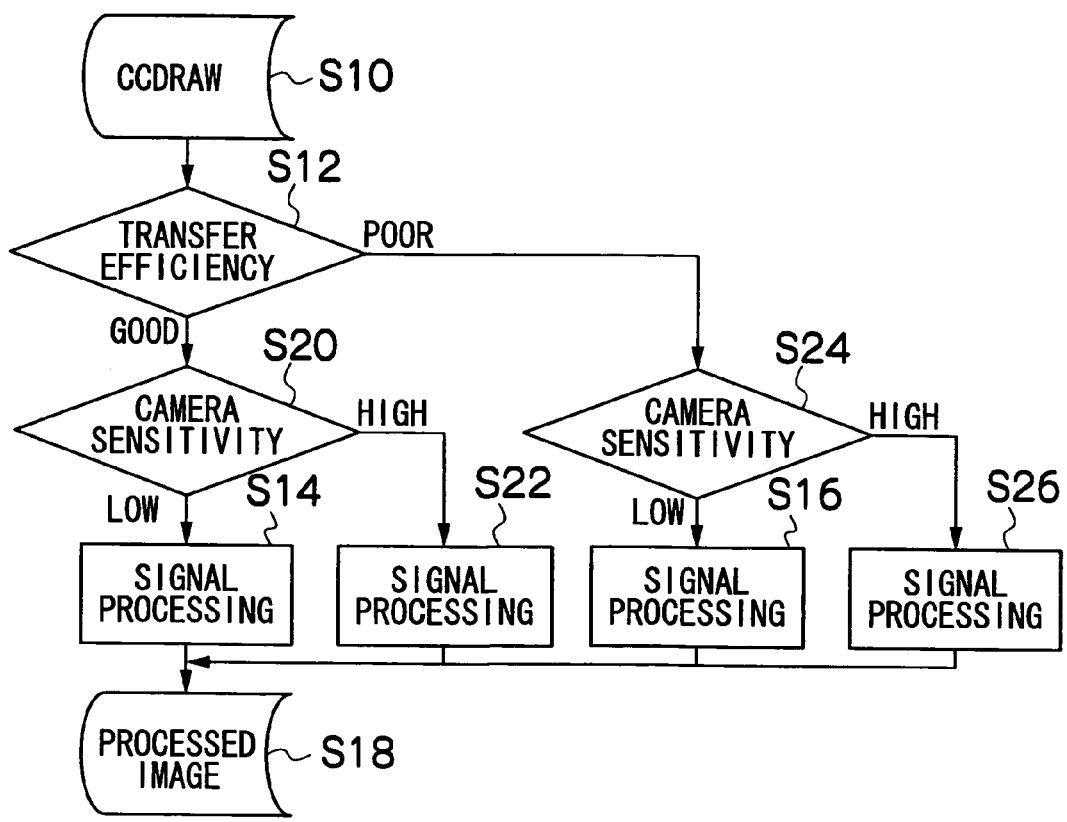
FIG. 8 is a flowchart showing a signal processing method according to the second embodiment of the present invention.

FIG. 8 is a flowchart showing a signal processing method according to the second embodiment of the present invention. Incidentally, like portions to the flowchart of the first embodiment shown in FIG. 6 are assigned like step numerals, and detailed descriptions thereof will be omitted.

In FIG. 8, when the transfer efficiency is good, determination of whether camera sensitivity is poor is further performed in step S20. If the camera sensitivity is high, signal processing is performed using a color correction matrix coefficient corrected by the final correction amount a' and the like obtained by equation 3 (step S22).

Similarly, when the transfer efficiency is poor, determination of whether camera sensitivity is poor is further performed in step S24. If the camera sensitivity is high, signal processing is performed using a color correction matrix coefficient corrected by the final correction amount a' and the like obtained by equation 3 (step S26). The correction amount a, corresponding to the transfer efficiency of the equation 3, differs between steps S22 and S26, resulting in different signal processing performed in the steps.

As seen, signal processing is changed according to transfer efficiency and camera sensitivity in order to suppress deterioration of image quality such as color reproducibility and resolution or the like due to transfer efficiency degradation.

Third Embodiment

Figure 9:
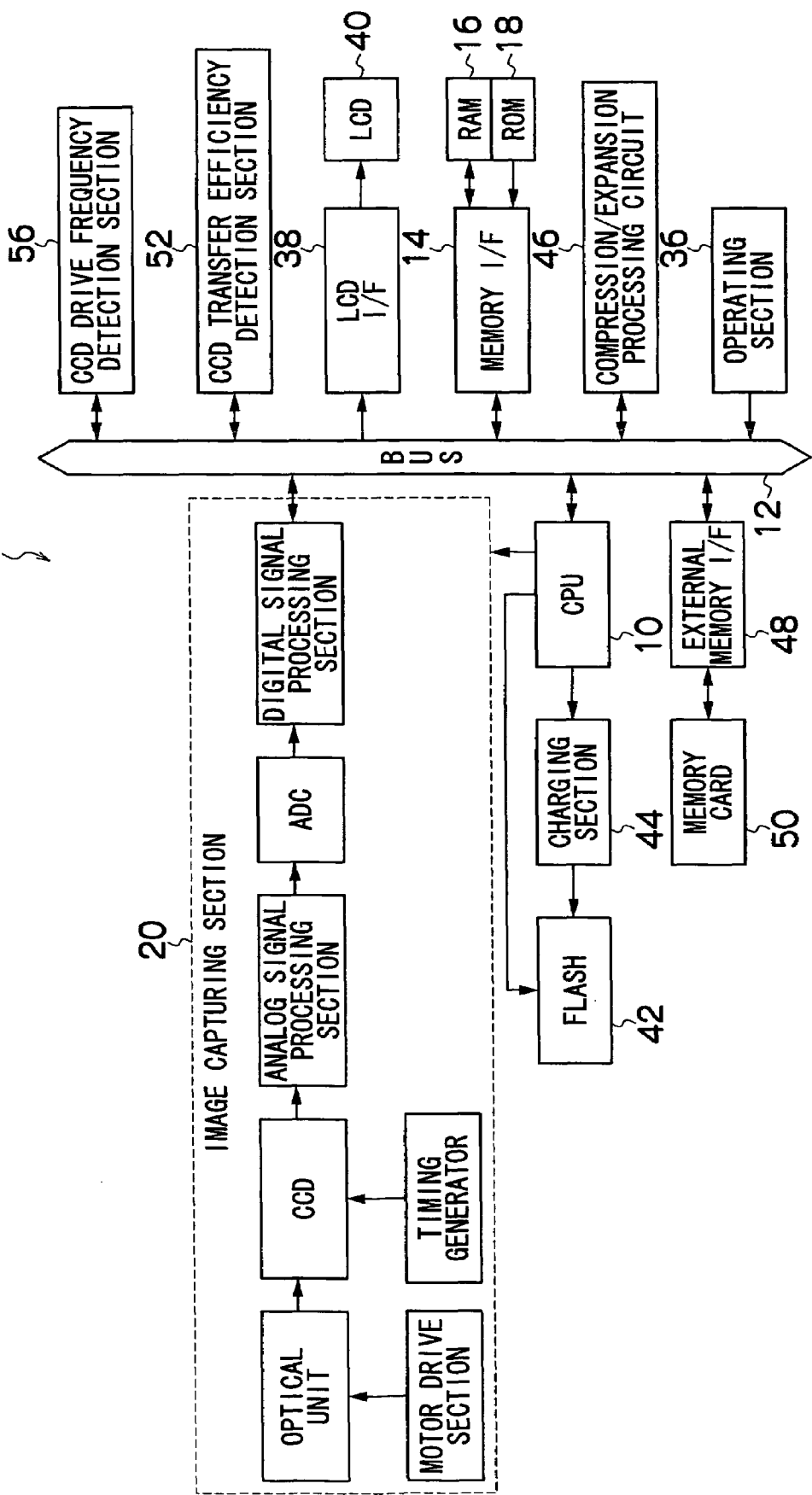
FIG. 9 is a block diagram showing a third embodiment of an image capturing apparatus according to the present invention.

FIG. 9 is a block diagram showing a third embodiment of an image capturing apparatus according to the present invention. Incidentally, like portions to the block diagram of the first embodiment shown in FIG. 1 are assigned like reference characters, and detailed descriptions thereof will be omitted.

A camera 1-3 of the third embodiment shown in FIG. 9 differs from the camera 1-1 of the first embodiment in that the camera 1-3 further comprises a CCD drive frequency detection section 56.

The horizontal transfer path 24H of the CCD 24 is composed of 2-phase drive or 4-phase drive transfer CCDs, and transfer efficiency is reduced since the drive frequency in the horizontal transfer path 24H is increased. In other words, the drive frequency of the vertical transfer path 24V of the CCD 24 is low compared to the drive frequency of the horizontal transfer path 24H, and the transfer efficiency will not be a problem in this case.

For instance, the drive frequency of the horizontal transfer path 24H of the CCD 24 increases when performing readout of all pixels from the CCD 24, and decreases when performing readout of pixels by skipping from the CCD 24, such as when displaying live images or photographing moving images, or when the frame rate is set low when photographing moving images.

The CCD drive frequency detection section 56 detects the drive frequency of the horizontal transfer path 24H, and for instance may detect a drive frequency by the drive mode of the CCD 24. The digital signal processing section 30 performs signal processing based on the transfer efficiency acquired from the CCD transfer efficiency detection section 52 and the drive frequency detected by the CCD drive frequency detection section 56 so as to suppress image quality deterioration caused when the transfer efficiency drops below normal transfer efficiency.

In the present embodiment, the final correction amount a' of the 3 row×3 column color correction matrix coefficient used by the linear matrix circuit 30B of the digital signal processing section 30 is obtained as follows in consideration of drive frequency.

When the drive frequency is low:

$a'=a$

When the drive frequency is high:

$$a'=a\times S(S>1), \quad [\text{Equation 4}]$$

where S is a value corresponding to the drive frequency.

As is apparent from equation 4, since the transfer efficiency drops (signal charges may no longer be sent in a favorable manner) when the drive frequency is high, the final correction amount a' will be increased.

The final correction amount c' shown in FIG. 5B is obtained in the same manner. Alternatively, as shown in FIG. 5A, a color correction matrix coefficient (B11, B12, . . . , B33) may be prepared for each drive frequency, and a color correction matrix coefficient corresponding to the drive frequency may be used.

Figure 10:
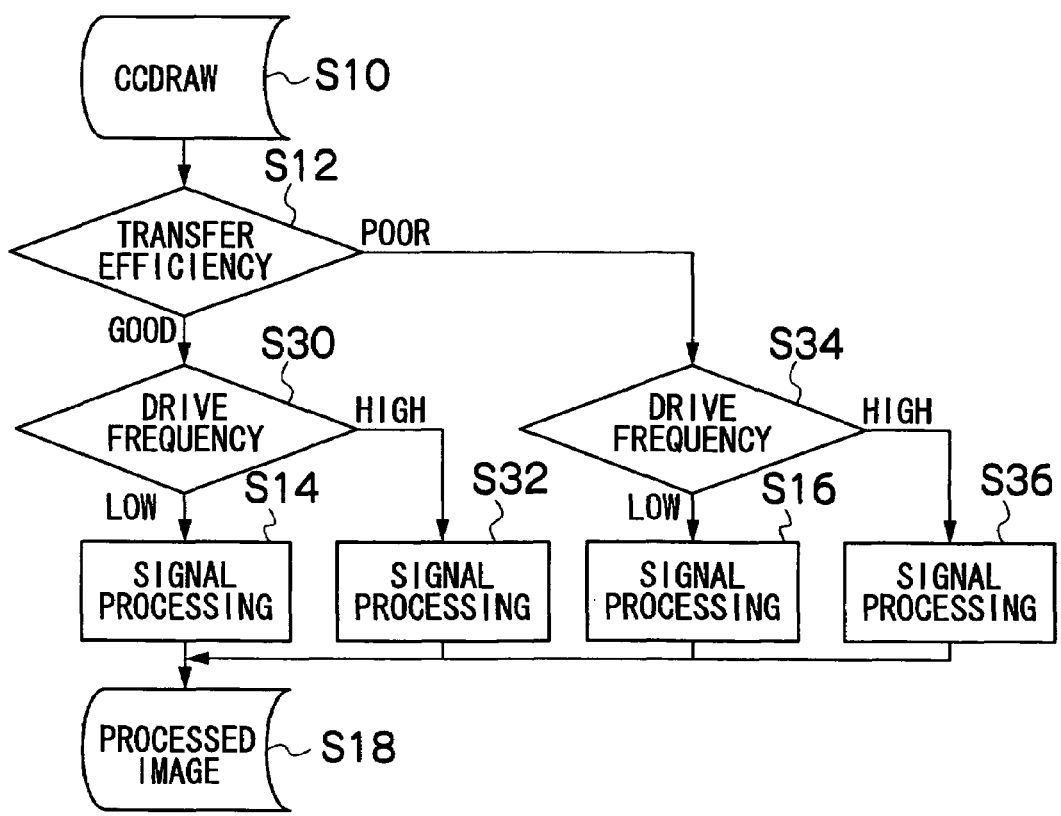
FIG. 10 is a flowchart showing a signal processing method according to the third embodiment of the present invention.

FIG. 10 is a flowchart showing a signal processing method according to the third embodiment of the present invention. Incidentally, like portions to the flowchart of the first embodiment shown in FIG. 6 are assigned like step numerals, and detailed descriptions thereof will be omitted.

In FIG. 10, when the transfer efficiency is good, determination of whether the drive frequency of the horizontal transfer path 24H of the CCD 24 is high or low is further performed in step S30. If the drive frequency is high, signal processing is performed using a color correction matrix coefficient corrected by the final correction amount a' and the like obtained by equation 4 (step S32).

Similarly, when the transfer efficiency is poor, determination of whether drive frequency is high or low is further performed in step S34. If the drive frequency is high, signal processing is performed using a color correction matrix coefficient corrected by the final correction amount a' and the like obtained by equation 4 (step S36). The correction amount a, corresponding to the transfer efficiency of the equation 4, differs between steps S32 and S36, resulting in different signal processing performed in the steps.

As seen, signal processing is changed according to transfer efficiency and drive frequency in order to suppress deterioration of image quality such as color reproducibility and resolution or the like due to transfer efficiency degradation.

Fourth Embodiment

Figure 11:
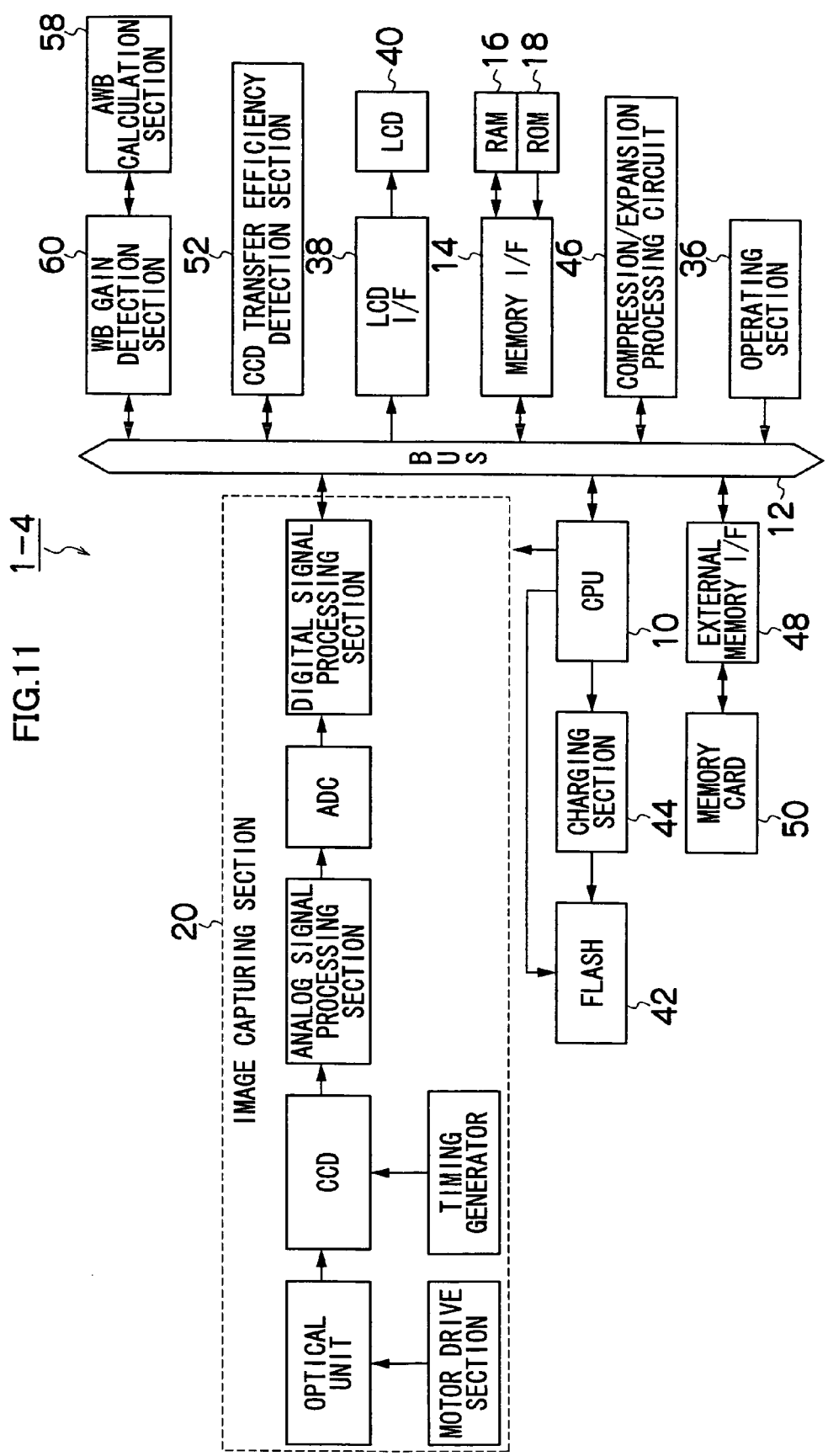
FIG. 11 is a block diagram showing a fourth embodiment of an image capturing apparatus according to the present invention.

FIG. 11 is a block diagram showing a fourth embodiment of an image capturing apparatus according to the present invention. Incidentally, like portions to the block diagram of the first embodiment shown in FIG. 1 are assigned like reference characters, and detailed descriptions thereof will be omitted.

A camera 1-4 of the fourth embodiment shown in FIG. 11 differs from the camera 1-1 of the first embodiment in that the camera 1-4 further comprises a WB gain detection section 60 which detects a WB gain from an auto white balance (AWB) calculation section 58.

The AWB calculation section 58 respectively calculates an average integrated value for each color of the R, G, B signals for each of 256 split areas of a 16×16-split single screen, using the R, G, B signals stored in the RAM 16, and calculates a ratio of R, G, and B average integrated values, or in other words, the R/G and B/G ratios (integrated values for WB) for each split area. Color information of each of the 256 split areas calculated in this manner may be expressed as 256 dots distributed in a color space formed by an R/G axis and a B/G axis, based on the R/G and B/G values. The AWB calculation section 58 calculates a barycentric position of a set of color information which mutually approximate each other among the 256 pieces of color information distributed in the color space formed by the R/G and B/G axes, and detects a color temperature of the color information indicated by the calculated barycentric position. Incidentally, the light source type during photography may be automatically determined by obtaining light source types (for instance, blue sky, shade, fair, fluorescent lamp (daylight color, day-white color, white color, and warm white color), tungsten and the like) which possess the detected color temperature.

Predetermined post-chromatic adaptation color information corresponding to the detected color temperature is set as a target value to calculate WB gains. The WB adjustment circuit 30C of the digital signal processing section 30 performs white balance adjustment by respectively applying the calculated WB gains to the R, G and B signals.

The WB gain detection section 60 detects the WB gains for the R, G and B signals. The digital signal processing section 30 performs signal processing based on the transfer efficiency acquired from the CCD transfer efficiency detection section 52 and the WB gains detected by the WB gain detection section 60 so as to suppress image quality deterioration caused when the transfer efficiency drops below normal transfer efficiency.

In the present embodiment, the final correction amount a' of the 3 row×3 column color correction matrix coefficient used by the linear matrix circuit 30B of the digital signal processing section 30 is obtained as follows in consideration of the respective WB gains $R_{gain}$, $G_{gain}$ and $B_{gain}$ of the R, G and B signals.

When $R_{gain}/G_{gain} > B_{gain}/G_{gain}$, $a' = a$;

When $R_{gain}/G_{gain} \leq B_{gain}/G_{gain}$, $a' = a \times U (U \geq 1)$, [Equation 5]

where U is a value corresponding to the WB gains.

In other words, when the color temperature (or light source type) corresponds to tungsten, the WB gain to the B signal becomes significantly larger than the WB gain to the R signal. Therefore, for scenes with such a color temperature, the final correction amount a' is made larger than the correction amount a, as shown in equation 5.

The final correction amount c' shown in FIG. 5B is obtained in the same manner. Alternatively, as shown in FIG. 5A, a color correction matrix coefficient (B11, B12, ..., B33) may be prepared for each color temperature (or light source type), and a color correction matrix coefficient corresponding to the color temperature (or light source type) may be used.

Figure 12:
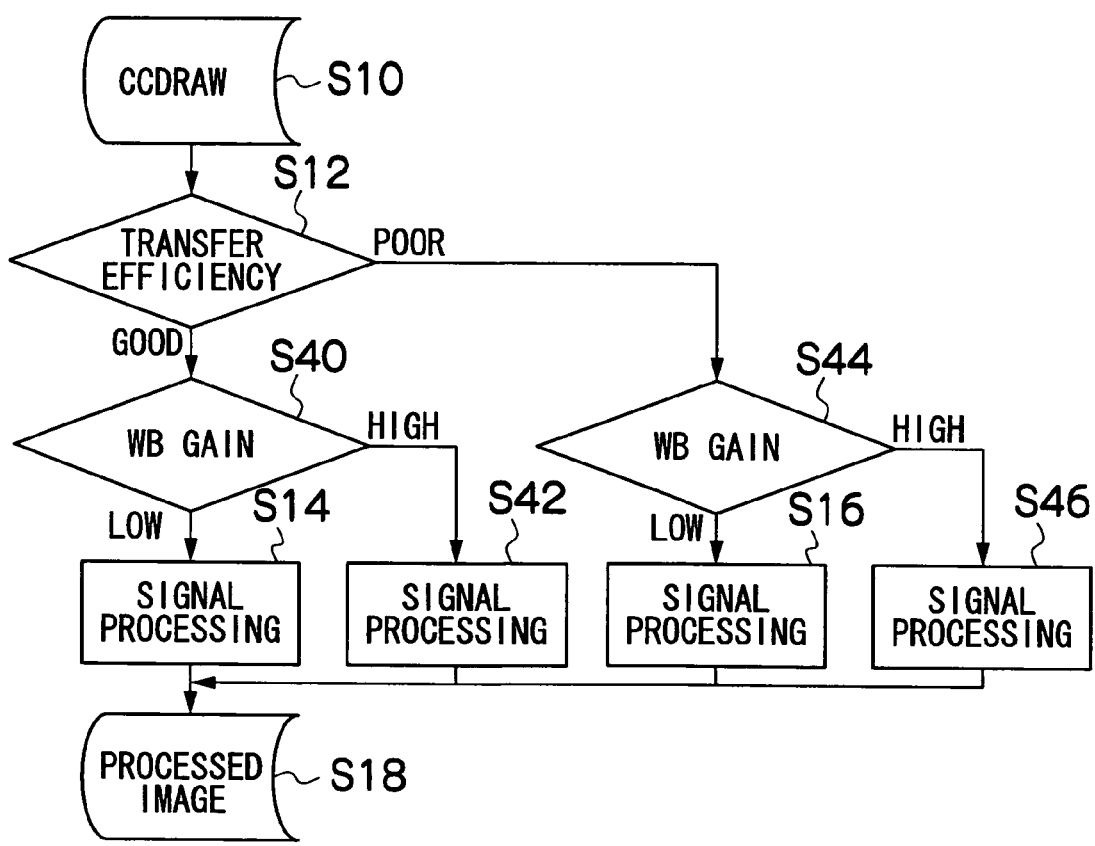
FIG. 12 is a flowchart showing a signal processing method according to the fourth embodiment of the present invention.

FIG. 12 is a flowchart showing a signal processing method according to the fourth embodiment of the present invention. Incidentally, like portions to the flowchart of the first embodiment shown in FIG. 6 are assigned like step numerals, and detailed descriptions thereof will be omitted.

In FIG. 12, when the transfer efficiency is good, determination of whether WB gain is high is further performed in step S40. If the WB gain is high, signal processing is performed using a color correction matrix coefficient corrected by the final correction amount a' and the like obtained by equation 5 (step S42).

Similarly, when the transfer efficiency is poor, determination of whether WB gain is high or low is further performed in step S44. If the WB gain is high, signal processing is performed using a color correction matrix coefficient corrected by the final correction amount a' and the like obtained by equation 5 (step S46). The correction amount a, corresponding to the transfer efficiency of equation 5, differs between steps S42 and S46, resulting in different signal processing performed in the steps.

As seen, signal processing is changed according to transfer efficiency and WB gain in order to suppress deterioration of image quality such as color reproducibility and resolution or the like due to transfer efficiency degradation.

Fifth Embodiment

Figure 13:
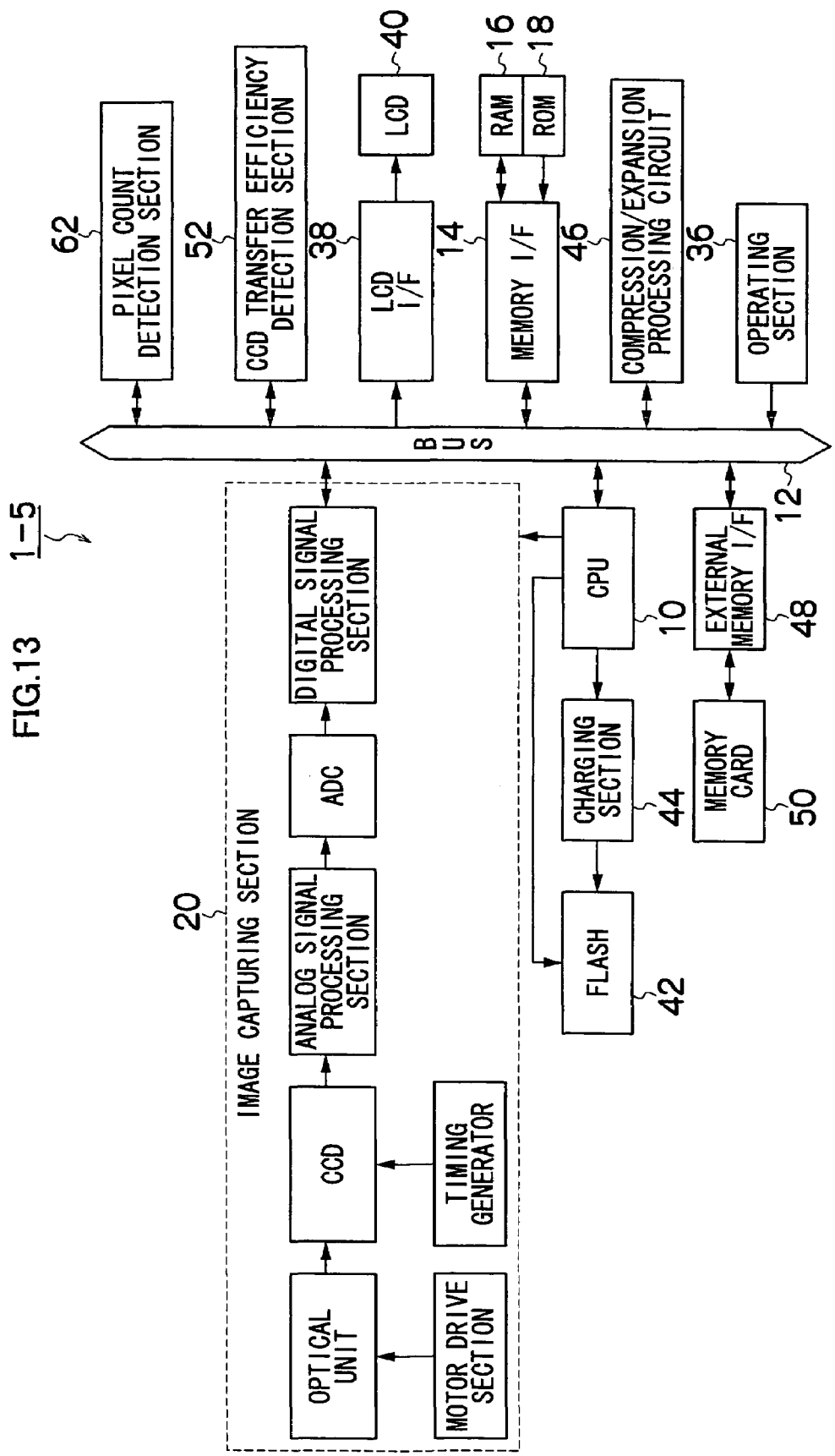
FIG. 13 is a block diagram showing a fifth embodiment of an image capturing apparatus according to the present invention.

FIG. 13 is a block diagram showing a fifth embodiment of an image capturing apparatus according to the present invention. Incidentally, like portions to the block diagram of the first embodiment shown in FIG. 1 are assigned like reference characters, and detailed descriptions thereof will be omitted.

A camera 1-5 of the fifth embodiment shown in FIG. 13 differs from the camera 1-1 of the first embodiment in that the camera 1-3 further comprises a pixel count detection section 62.

The pixel count detection section 62 detects a pixel count (VGA, 1 M, 3 M, 6 M and the like) during photography. The digital signal processing section 30 performs signal processing based on the transfer efficiency acquired from the CCD transfer efficiency detection section 52 and the pixel count detected by the pixel count detection section 62 so as to suppress image quality deterioration caused when the transfer efficiency drops below normal transfer efficiency.

In the present embodiment, the color correction matrix coefficient used by the linear matrix circuit 30B of the digital signal processing section 30 is corrected by the final correction amount a' in the same manner as in the first embodiment. In addition, processing for changing a frequency band of a low pass filter (LPF), not shown, inside the digital signal processing section 30 is performed based on the pixel count detected by the pixel count detection section 62.

For instance, an LPF is provided between the synchronization processing circuit 30E and the RGB/YC conversion circuit 30F, or between the RGB/YC conversion circuit 30F and the contour correction circuit 30G of the digital signal processing section 30. Filtering processing in accordance with the number of pixels in a photographed image is performed by the LPF. When the pixel count is low, normal filtering processing according to the pixel count is performed, and when the pixel count is high, filtering is strengthened as compared to normal filtering processing according to the pixel count in order to reduce the frequency band.

Figure 14:
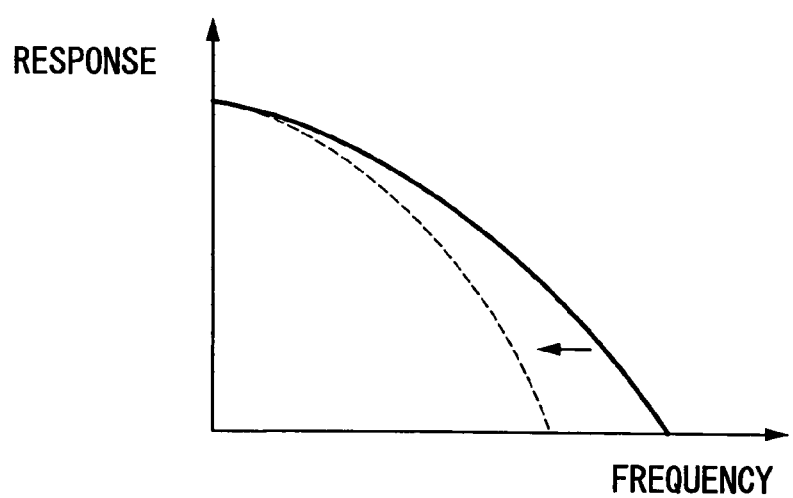
FIG. 14 is a graph showing an example of LPF characteristics changed by the fifth embodiment of an image capturing apparatus according to the present invention.

In other words, if a normal LPF characteristic in the case of a high pixel count is indicated by the solid line in FIG. 14, the frequency band is reduced as indicated by the dashed line. This is performed to reduce field bumps, which tend to be prominent with high pixel counts, by reducing frequency bands as described above.

Changing gains per field is another method that may be contemplated for reducing field bumps.

In addition, at the synchronization processing circuit 30E, when actual data of a certain color (for instance, G) exists on an attention pixel, data of the other colors (R and B) interpolate and create pixels of the same color around the attention pixel. Moreover, even with pixels with the same color around the attention pixel, determination of the direction in which the color continues (continuity determination) is performed so that only continuous pixels are used in the interpolation processing.

When the pixel count is high and field bumps occur, synchronization processing is performed by averaging the same color pixels around the attention pixel instead of having the synchronization processing circuit 30E perform continuity determination during synchronization processing. This is due to the fact that field bumps may cause erroneous continuity determination.

Furthermore, contour correction processing by the contour correction circuit 30G may be arranged to be changed according to the pixel count. For instance, contour correction may be strengthened when reducing the frequency band using the LPF.

Figure 15:
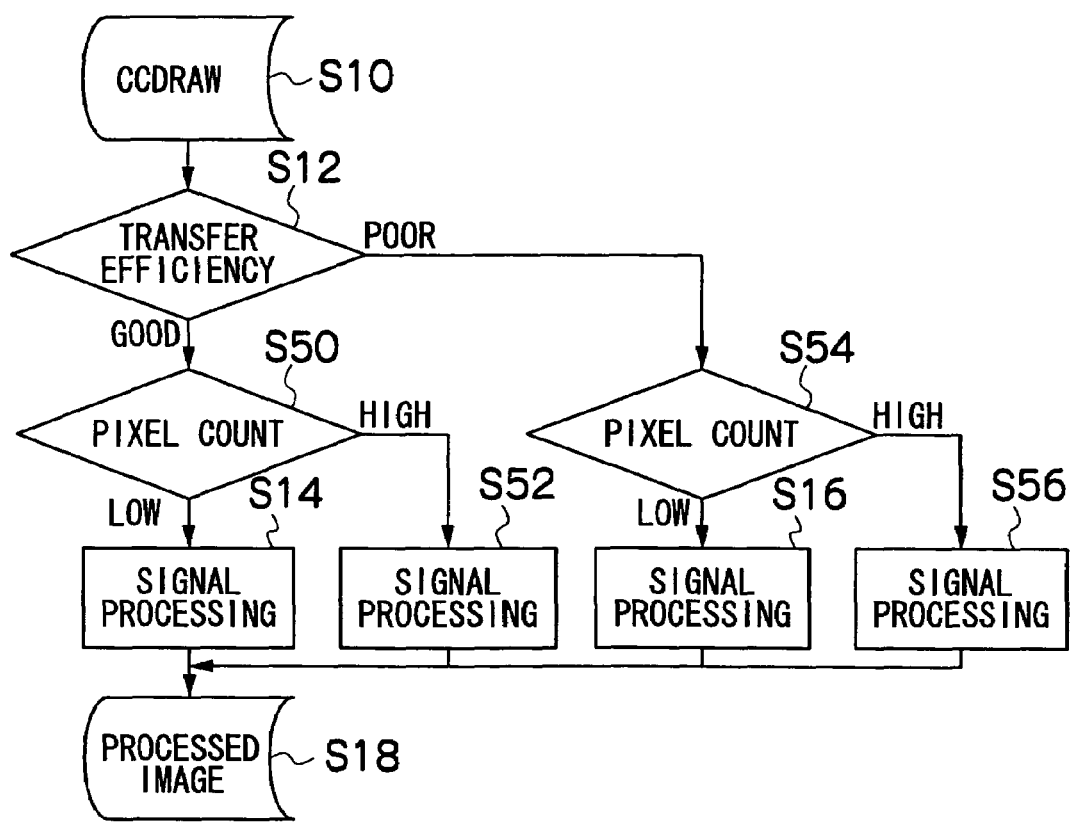
FIG. 15 is a flowchart showing a signal processing method according to the fifth embodiment of the present invention.

FIG. 15 is a flowchart showing a signal processing method according to the fifth embodiment of the present invention. Incidentally, like portions to the flowchart of the first embodiment shown in FIG. 6 are assigned like step numerals, and detailed descriptions thereof will be omitted.

In FIG. 15, when the transfer efficiency is good, determination of whether the pixel count is high is further performed in step S50. When the pixel count is high, processing for reducing the frequency band is performed at the LPF (step S52).

Similarly, when the transfer efficiency is poor, determination of whether the pixel count is high is further performed in step S54. When the pixel count is high, signal processing in case of poor transfer efficiencies as well as processing by the LPF for reducing the frequency band are performed (step S56).

As seen, signal processing is changed according to transfer efficiency and pixel counts in order to suppress deterioration of image quality such as color reproducibility and resolution or the like due to transfer efficiency degradation.

Sixth Embodiment

Figure 16:
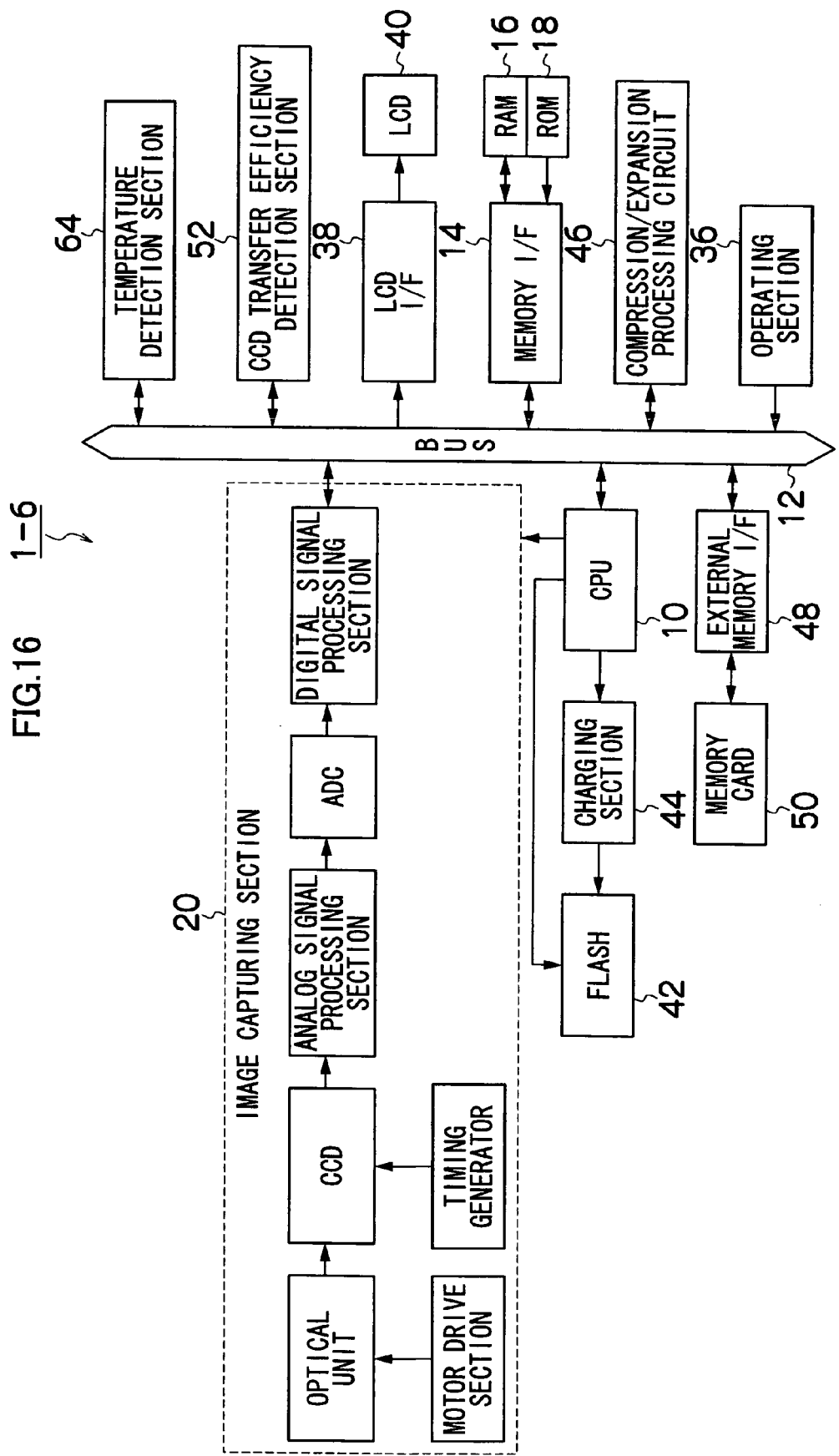
FIG. 16 is a block diagram showing a sixth embodiment of an image capturing apparatus according to the present invention.

FIG. 16 is a block diagram showing a sixth embodiment of an image capturing apparatus according to the present invention. Incidentally, like portions to the block diagram of the first embodiment shown in FIG. 1 are assigned like reference characters, and detailed descriptions thereof will be omitted.

A camera 1-6 of the sixth embodiment shown in FIG. 16 differs from the camera 1-1 of the first embodiment in that the camera 1-6 further comprises a temperature detection section 64.

The temperature detection section 64 detects a temperature of the CCD 24. Incidentally, when the temperature of the CCD 24 cannot be detected directly, the temperature detection section 64 may be arranged to detect an internal temperature of the camera chassis as a temperature corresponding to the temperature of the CCD 24.

The digital signal processing section 30 performs signal processing based on the transfer efficiency acquired from the CCD transfer efficiency detection section 52 and the temperature of the CCD 24 detected by the temperature detection section 64 so as to suppress image quality deterioration caused when the transfer efficiency drops below normal transfer efficiency.

In the present embodiment, the final correction amount a' of the 3 row×3 column color correction matrix coefficient used by the linear matrix circuit 30B of the digital signal processing section 30 is obtained as follows in consideration of the temperature of the CCD 24.

When the temperature is high:

$a' = a$

When the temperature is low:

$$a' = a \times W (W > 1), \quad \text{[Equation 6]}$$

where W is a value corresponding to the temperature characteristic of the transfer efficiency of the CCD 24.

As is apparent from equation 6, since the transfer efficiency drops when the temperature of the CCD 24 is low, the final correction amount a' will be increased.

The final correction amount c' shown in FIG. 5B is obtained in the same manner. Alternatively, as shown in FIG. 5A, a color correction matrix coefficient (B11, B12, . . . , B33) may be prepared for each temperature, and a color correction matrix coefficient corresponding to the temperature of the CCD 24 may be used.

Figure 17:
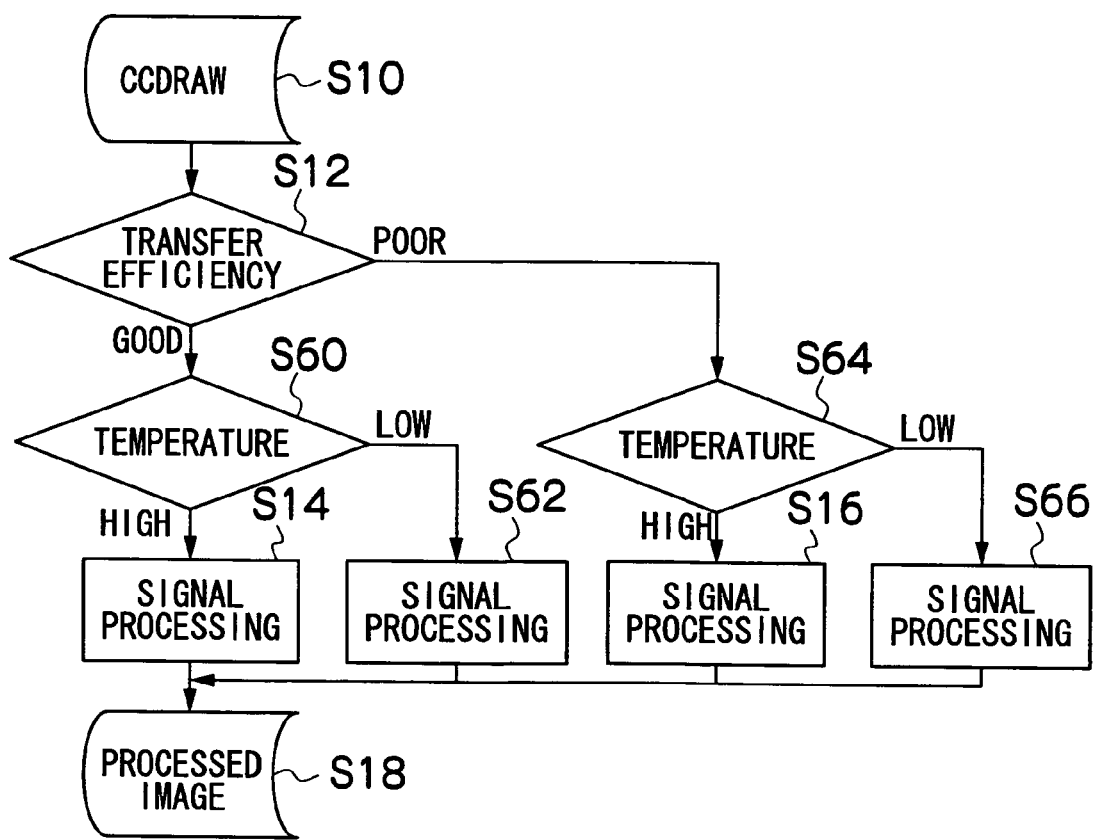
FIG. 17 is a flowchart showing a signal processing method according to the sixth embodiment of the present invention.

FIG. 17 is a flowchart showing a signal processing method according to the sixth embodiment of the present invention. Incidentally, like portions to the flowchart of the first embodiment shown in FIG. 6 are assigned like step numerals, and detailed descriptions thereof will be omitted.

In FIG. 17, when the transfer efficiency is good, determination of whether the temperature of the CCD 24 is high is further performed in step S60. If the temperature is low, signal processing is performed using a color correction matrix coefficient corrected by the final correction amount a' and the like obtained by equation 6 (step S62).

Similarly, when the transfer efficiency is poor, determination of whether the temperature is low is further performed in step S64. If the temperature is low, signal processing is performed using a color correction matrix coefficient corrected by the final correction amount a' and the like obtained by equation 6 (step S66). The correction amount a, corresponding to the transfer efficiency of equation 6, differs between steps S62 and S66, resulting in different signal processing performed in the steps.

As seen, signal processing is changed according to transfer efficiency and temperature in order to suppress deterioration of image quality such as color reproducibility and resolution or the like due to transfer efficiency degradation.

Seventh Embodiment

Figure 18:
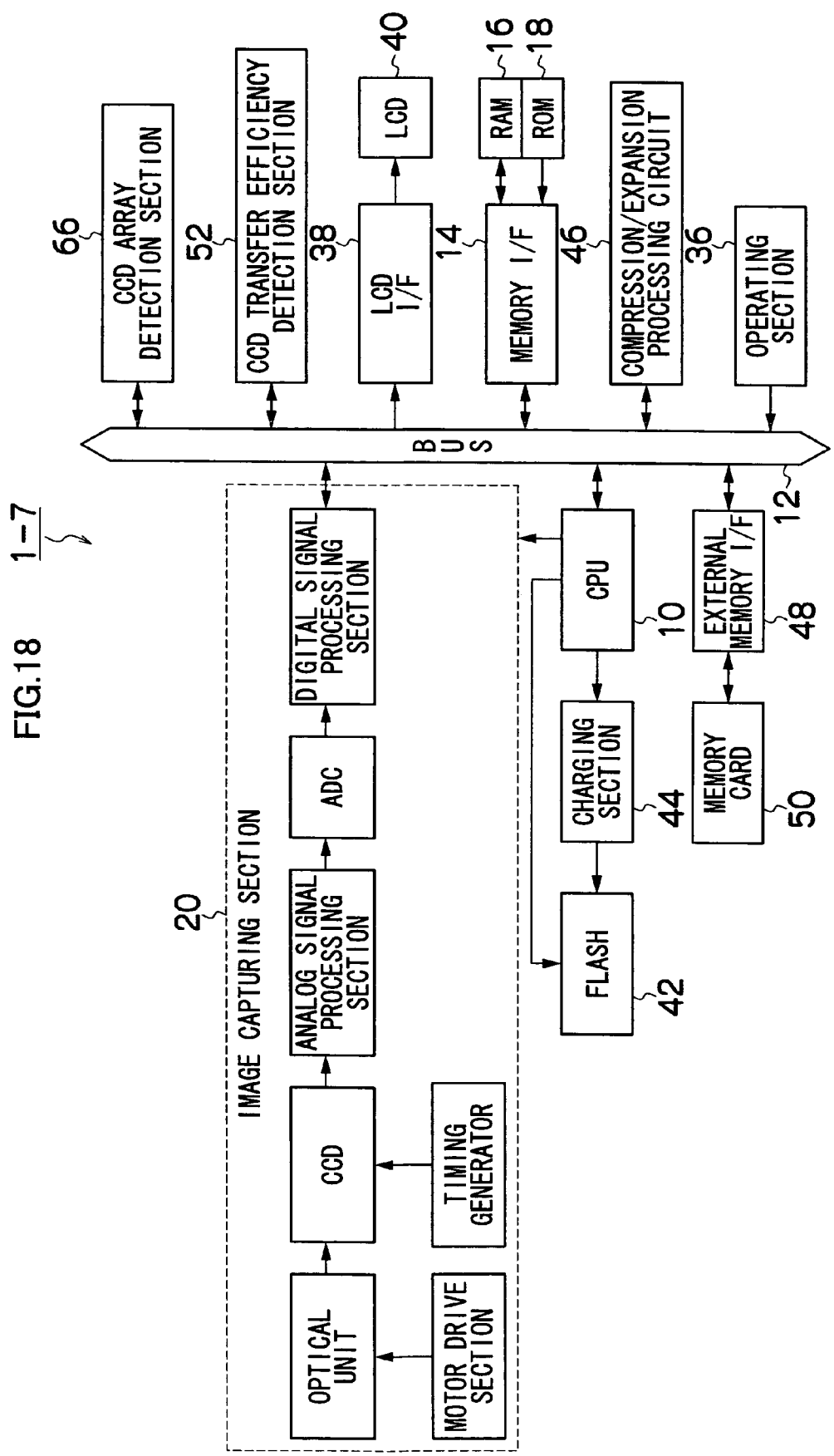
FIG. 18 is a block diagram showing a seventh embodiment of an image capturing apparatus according to the present invention.

FIG. 18 is a block diagram showing a seventh embodiment of an image capturing apparatus according to the present invention. Incidentally, like portions to the block diagram of the first embodiment shown in FIG. 1 are assigned like reference characters, and detailed descriptions thereof will be omitted.

A camera 1-7 of the seventh embodiment shown in FIG. 18 differs from the camera 1-1 of the first embodiment in that the camera 1-7 further comprises a CCD array detection section 66.

The CCD array detection section 66 detects CCD arrays of the CCD 24. The CCD array of the CCD 24 is determined in advance according to the CCD. Therefore, since the color sequence of the R, G, B dot-sequential CCD signals outputted from the CCD 24 is already known, the CCD array detection section 66 may be configured so as to store information related to the CCD array of the CCD 24 (for instance, G-stripe R/G full-checkered pattern or Bayer array), and read out the information as needed.

The digital signal processing section 30 performs signal processing based on the transfer efficiency acquired from the CCD transfer efficiency detection section 52 and the CCD array acquired from the CCD array detection section 66 so as to suppress image quality deterioration caused when the transfer efficiency drops below normal transfer efficiency.

In other words, if the transfer efficiency is poor in the case of a CCD array in which signal charges transferred by the horizontal transfer path of the CCD assume RBRB ... in a line and GGGG ... in the next, mixing will occur between the colors of R and B. On the other hand, if the transfer efficiency is poor in the case of a CCD array (Bayer array) in which signal charges transferred by the horizontal transfer path of the CCD assume RGRG ... in a line and GBGB ... in the next, mixing will occur between the colors of G and B, and G and R, in turn creating field bumps.

Therefore, the digital signal processing section 30 performs matrix processing using a matrix coefficient which separates the mixed colors according to the CCD array as the 3 row×3 column color correction coefficient used by the linear matrix circuit 30B, and calculates the color-corrected R, G and B signals.

Alternatively, a correction amount relating to the CCD array may be added to the WB gains in order to maintain color reproducibility regardless of CCD array. In addition, as described above, respectively correcting gains per field or performing filtering by LPF may be considered in order to correct field bumps.

Figure 19:
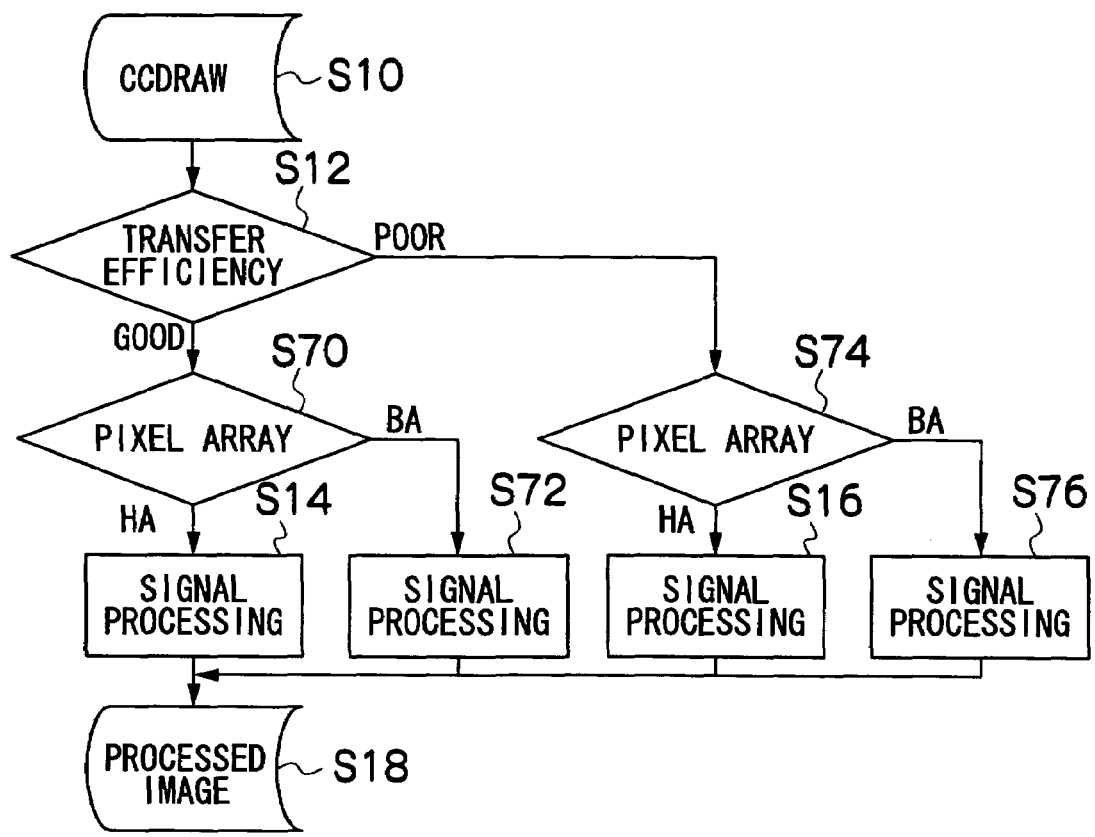
FIG. 19 is a flowchart showing a signal processing method according to the seventh embodiment of the present invention.

FIG. 19 is a flowchart showing a signal processing method according to the seventh embodiment of the present invention. Incidentally, like portions to the first embodiment shown in FIG. 6 are assigned like reference characters, and detailed descriptions thereof will be omitted.

In FIG. 19, when the transfer efficiency is good, determination of the CCD array of the CCD 24 is further performed in step S70. When the CCD array is the honeycomb array (HA) shown in FIG. 2, the signal processing of step S14 is performed. When the CCD array is a Bayer array (BA), signal processing for correcting field bumps is performed in step S72.

Similarly, when the transfer efficiency is poor, determination of the color filter array is further performed in step S74. When the CCD array is a honeycomb array (HA), the signal processing of step S16 is performed, and when the CCD array is a Bayer array (BA), signal processing for correcting field bumps is performed in step S76.

As seen, signal processing is changed according to transfer efficiency and CCD array in order to suppress deterioration of image quality such as color reproducibility and resolution or the like due to transfer efficiency degradation.

Eighth Embodiment

Figure 20:
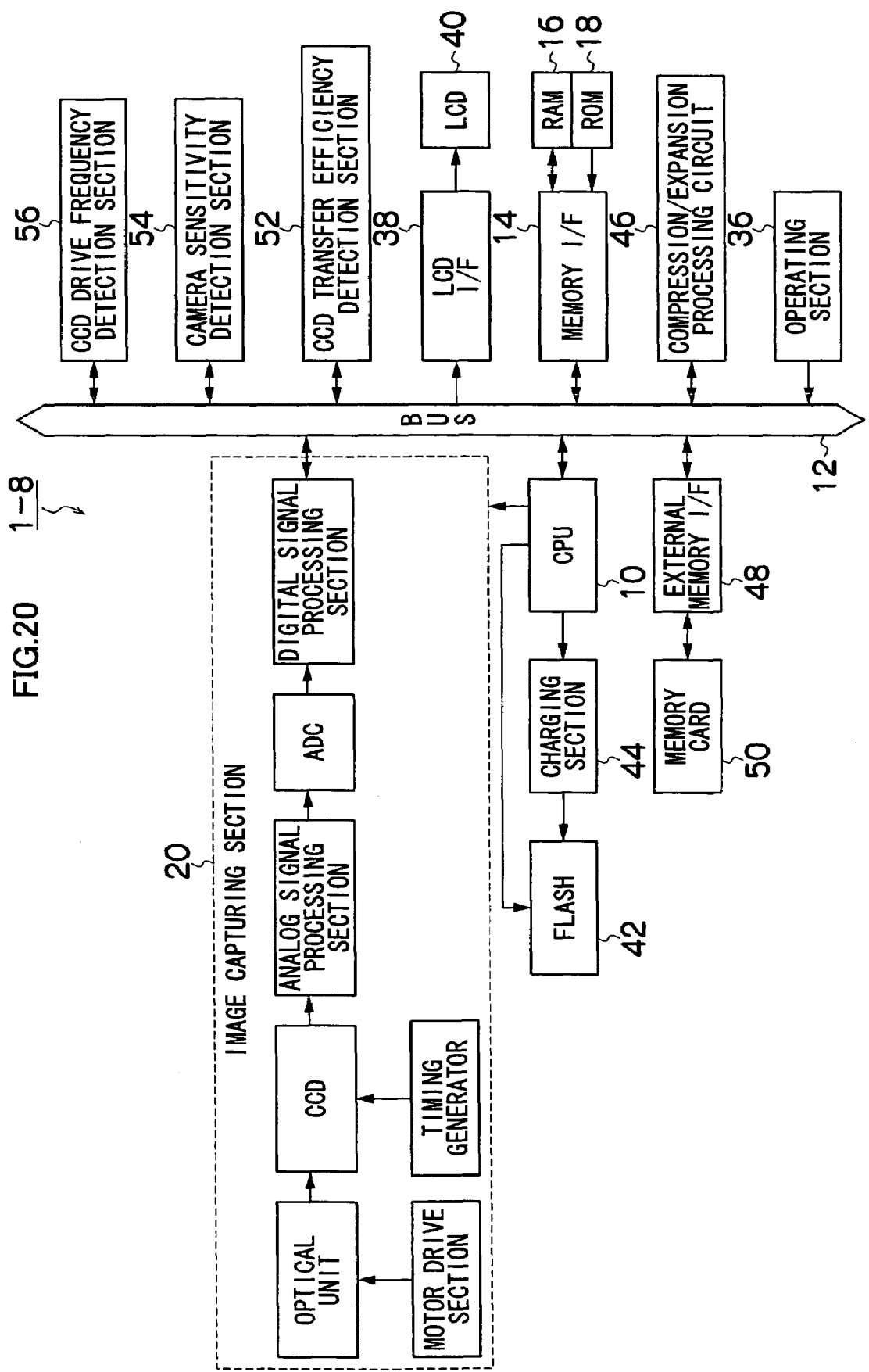
FIG. 20 is a block diagram showing an eighth embodiment of an image capturing apparatus according to the present invention.

FIG. 20 is a block diagram showing an eighth embodiment of an image capturing apparatus according to the present invention. Incidentally, like portions to the block diagrams of the second and third embodiments respectively shown in FIGS. 7 and 9 are assigned like reference characters, and detailed descriptions thereof will be omitted.

A camera 1-8 of the eighth embodiment shown in FIG. 20 differs from the camera 1-2 of the second embodiment in that the camera 1-8 further comprises a CCD drive frequency detection section 56.

In other words, the camera 1-8 comprises the functions of the cameras 1-2 and 1-3 of the second and third embodiments. The digital signal processing section 30 of the camera 1-8 changes signal processing according to the transfer efficiency acquired from the CCD transfer efficiency detection section 52, the camera sensitivity acquired from the camera sensitivity detection section 54 and the CCD drive frequency acquired from the CCD drive frequency detection section 56 in order to suppress deterioration of image quality such as color reproducibility and resolution due to transfer efficiency degradation.

In the present embodiment, the final correction amount a' of the 3 row×3 column color correction matrix coefficient used by the linear matrix circuit 30B of the digital signal processing section 30 is obtained as follows in consideration of transfer efficiency, camera sensitivity and CCD drive frequency.

$$a' = a \times \{2^{(sv-9)}\} \times S \qquad \text{[Equation 7]}$$

The linear matrix circuit 30B performs matrix processing using a color correction matrix coefficient corrected by the final correction amount a' indicated by equation 7 above.

Figure 21:
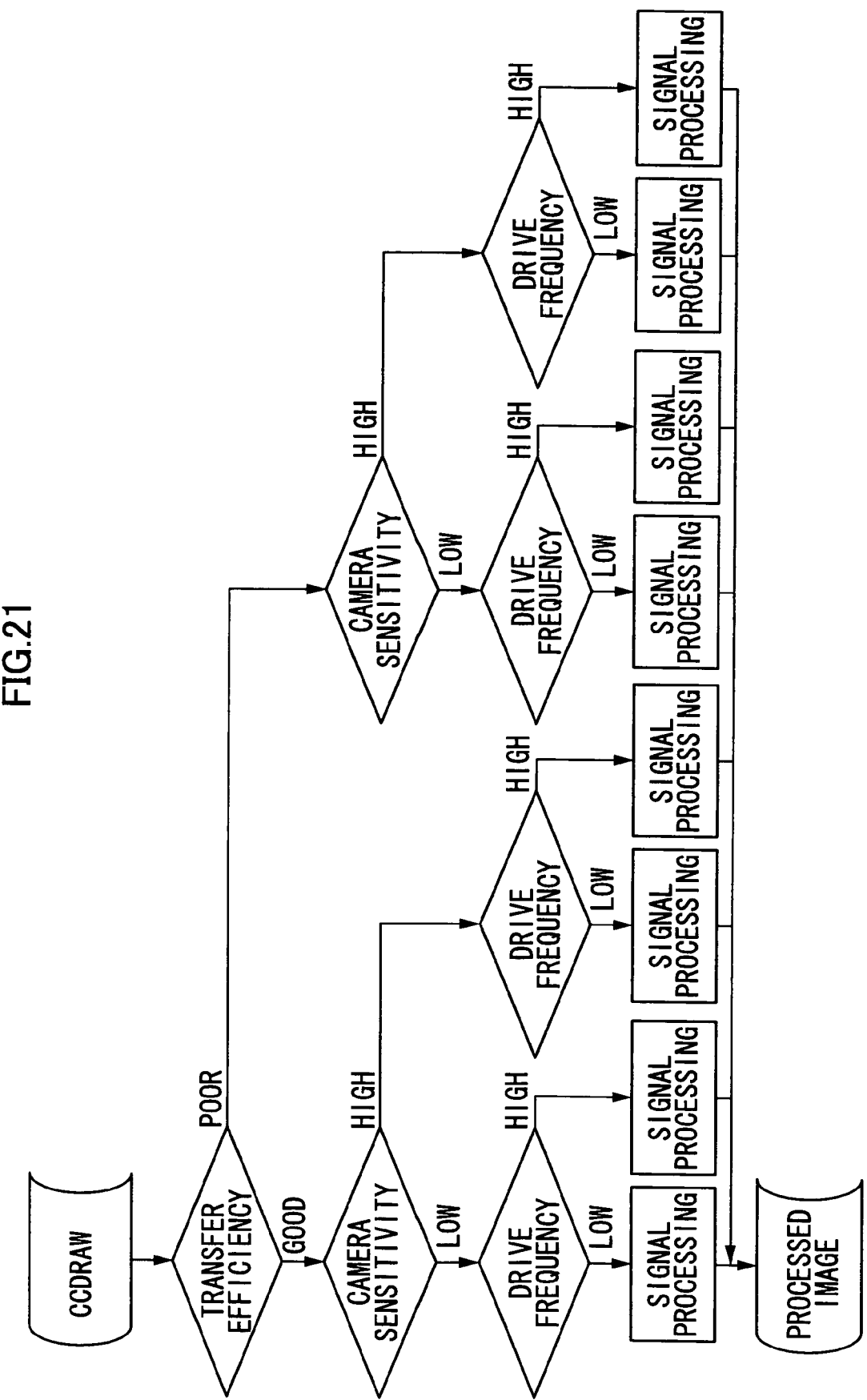
FIG. 21 is a flowchart showing a signal processing method according to the eighth embodiment of the present invention.

FIG. 21 is a flowchart showing a signal processing method according to the eighth embodiment of the present invention.

As shown in FIG. 21, signal processing is selected based on the three types of information of transfer efficiency, camera sensitivity and CCD drive frequency. The digital signal processing section 30 performs the selected signal processing, thereby allowing deterioration of image quality such as color reproducibility or resolution to be suppressed regardless of transfer efficiency, camera sensitivity or CCD drive frequency.

Ninth Embodiment

Figure 22:
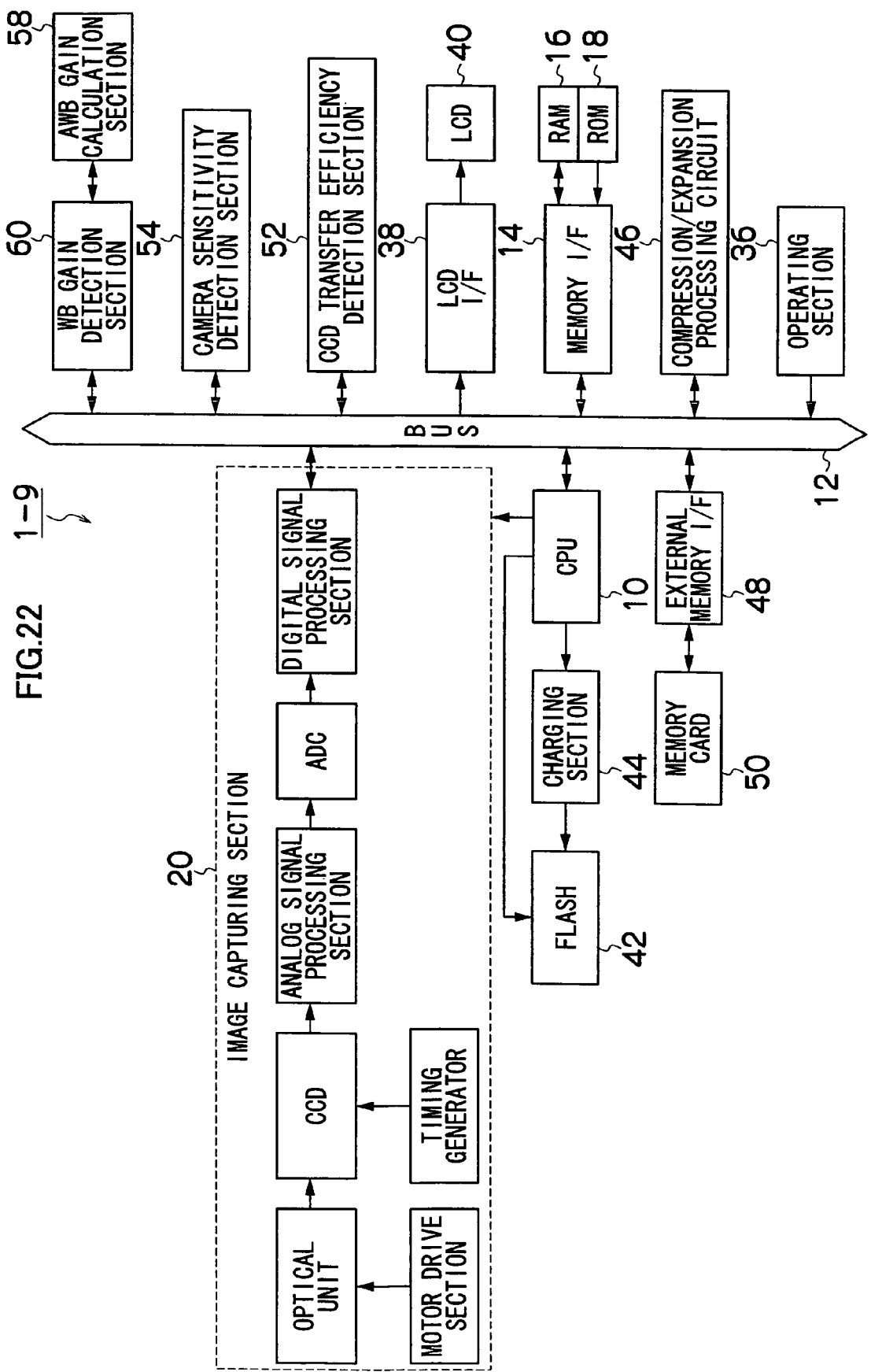
FIG. 22 is a block diagram showing a ninth embodiment of an image capturing apparatus according to the present invention.

FIG. 22 is a block diagram showing a ninth embodiment of an image capturing apparatus according to the present invention. Incidentally, like portions to the block diagrams of the second and fourth embodiments respectively shown in FIGS.

7 and 11 are assigned like reference characters, and detailed descriptions thereof will be omitted.

A camera 1-9 of the ninth embodiment shown in FIG. 22 differs from the camera 1-2 of the second embodiment in that the camera 1-9 further comprises a WB gain detection section 60.

In other words, the camera 1-9 comprises the functions of the cameras 1-2 and 1-4 of the second and fourth embodiments. The digital signal processing section 30 of the camera 1-9 changes signal processing according to the transfer efficiency acquired from the CCD transfer efficiency detection section 52, the camera sensitivity acquired from the camera sensitivity detection section 54 and the WB gain acquired from the WB gain detection section 60 in order to suppress deterioration of image quality such as color reproducibility and resolution due to transfer efficiency degradation.

In the present embodiment, the final correction amount a' of the 3 row×3 column color correction matrix coefficient used by the linear matrix circuit 30B of the digital signal processing section 30 is obtained as follows in consideration of transfer efficiency, camera sensitivity and WB gain.

$$a'=a\times\{2^{\wedge}(sv-9)\}\times U \qquad \text{[Equation 8]}$$

The linear matrix circuit 30B performs matrix processing using a color correction matrix coefficient corrected by the final correction amount a' indicated by equation 8.

Figure 23:
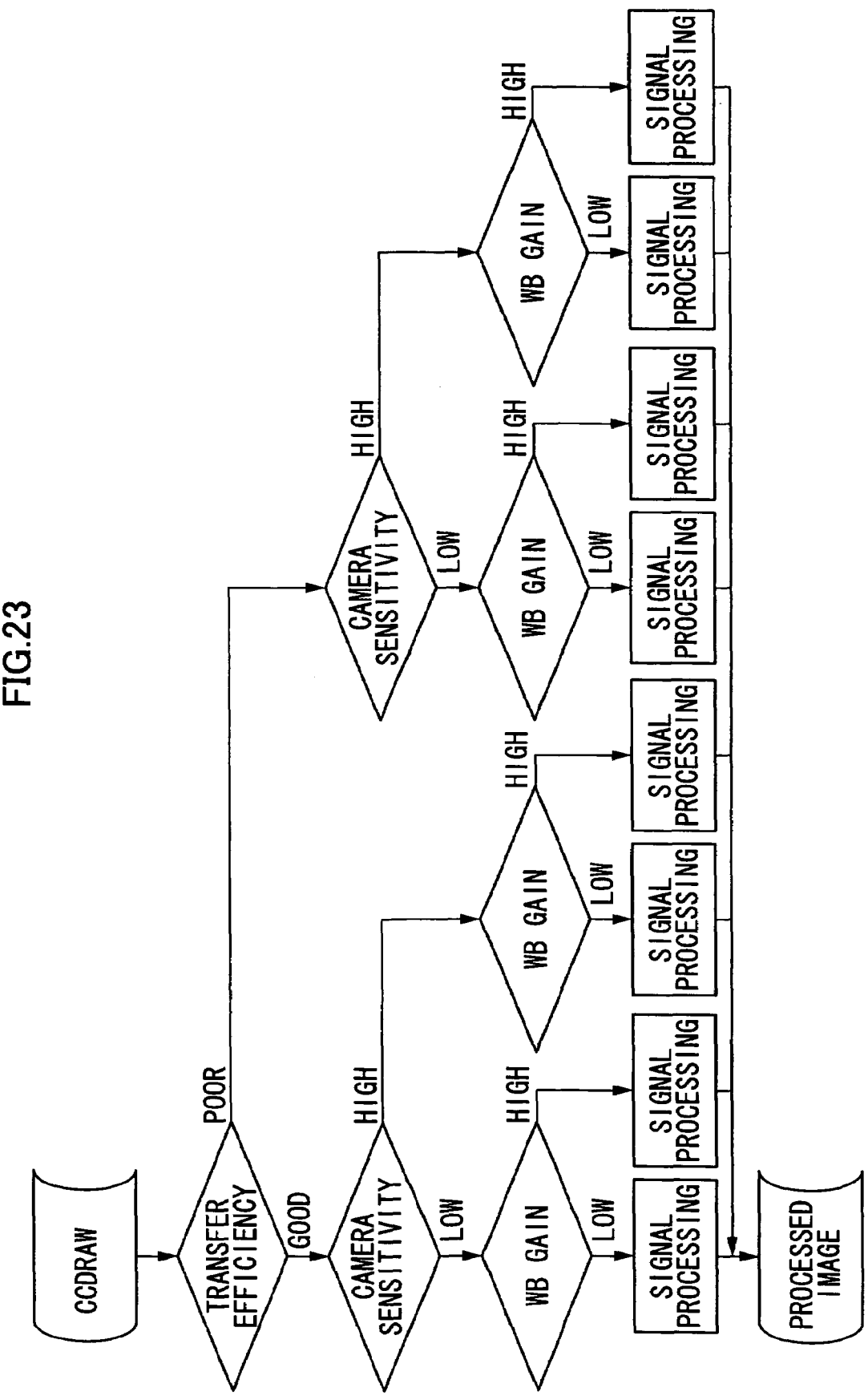
FIG. 23 is a flowchart showing a signal processing method according to the ninth embodiment of the present invention.

FIG. 23 is a flowchart showing a signal processing method according to the ninth embodiment of the present invention.

As shown in FIG. 23, signal processing is selected based on the three types of information of transfer efficiency, camera sensitivity and WB gain. The digital signal processing section 30 performs the selected signal processing, thereby allowing deterioration of image quality such as color reproducibility or resolution to be suppressed regardless of transfer efficiency, camera sensitivity or WB gain.

Tenth Embodiment

Figure 24:
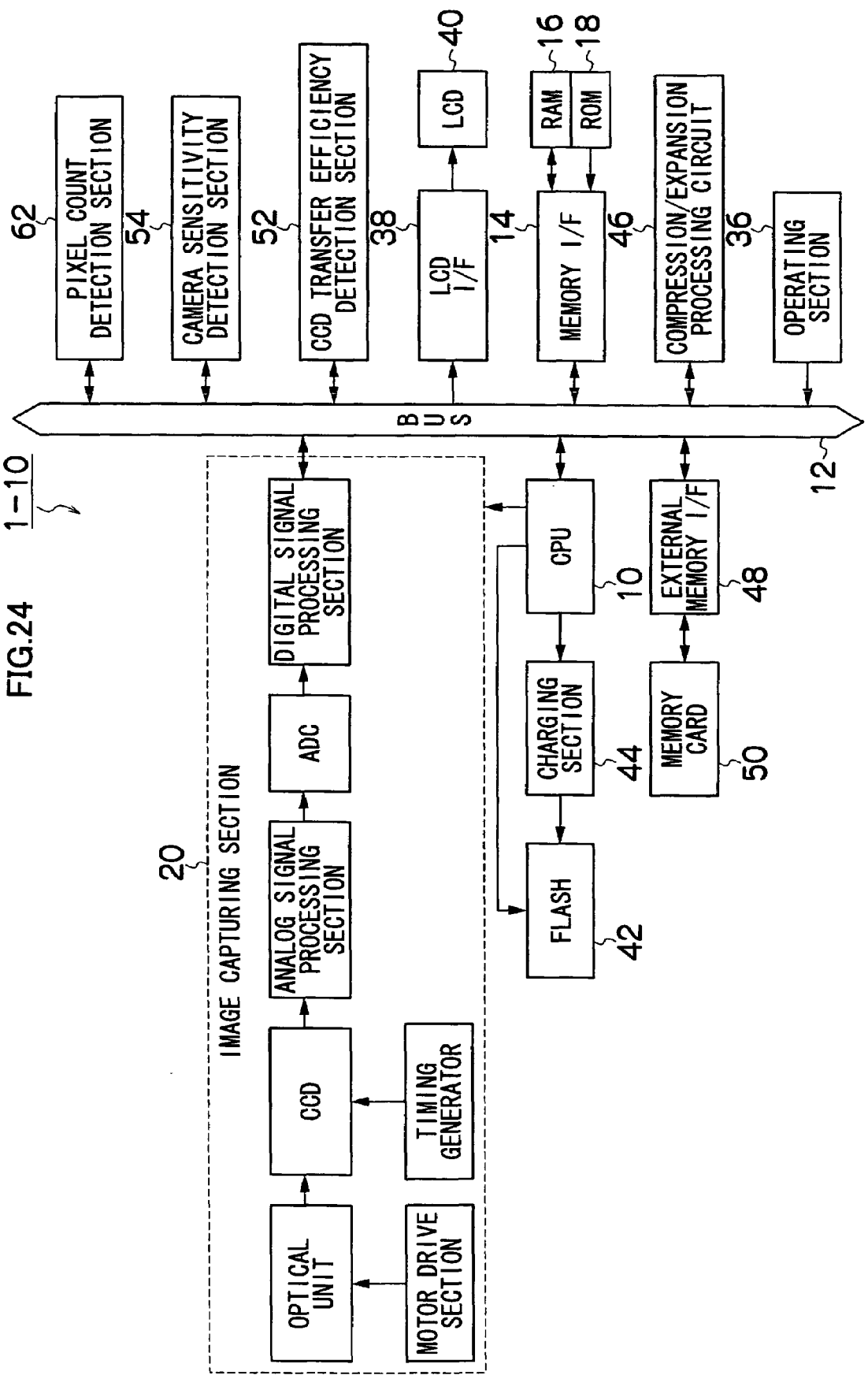
FIG. 24 is a block diagram showing a tenth embodiment of an image capturing apparatus according to the present invention.

FIG. 24 is a block diagram showing a tenth embodiment of an image capturing apparatus according to the present invention. Incidentally, like portions to the block diagrams of the second and fifth embodiments respectively shown in FIGS. 7 and 13 are assigned like reference characters, and detailed descriptions thereof will be omitted.

A camera 1-10 of the tenth embodiment shown in FIG. 24 differs from the camera 1-2 of the second embodiment in that the camera 1-10 further comprises a pixel count detection section 62.

In other words, the camera 1-10 comprises the functions of the cameras 1-2 and 1-5 of the second and fifth embodiments. The digital signal processing section 30 of the camera 1-10 changes signal processing according to the transfer efficiency acquired from the CCD transfer efficiency detection section 52, the camera sensitivity acquired from the camera sensitivity detection section 54 and the pixel count acquired from the pixel count detection section 62 in order to suppress deterioration of image quality such as color reproducibility and resolution due to transfer efficiency degradation.

Figure 25:
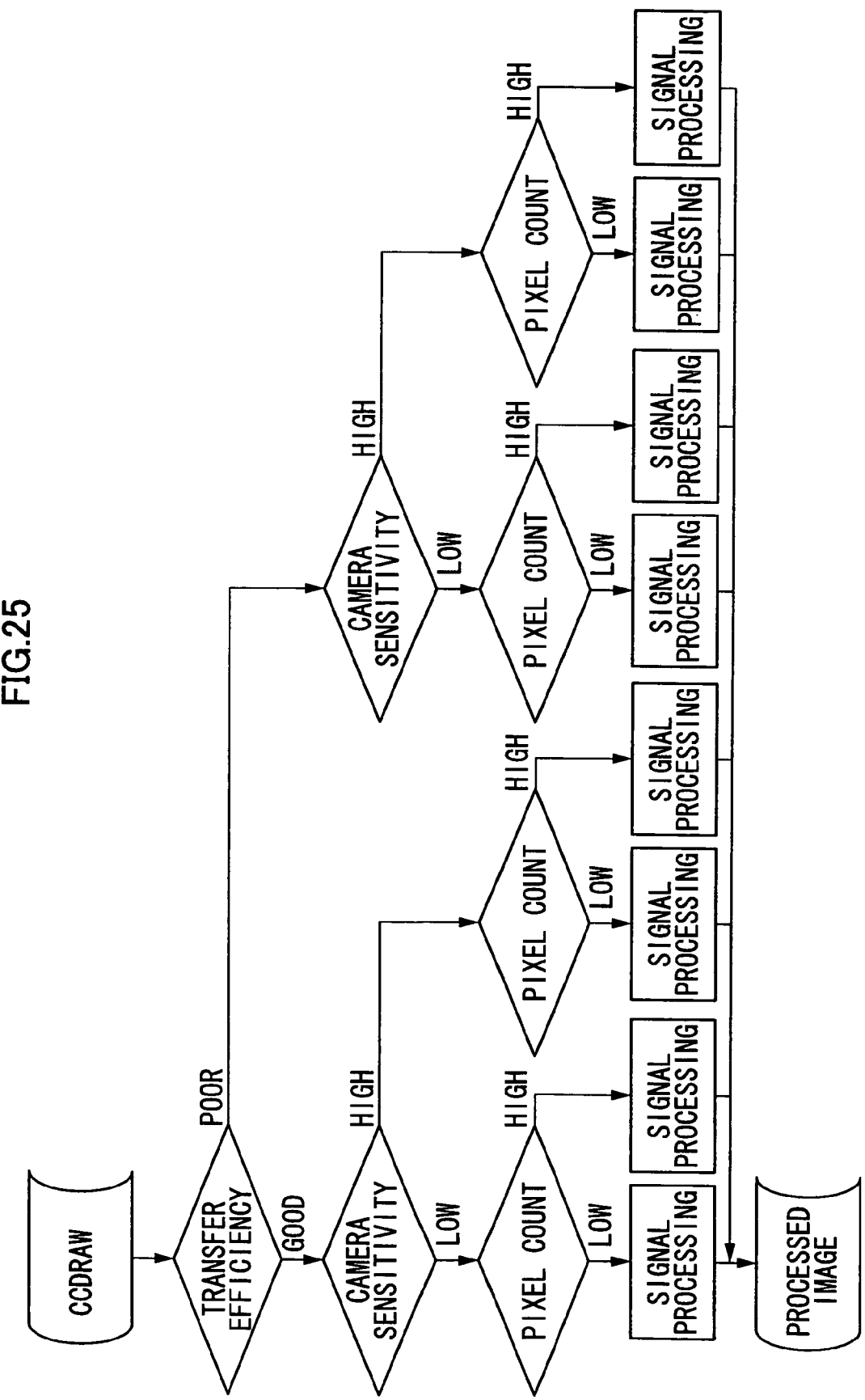
FIG. 25 is a flowchart showing a signal processing method according to the tenth embodiment of the present invention.

FIG. 25 is a flowchart showing a signal processing method according to the tenth embodiment of the present invention.

As shown in FIG. 23, signal processing is selected based on the three types of information of transfer efficiency, camera sensitivity and pixel count. The digital signal processing section 30 performs the selected signal processing, thereby allowing deterioration of image quality such as color reproducibility or resolution to be suppressed regardless of transfer efficiency, camera sensitivity or pixel count.

Eleventh Embodiment

Figure 26:
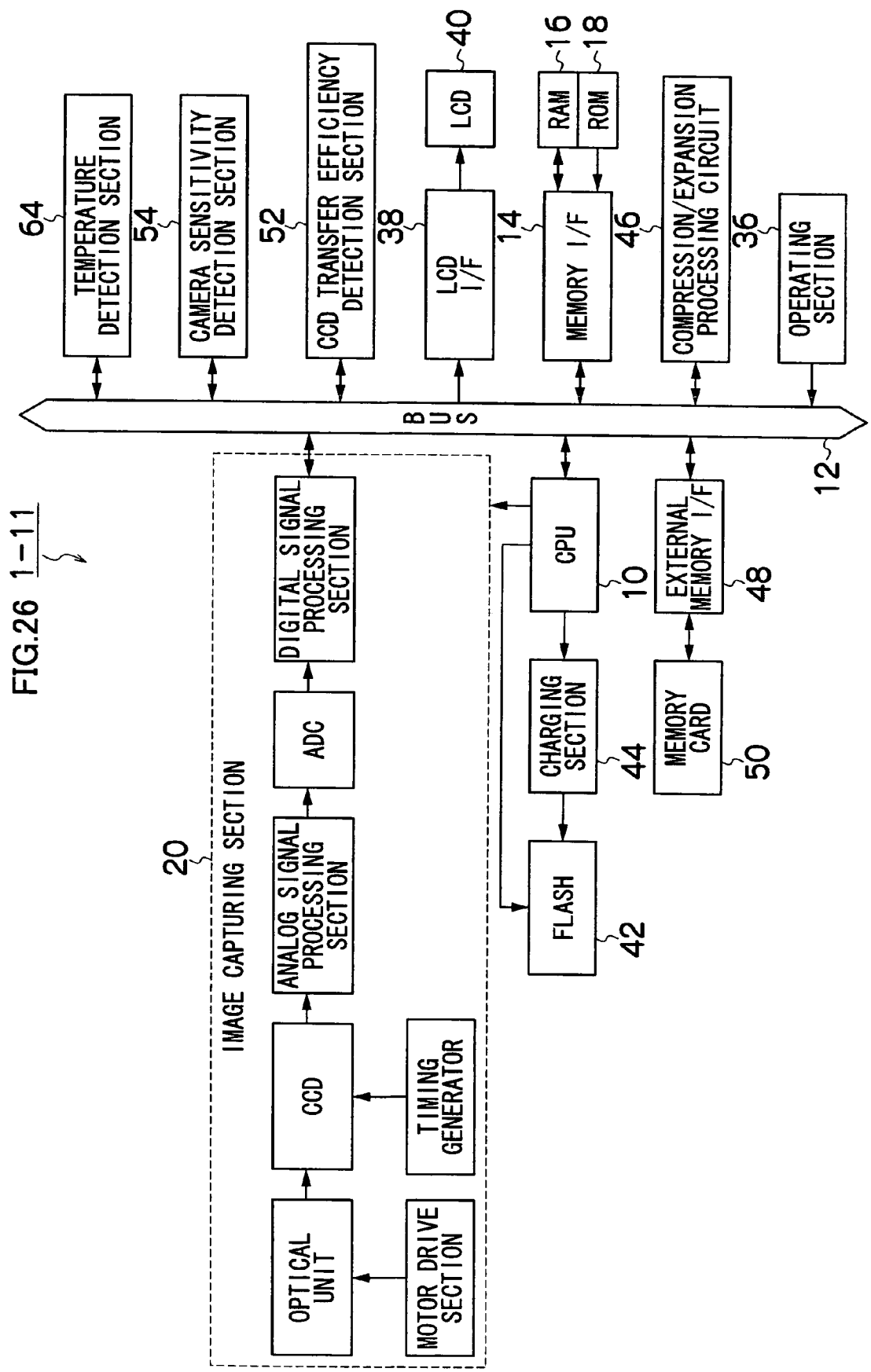
FIG. 26 is a block diagram showing an eleventh embodiment of an image capturing apparatus according to the present invention.

FIG. 26 is a block diagram showing an eleventh embodiment of an image capturing apparatus according to the present invention. Incidentally, like portions to the block diagrams of the second and sixth embodiments respectively shown in FIGS. 7 and 16 are assigned like reference characters, and detailed descriptions thereof will be omitted.

A camera 1-11 of the sixth embodiment shown in FIG. 26 differs from the camera 1-2 of the second embodiment in that the camera 1-11 further comprises a temperature detection section 64.

In other words, the camera 1-11 comprises the functions of the cameras 1-2 and 1-6 of the second and sixth embodiments. The digital signal processing section 30 of the camera 1-11 changes signal processing according to the transfer efficiency acquired from the CCD transfer efficiency detection section 52, the camera sensitivity acquired from the camera sensitivity detection section 54 and the temperature of the CCD 24 acquired by the temperature detection section 64 in order to suppress deterioration of image quality such as color reproducibility and resolution due to transfer efficiency degradation.

In the present embodiment, the final correction amount a' of the 3 row×3 column color correction matrix coefficient used by the linear matrix circuit 30B of the digital signal processing section 30 is obtained as follows in consideration of transfer efficiency, camera sensitivity and temperature.

$$a'=a\times\{2^{\wedge}(sv-9)\}\times W \qquad \text{[Equation 9]}$$

The linear matrix circuit 30B performs matrix processing using a color correction matrix coefficient corrected by the final correction amount a' indicated by equation 9.

Figure 27:
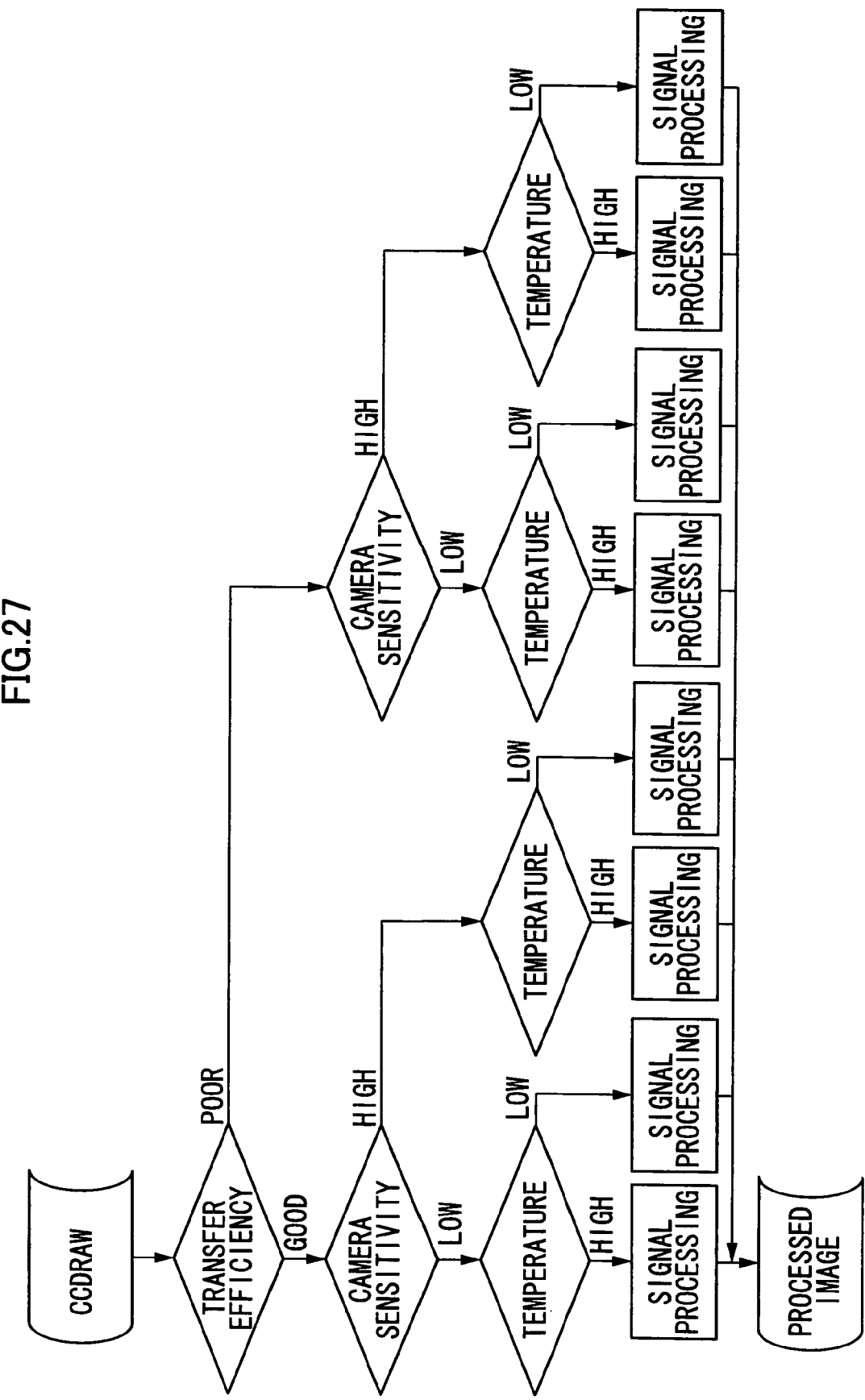
FIG. 27 is a flowchart showing a signal processing method according to the eleventh embodiment of the present invention.

FIG. 27 is a flowchart showing a signal processing method according to the eleventh embodiment of the present invention.

As shown in FIG. 27, signal processing is selected based on the three types of information of transfer efficiency, camera sensitivity and temperature. The digital signal processing section 30 performs the selected signal processing, thereby allowing deterioration of image quality such as color reproducibility or resolution to be suppressed regardless of transfer efficiency, camera sensitivity or temperature.

Twelfth Embodiment

Figure 28:
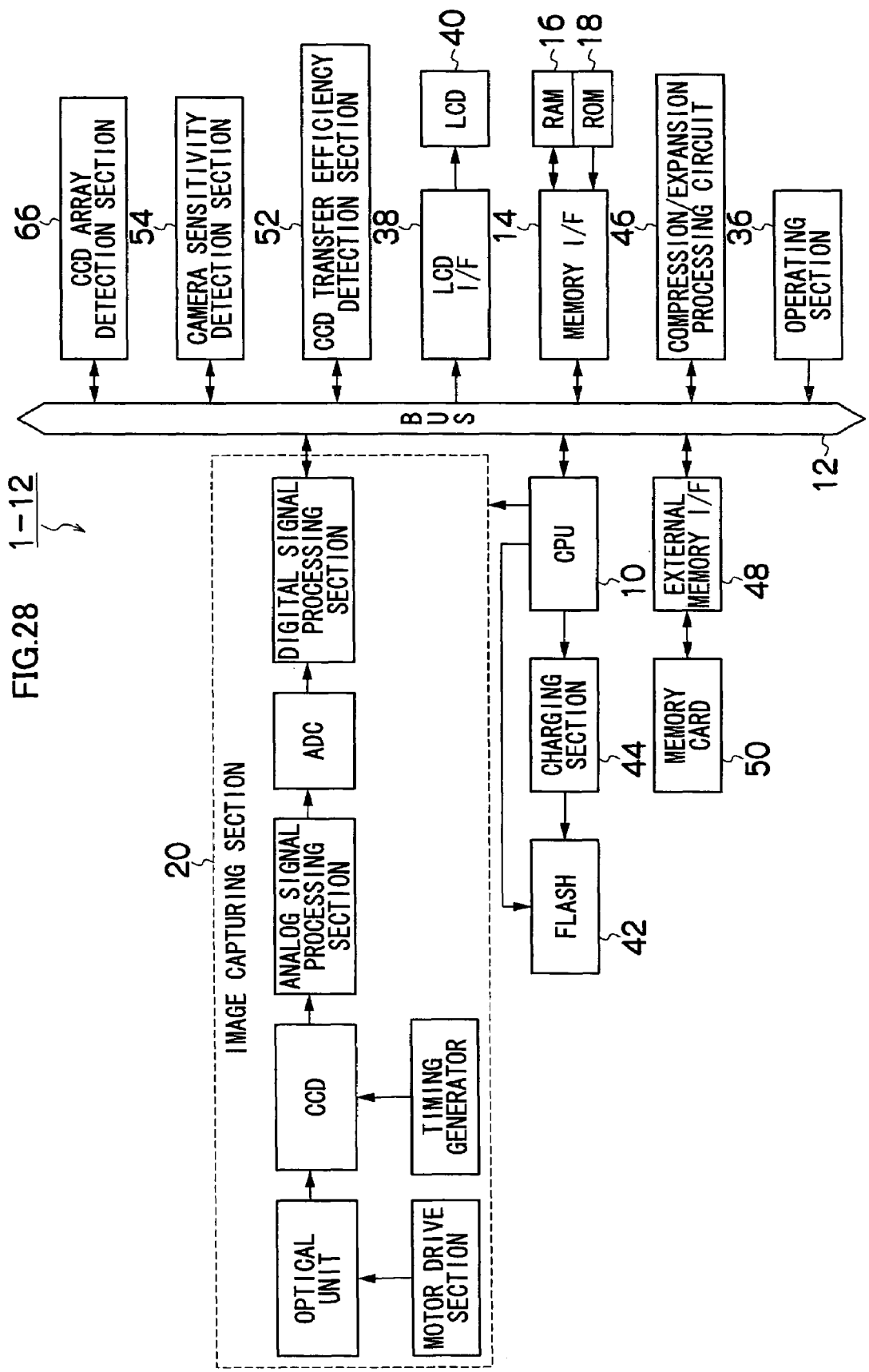
FIG. 28 is a block diagram showing a twelfth embodiment of an image capturing apparatus according to the present invention.

FIG. 28 is a block diagram showing a twelfth embodiment of an image capturing apparatus according to the present invention. Incidentally, like portions to the block diagrams of the second and seventh embodiments respectively shown in FIGS. 7 and 18 are assigned like reference characters, and detailed descriptions thereof will be omitted.

A camera 1-12 of the twelfth embodiment shown in FIG. 28 differs from the camera 1-2 of the second embodiment in that the camera 1-12 further comprises a CCD array detection section 66.

In other words, the camera 1-12 comprises the functions of the cameras 1-2 and 1-7 of the second and seventh embodiments. The digital signal processing section 30 of the camera 1-12 changes signal processing according to the transfer efficiency acquired from the CCD transfer efficiency detection section 52, the camera sensitivity acquired from the camera sensitivity detection section 54 and the CCD array acquired from the CCD array detection section 66 in order to suppress deterioration of image quality such as color reproducibility and resolution due to transfer efficiency degradation.

Therefore, the digital signal processing section 30 changes the 3 row×3 column color correction coefficient used by the linear matrix circuit 30B according to transfer efficiency, camera sensitivity and CCD array to perform matrix processing, and calculates the color-corrected R, G and B signals.

Alternatively, a correction amount relating to the CCD array may be added to the WB gains in order to maintain color reproducibility regardless of CCD array. In addition, respectively correcting gains per field or performing filtering by LPF may be considered in order to correct field bumps.

Figure 29:
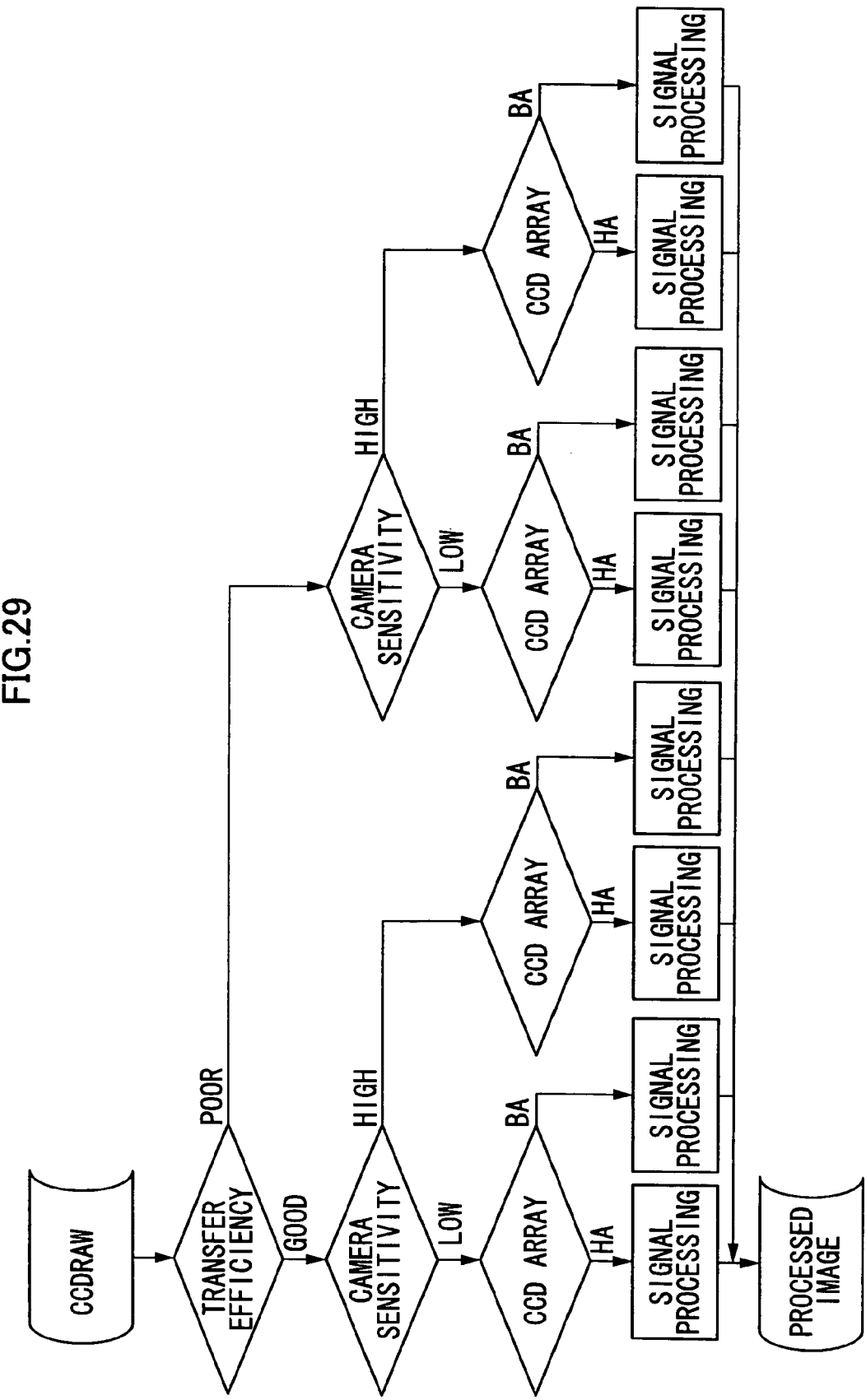
FIG. 29 is a flowchart showing a signal processing method according to the twelfth embodiment of the present invention.

FIG. 29 is a flowchart showing a signal processing method according to the twelfth embodiment of the present invention.

As shown in FIG. 23, signal processing is selected based on the three types of information of transfer efficiency, camera sensitivity and color filter array. The digital signal processing section 30 performs the selected signal processing, thereby allowing deterioration of image quality such as color reproducibility or resolution to be suppressed regardless of transfer efficiency, camera sensitivity or color filter array.

Thirteenth Embodiment

Figure 30:
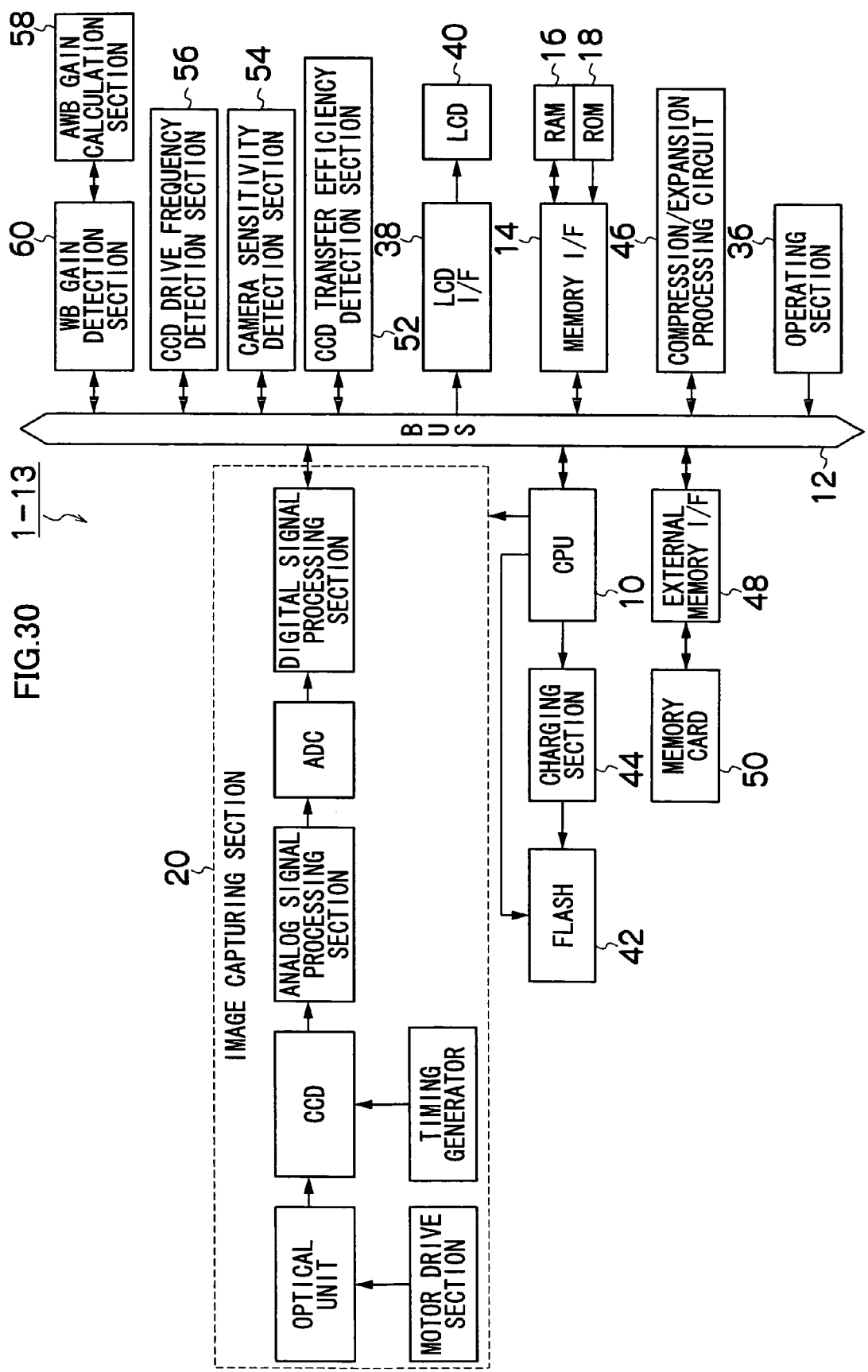
FIG. 30 is a block diagram showing a thirteenth embodiment of an image capturing apparatus according to the present invention.

FIG. 30 is a block diagram showing a thirteenth embodiment of an image capturing apparatus according to the present invention. Incidentally, like portions to the block diagrams of the fourth and eighth embodiments respectively shown in FIGS. 11 and 20 are assigned like reference characters, and detailed descriptions thereof will be omitted.

A camera 1-13 of the thirteenth embodiment shown in FIG. 30 differs from the camera 1-8 of the eighth embodiment in that the camera 1-13 further comprises a WB gain detection section 60.

In other words, the camera 1-13 comprises the functions of the cameras 1-4 and 1-8 of the fourth and eighth embodiments. The digital signal processing section 30 of the camera 1-13 changes signal processing according to the transfer efficiency acquired from the CCD transfer efficiency detection section 52, the camera sensitivity acquired from the camera sensitivity detection section 54, the CCD drive frequency acquired from the CCD drive frequency detection section 56 and the WB gain acquired from the WB gain detection section 60 in order to suppress deterioration of image quality such as color reproducibility and resolution due to transfer efficiency degradation.

In the present embodiment, the final correction amount a' of the 3 row×3 column color correction matrix coefficient used by the linear matrix circuit 30B of the digital signal processing section 30 is obtained as follows in consideration of transfer efficiency, camera sensitivity, CCD drive frequency and WB gain.

$$a' = a \times \{2^{(sv-9)}\} \times S \times U \qquad \text{[Equation 10]}$$

The linear matrix circuit 30B performs matrix processing using a color correction matrix coefficient corrected by the final correction amount a' indicated by equation 10.

Figure 31:
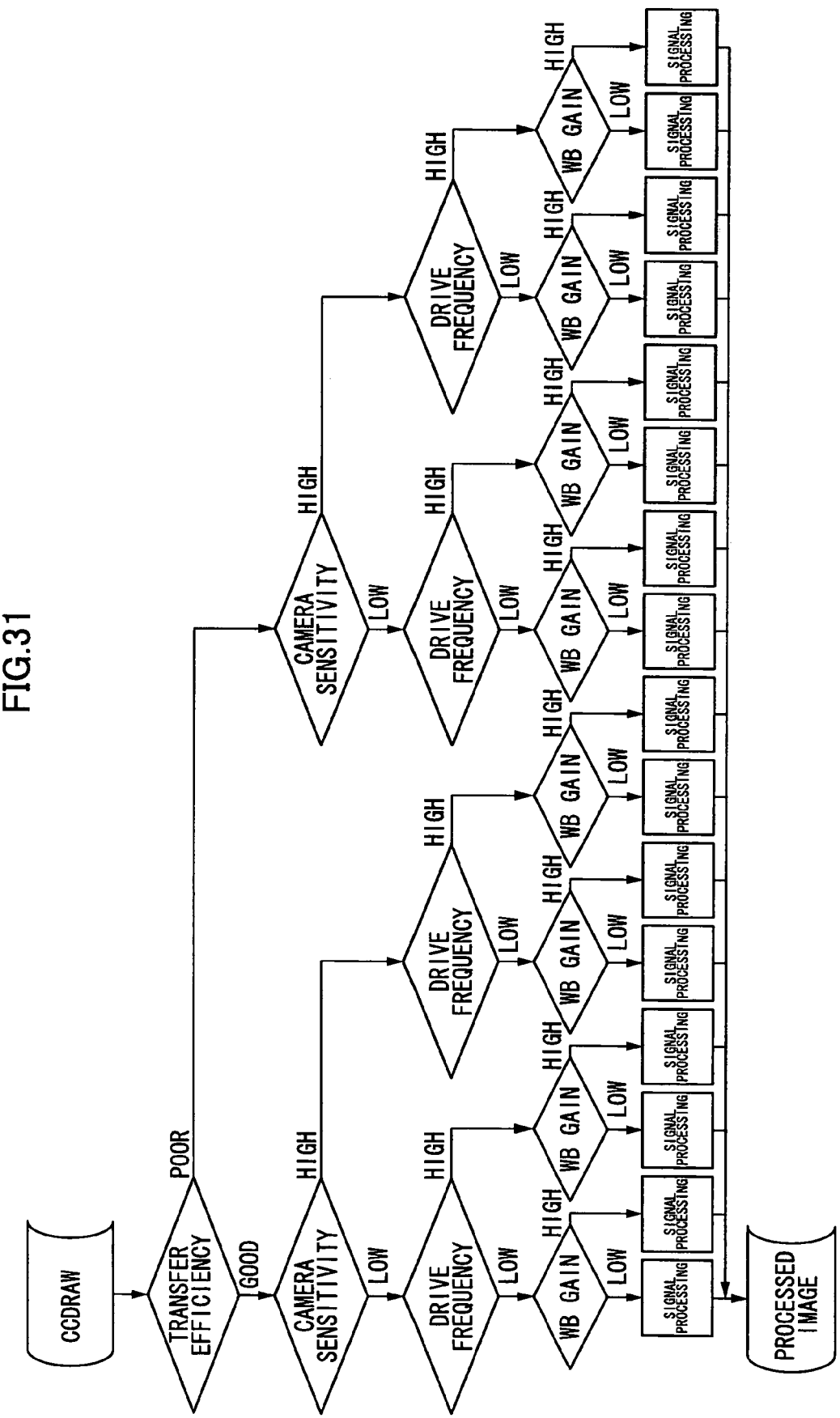
FIG. 31 is a flowchart showing a signal processing method according to the thirteenth embodiment of the present invention.

FIG. 31 is a flowchart showing a signal processing method according to the thirteenth embodiment of the present invention.

As shown in FIG. 31, signal processing is selected based on the four types of information of transfer efficiency, camera sensitivity, CCD drive frequency and WB gain. The digital signal processing section 30 performs the selected signal processing, thereby allowing deterioration of image quality such as color reproducibility or resolution to be suppressed regardless of transfer efficiency, camera sensitivity, CCD drive frequency and WB gain.

Fourteenth Embodiment

Figure 32:
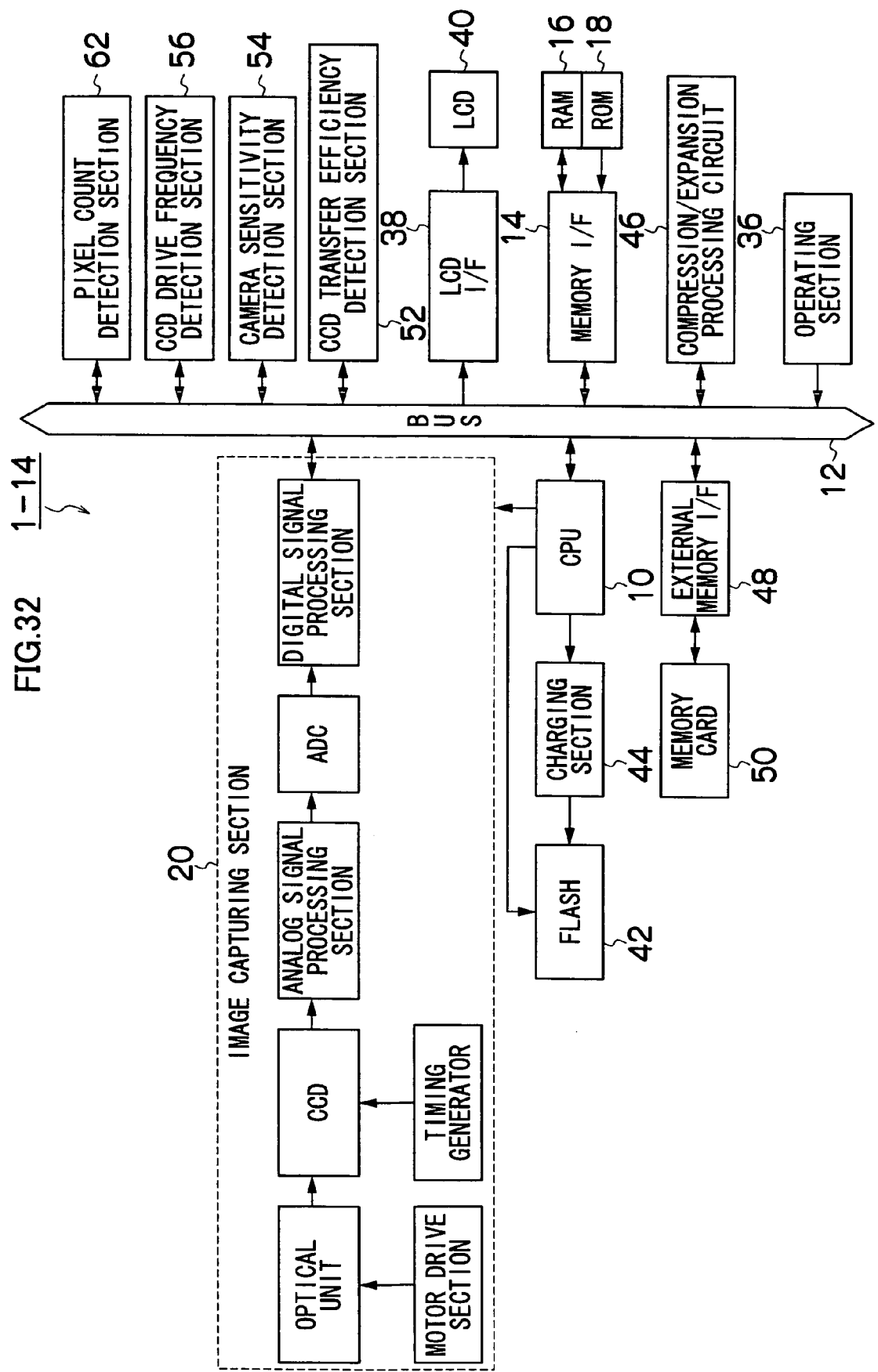
FIG. 32 is a block diagram showing a fourteenth embodiment of an image capturing apparatus according to the present invention.

FIG. 32 is a block diagram showing a fourteenth embodiment of an image capturing apparatus according to the present invention. Incidentally, like portions to the block diagrams of the fifth and eighth embodiments respectively shown in FIGS. 13 and 20 are assigned like reference characters, and detailed descriptions thereof will be omitted.

A camera 1-14 of the fourteenth embodiment shown in FIG. 32 differs from the camera 1-8 of the eighth embodiment in that the camera 1-14 further comprises a pixel count detection section 62.

In other words, the camera 1-14 comprises the functions of the cameras 1-5 and 1-8 of the fifth and eighth embodiments. The digital signal processing section 30 of the camera 1-14 changes signal processing according to the transfer efficiency acquired from the CCD transfer efficiency detection section 52, the camera sensitivity acquired from the camera sensitivity detection section 54, the CCD drive frequency acquired from the CCD drive frequency detection section 56, and the pixel count acquired from the pixel count detection section 62 in order to suppress deterioration of image quality such as color reproducibility and resolution due to transfer efficiency degradation.

Figure 33:
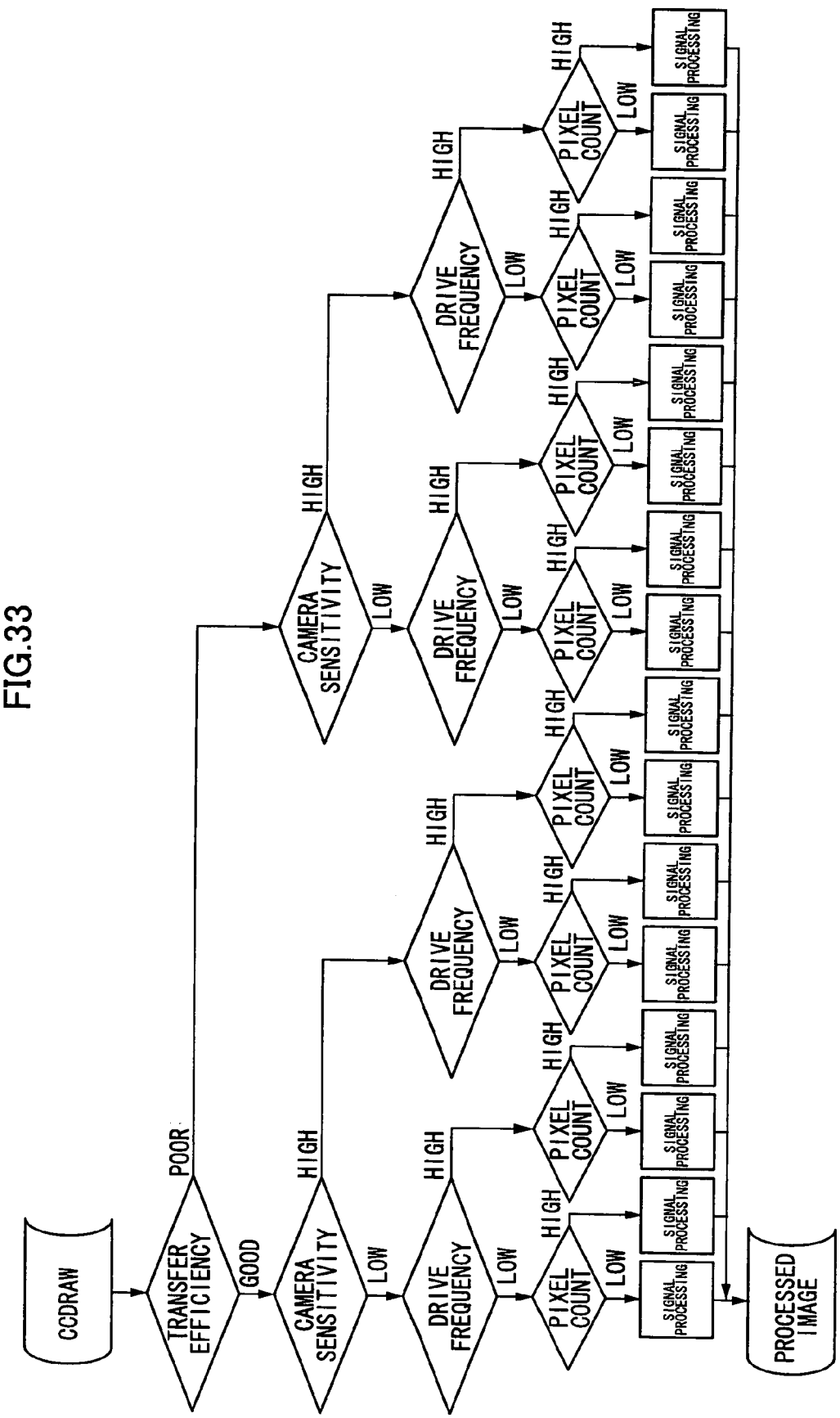
FIG. 33 is a flowchart showing a signal processing method according to the fourteenth embodiment of the present invention.

FIG. 33 is a flowchart showing a signal processing method according to the fourteenth embodiment of the present invention.

As shown in FIG. 33, signal processing is selected based on the four types of information of transfer efficiency, camera sensitivity, CCD drive frequency and pixel count. The digital signal processing section 30 performs the selected signal processing, thereby allowing deterioration of image quality such as color reproducibility or resolution to be suppressed regardless of transfer efficiency, camera sensitivity, CCD drive frequency and pixel count.

Fifteenth Embodiment

Figure 34:
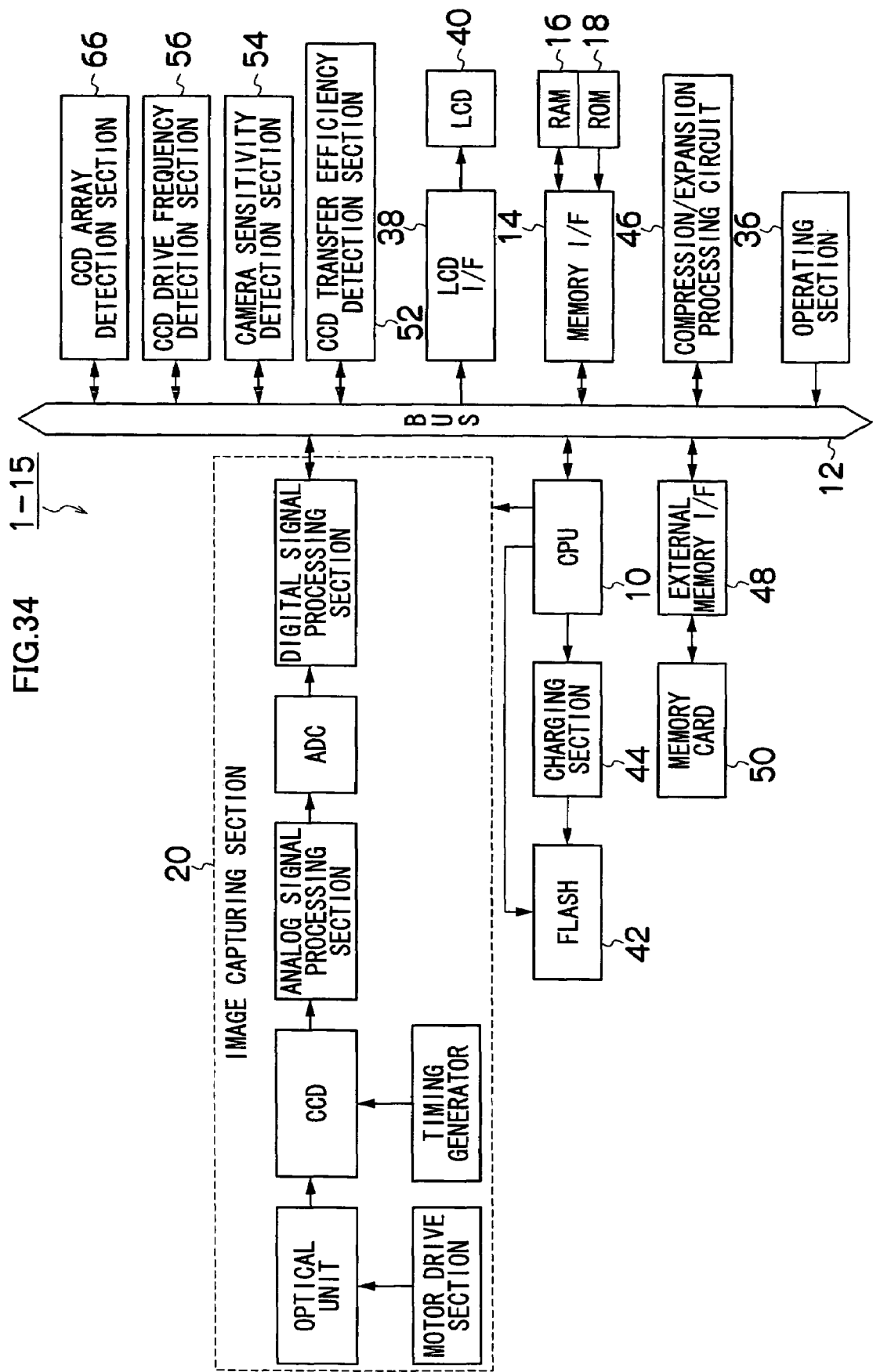
FIG. 34 is a block diagram showing a fifteenth embodiment of an image capturing apparatus according to the present invention.

FIG. 34 is a block diagram showing a fifteenth embodiment of an image capturing apparatus according to the present invention. Incidentally, like portions to the block diagrams of the seventh and eighth embodiments respectively shown in FIGS. 18 and 20 are assigned like reference characters, and detailed descriptions thereof will be omitted.

A camera 1-15 of the fifteenth embodiment shown in FIG. 34 differs from the camera 1-8 of the eighth embodiment in that the camera 1-15 further comprises a CCD array detection section 66.

In other words, the camera 1-15 comprises the functions of the cameras 1-7 and 1-8 of the seventh and eighth embodiments. The digital signal processing section 30 of the camera 1-15 changes signal processing according to the transfer efficiency acquired from the CCD transfer efficiency detection section 52, the camera sensitivity acquired from the camera sensitivity detection section 54, the CCD drive frequency acquired from the CCD drive frequency detection section 56 and the CCD array acquired from the CCD array detection section 66 in order to suppress deterioration of image quality such as color reproducibility and resolution due to transfer efficiency degradation.

Figure 35:
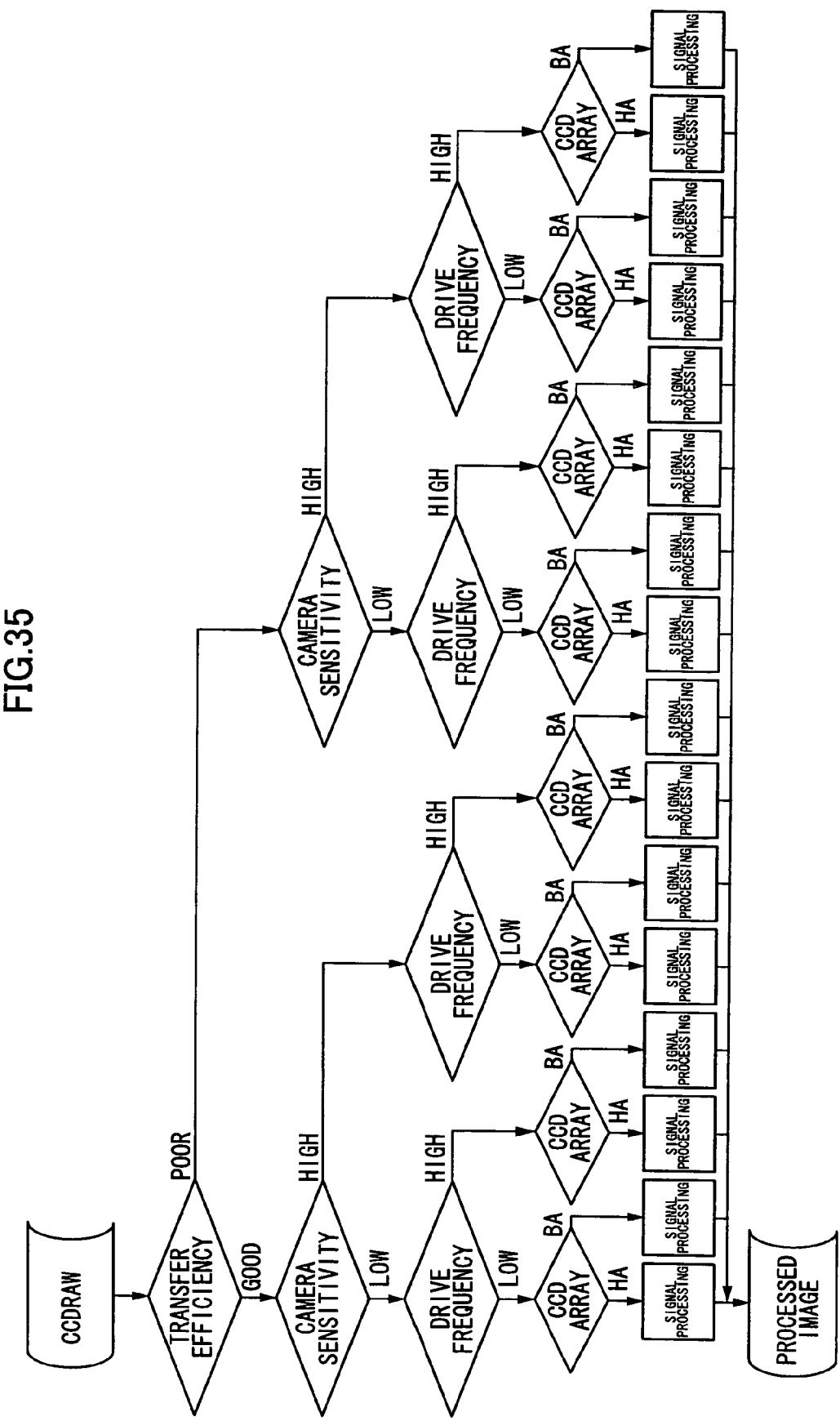
FIG. 35 is a flowchart showing a signal processing method according to the fifteenth embodiment of the present invention.

FIG. 35 is a flowchart showing a signal processing method according to the fifteenth embodiment of the present invention.

As shown in FIG. 35, signal processing is selected based on the four types of information of transfer efficiency, camera sensitivity, CCD drive frequency and CCD array. The digital signal processing section 30 performs the selected signal processing, thereby allowing deterioration of image quality such as color reproducibility or resolution to be suppressed regardless of transfer efficiency, camera sensitivity, drive frequency and CCD array.

Sixteenth Embodiment

Figure 36:
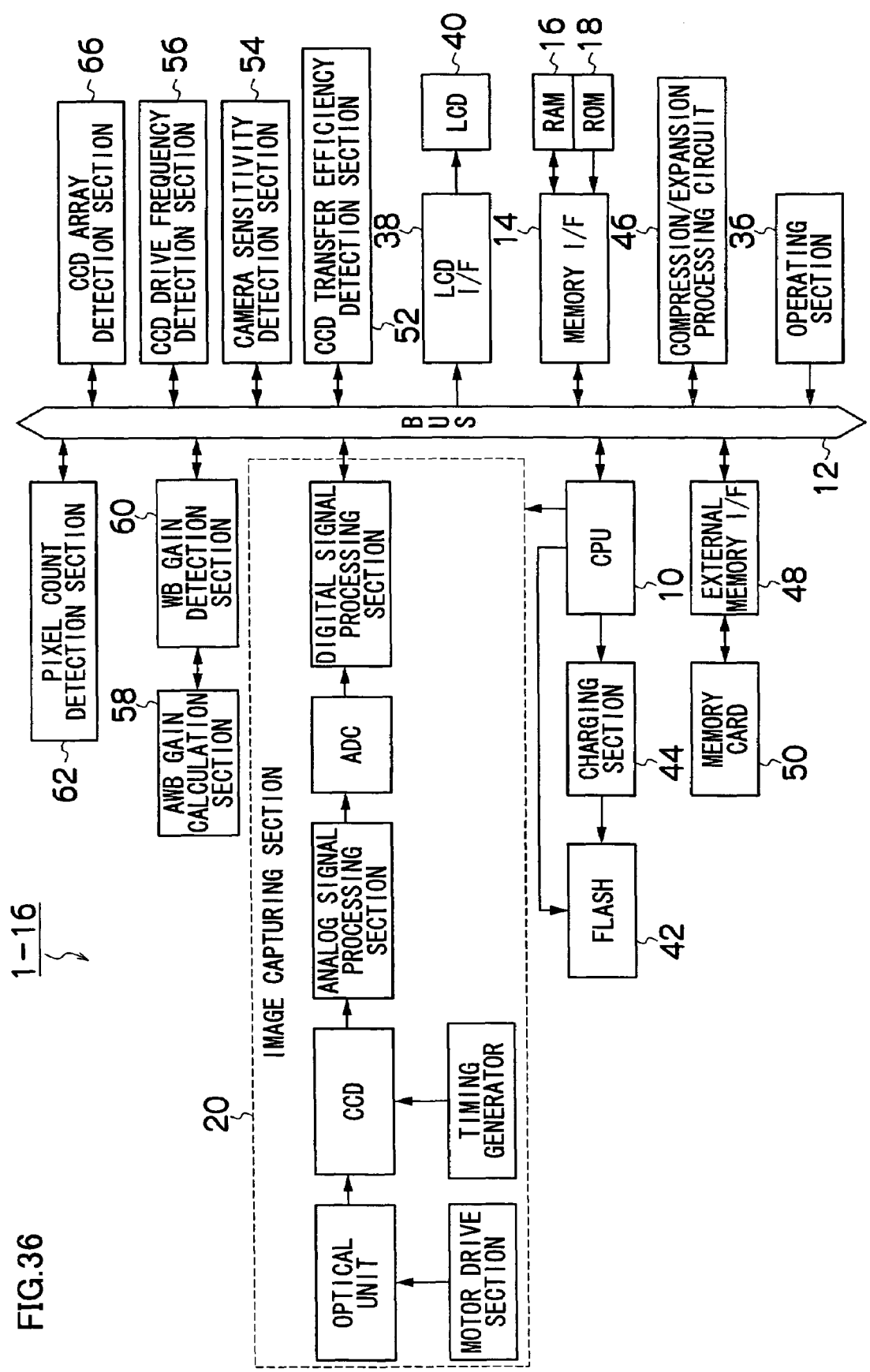
FIG. 36 is a block diagram showing a sixteenth embodiment of an image capturing apparatus according to the present invention.

FIG. 36 is a block diagram showing a sixteenth embodiment of an image capturing apparatus according to the present invention. Incidentally, like portions to the block diagrams of the sixth and fifteenth embodiments shown in FIGS. 11, 13, 16 and 34 are assigned like reference characters, and detailed descriptions thereof will be omitted.

A camera 1-16 of the sixteenth embodiment shown in FIG. 36 differs from the camera 1-15 of the fifteenth embodiment in that the camera 1-15 further comprises a WB gain detection section 60, a pixel count detection section 62 and a temperature detection section 64.

In other words, the camera 1-16 comprises the functions of the cameras 1-4, 1-5, 1-6 and 1-15 of the seventh and eighth embodiments. The digital signal processing section 30 of the camera 1-16 changes signal processing according to the transfer efficiency acquired from the CCD transfer efficiency detection section 52, the camera sensitivity acquired from the camera sensitivity detection section 54, the CCD drive frequency acquired from the CCD drive frequency detection section 56, the WB gain acquired from the WB gain detection section 60, the pixel count acquired from the pixel count detection section 62, the temperature acquired from the temperature detection section 64, and the CCD array acquired from the CCD array detection section 66 in order to suppress deterioration of image quality such as color reproducibility and resolution due to transfer efficiency degradation.

Figure 37:
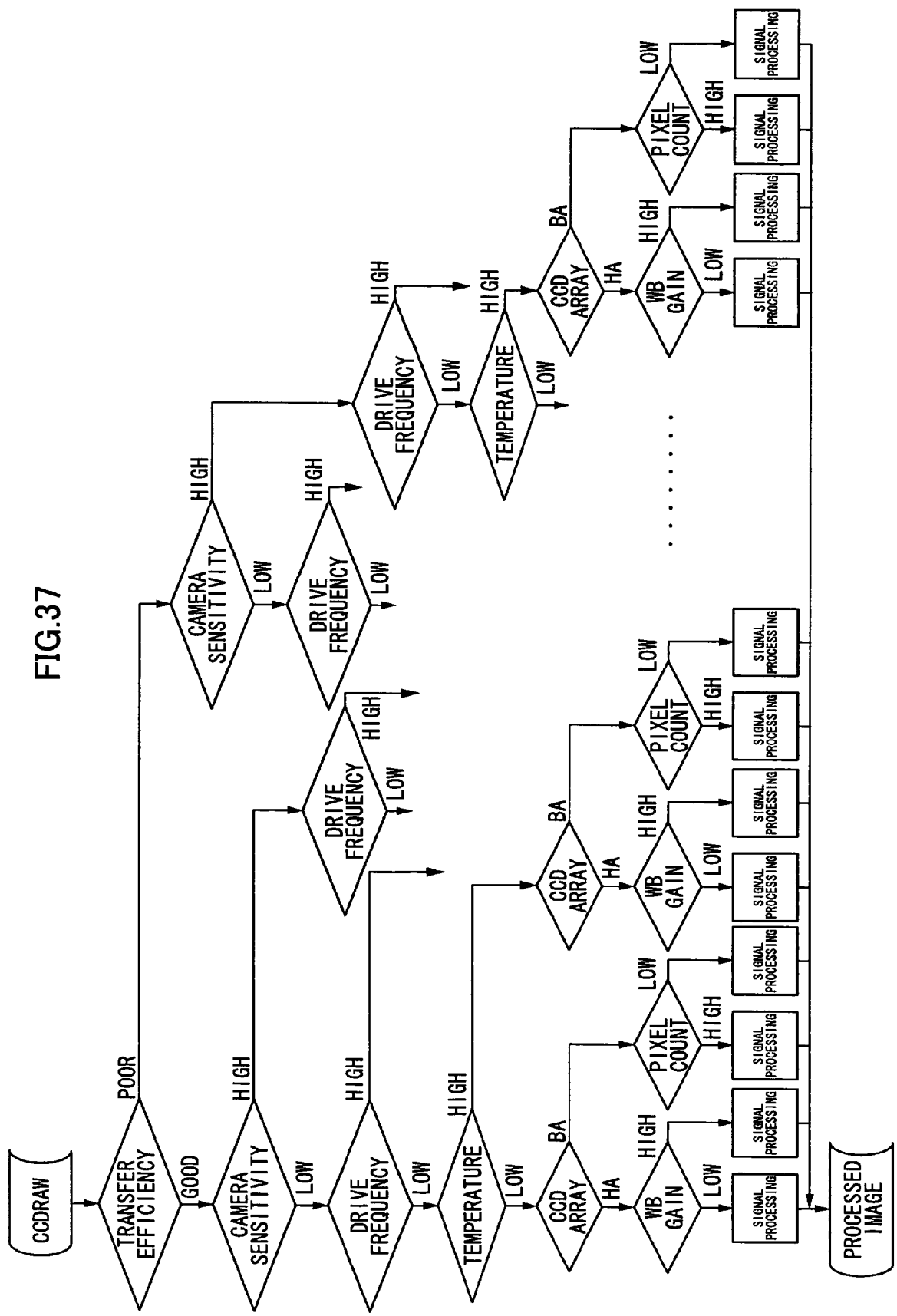
FIG. 37 is a flowchart showing a signal processing method according to the sixteenth embodiment of the present invention.

FIG. 37 is a flowchart showing a signal processing method according to the sixteenth embodiment of the present invention.

As shown in FIG. 37, signal processing is selected based on the seven types of information of transfer efficiency, camera sensitivity, CCD drive frequency, WB gain, pixel count, temperature and CCD array. The digital signal processing section 30 performs the selected signal processing, thereby allowing deterioration of image quality such as color reproducibility or resolution to be suppressed regardless of transfer efficiency, camera sensitivity, drive frequency, WB gain, pixel count, temperature, and CCD array.

While the signal processing shown in the flowcharts of FIG. 37 and the like have been arranged to change signal processing by bifurcating for each of the seven types of information of transfer efficiency, camera sensitivity, CCD drive frequency, WB gain, pixel count, temperature and CCD array, the present embodiment is not limited to this arrangement, and may be arranged to respectively change signal processing in stages or continuously for each information type. In addition, information used to change signal processing is not limited to those used in the first to sixteenth embodiments, and an appropriate combination of the seven information types may be used. Moreover, information other than the seven information types may be included.

Seventeenth Embodiment

Figure 38:
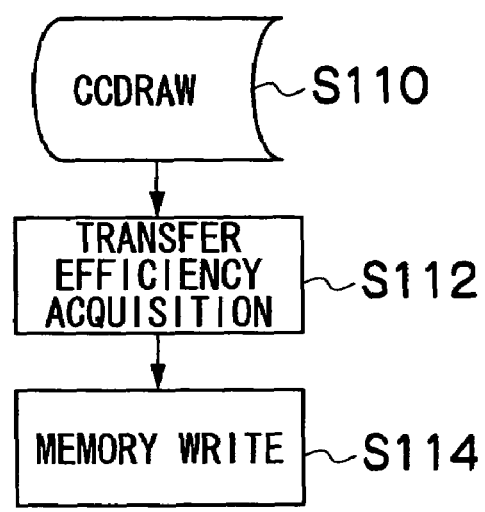
FIG. 38 is a diagram showing a flow of basic processing for storing and retaining required transfer efficiencies in order to use transfer efficiencies in signal processing.

FIG. 38 is a diagram showing a signal processing method according to a seventeenth embodiment of the present invention, and illustrates a basic processing flow of storing and retaining required transfer efficiencies in order to use transfer efficiencies in signal processing.

As shown in FIG. 38, R, G and B CCD-RAW data are inputted from the CCD 24 (step S110). Transfer efficiency is calculated based on the inputted CCD-RAW data (step S112), and the calculated transfer efficiency is written into the ROM 18 or a memory such as a flash ROM, not shown (step S114).

Figure 39:
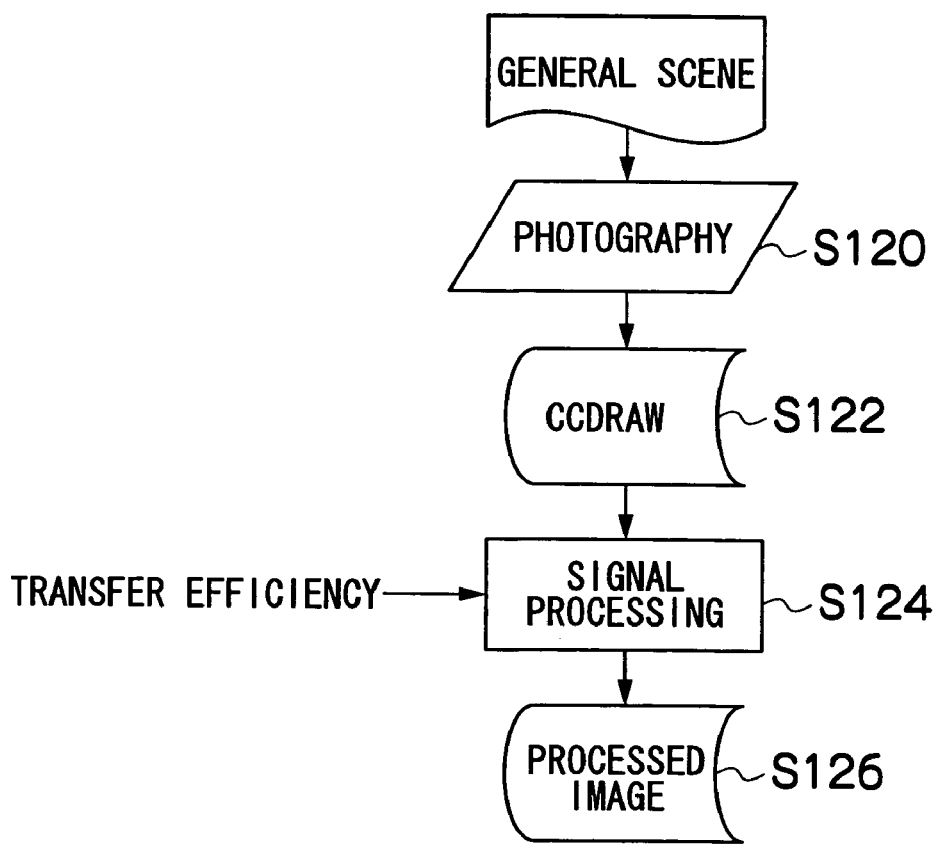
FIG. 39 is a diagram showing a processing flow of signal processing performed on photographed images according to transfer efficiencies.

FIG. 39 is a diagram showing a processing flow of signal processing performed on photographed images according to transfer efficiencies.

As shown in FIG. 39, a subject in an ordinary scene is photographed (step S120), and R, G and B CCD-RAW data are acquired from the CCD 24 (step S122).

When the digital signal processing section 30 performs various signal processing as described in FIG. 3, the digital signal processing section 30 reads out the transfer efficiency stored in the memory, and performs signal processing according to the transfer efficiency (step S124). In other words, the linear matrix circuit 30B of the digital signal processing section 30 changes the color correction matrix coefficient according to the transfer efficiency as shown in FIGS. 5A and 5B, and performs signal processing using the changed color correction matrix coefficient.

This enables output of processed images in which image quality deterioration such as in color reproducibility or resolution and the like are suppressed even when the transfer efficiency is reduced (step S126).

Incidentally, while the present embodiment is arranged so that the color correction matrix coefficient of the linear matrix circuit 30B is changed according to transfer efficiency, the present embodiment is not limited to this arrangement, and the 2 row×2 column color correction matrix coefficient of the color difference matrix circuit 30H or the color correction matrix coefficients of both matrix circuits may be changed instead.

Eighteenth Embodiment

Figure 40:
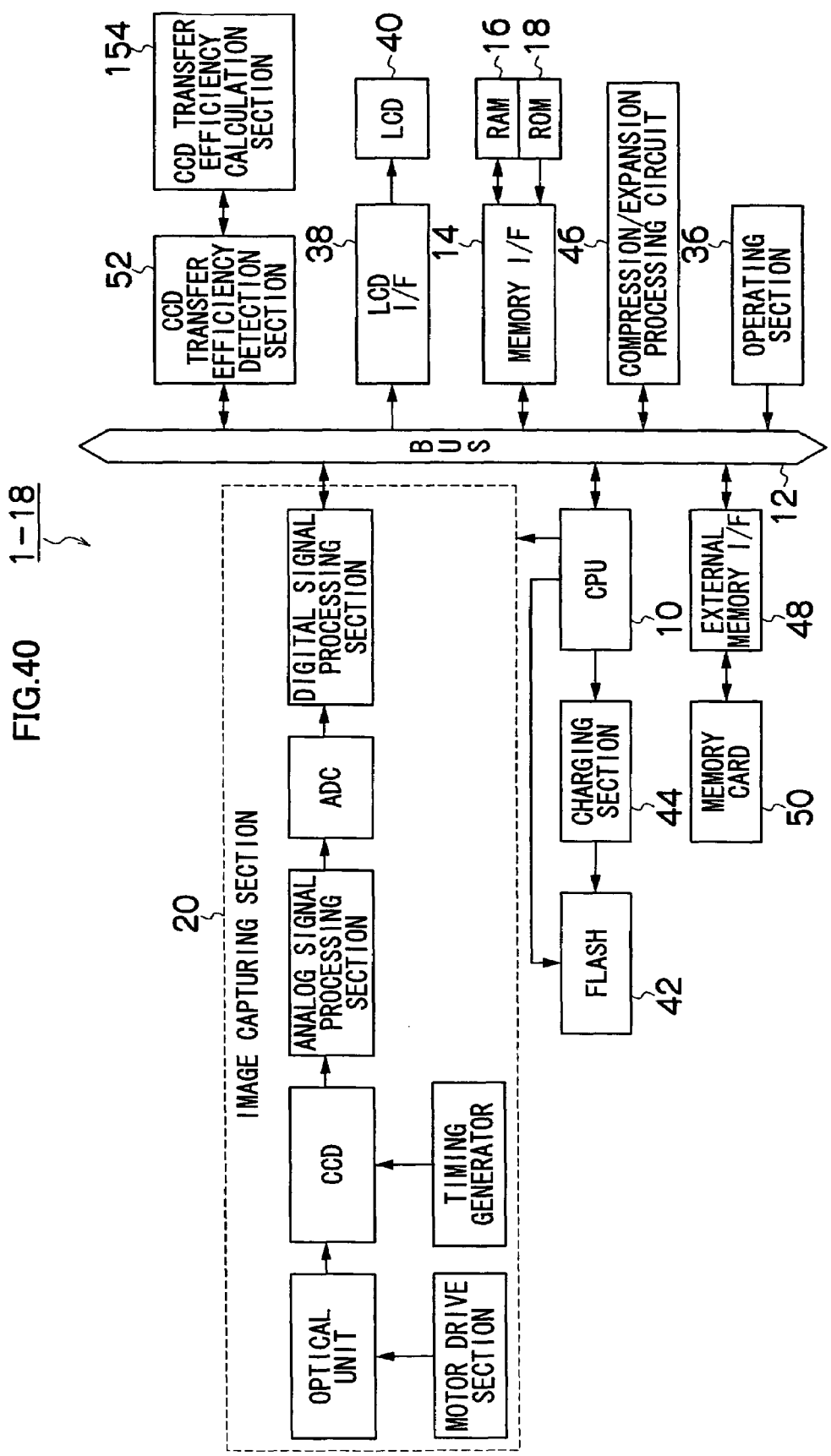
FIG. 40 is a block diagram showing an eighteenth embodiment of an image capturing apparatus according to the present invention.

FIG. 40 is a block diagram showing an eighteenth embodiment of an image capturing apparatus according to the present invention. Incidentally, like portions to the first embodiment shown in FIG. 1 are assigned like reference characters, and detailed descriptions thereof will be omitted.

A camera 1-18 of the eighteenth embodiment shown in FIG. 40 differs from the camera 1-1 of the first embodiment in that the camera 1-18 further comprises a CCD transfer efficiency calculation section 154, and a mode selection device (not shown) for selecting a transfer efficiency calculation mode.

Incidentally, the mode dial for selecting a photography mode may be arranged to function as a device for selecting a transfer efficiency calculation mode, or selection of a transfer efficiency calculation mode may be arranged to be performed on the menu screen.

When a transfer efficiency calculation mode is selected by the mode selection device, the camera 1-18 performs processing operations for calculating transfer efficiency.

In other words, when a subject (for instance, a monochromatic chart) is photographed by the camera 1-18 when a transfer efficiency calculation mode is selected, the CCD transfer efficiency calculation section 154 calculates transfer efficiency based on CCD-RAW data of the pixels in an effective pixel region and CCD-RAW data of the pixels in an optical black (OB) region of the CCD 24 acquired during photography.

Figure 41:
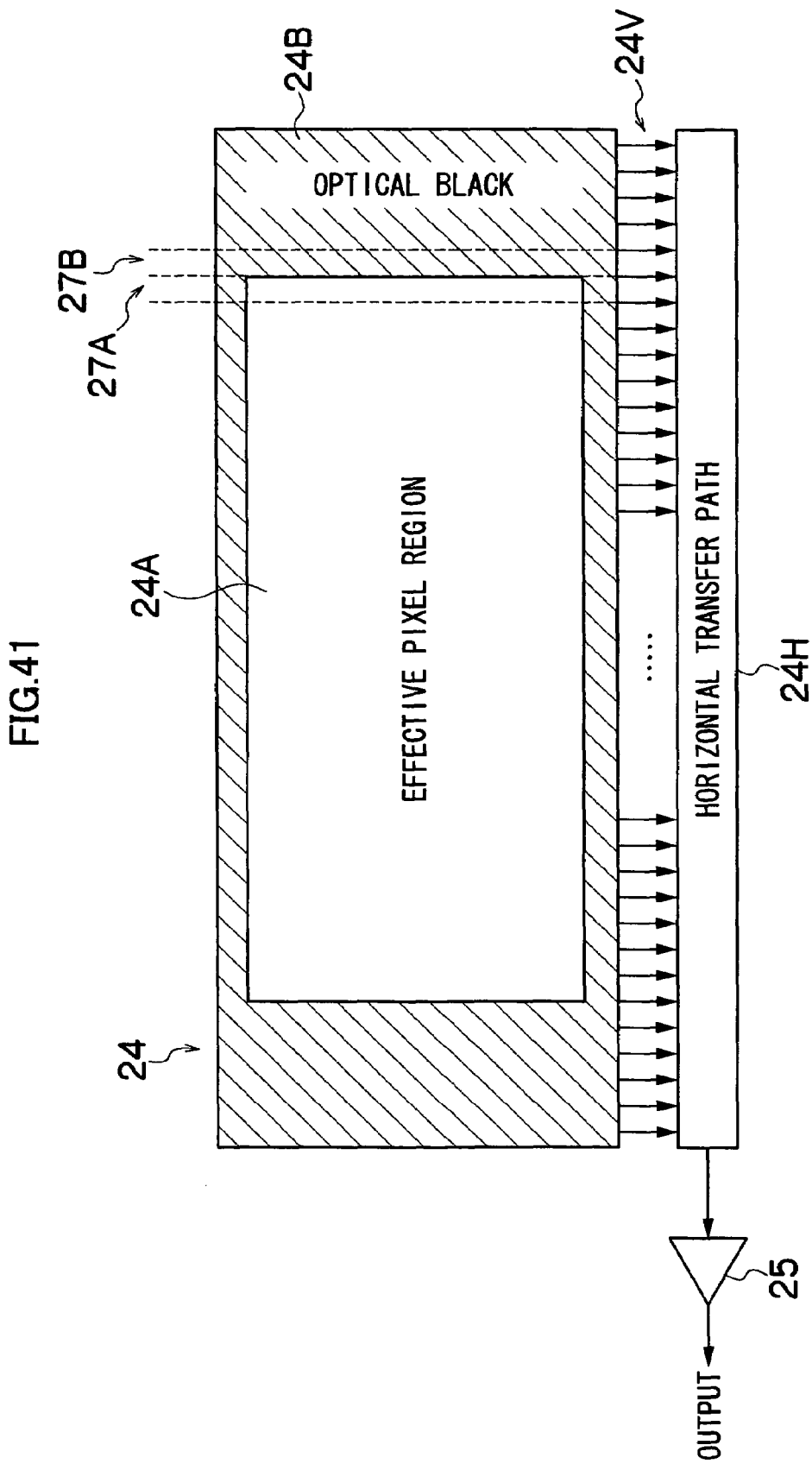
FIG. 41 is a pattern diagram showing a transfer path of charges in a CCD.

FIG. 41 is a pattern diagram showing a transfer path of charges in the CCD 24. Light incident via the optical unit 22 forms an image on a light-receiving surface of the CCD 24. As shown in FIG. 41, the light-receiving surface of the CCD 24 is separated into an effective pixel region 24A used for loading images, and an light-shielded OB region 24B around the effective pixel region 24A, which is not used for loading images.

Charges accumulated in each pixel of the CCD 24 during transfer efficiency calculation mode are horizontally transferred through the horizontal transfer path 24H after a single-pixel's worth of charges in a vertical direction are vertically transferred through the vertical transfer path 24V. Read out of the charges in all the pixels of the CCD 24 concludes after repeating this procedure for all the pixels in the vertical direction.

The CCD transfer efficiency calculation section 154 acquires CCD-RAW data of each single pixel on either side (in a horizontal direction) of a boundary region of the effective pixel region 24A and the OB region 24B (the single pixels 27A on the effective pixel region-side and 27B on the OB region-side). The CCD-RAW data of the single pixel 27B on the OB region-side corresponds to the transfer remainder amount of the CCD-RAW data of the single pixel 27A on the effective pixel region-side.

Therefore, the CCD transfer efficiency calculation section 154 calculates transfer efficiency by substituting S0 with the CCD-RAW data of the single pixel 27A on the effective pixel region-side, and substituting f(S0) with the CCD-RAW data of the single pixel 27B on the OB region-side in equation 1. By using an average value of CCD-RAW data of a plurality of pixels in vertical directions of each single pixel, an accurate transfer efficiency not significantly affected by noise or the like may be calculated.

The CCD transfer efficiency detection section 52 acquires the transfer efficiency calculated by the CCD transfer efficiency calculation section 154 during transfer efficiency calculation mode from the CCD transfer efficiency calculation section 154.

Subsequently, when performing actual photography of a general scene by switching from the transfer efficiency calculation mode to a regular photography mode, the digital signal processing section 30 acquires transfer efficiency from the CCD transfer efficiency detection section 52 as shown in FIG. 39, and performs signal processing according to the transfer efficiency.

First Embodiment of a Transfer Efficiency Calculation Method

Figure 42:
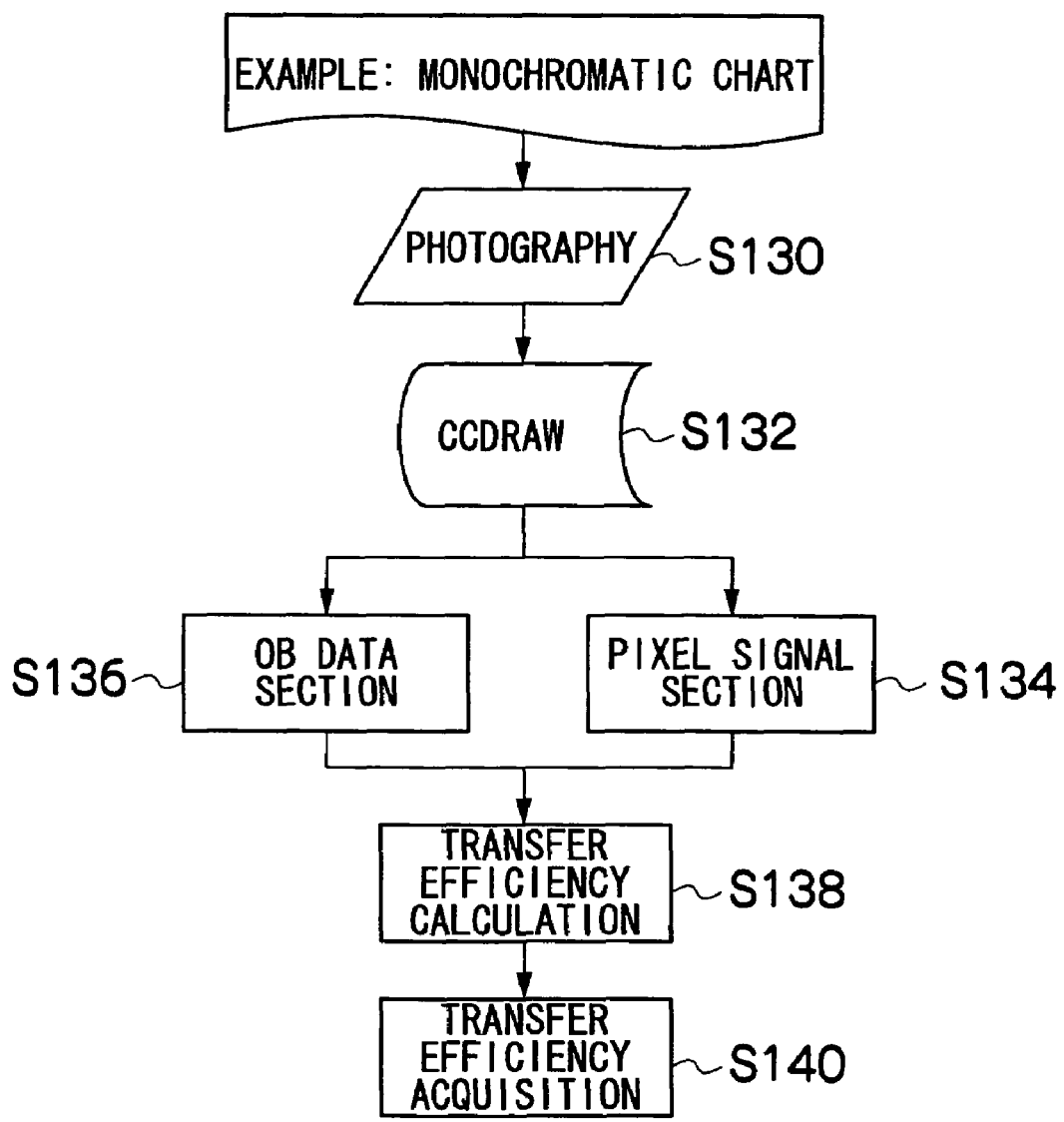
FIG. 42 is a flowchart showing a first embodiment of a transfer efficiency calculation method in an image capturing apparatus according to the present invention.

FIG. 42 is a flowchart showing a first embodiment of a transfer efficiency calculation method in the camera 1-18.

As described earlier, when a transfer efficiency calculation mode is selected by the mode selection device, the processing described below for calculating transfer efficiency is initiated.

In other words, for instance, a monochromatic chart is photographed under transfer efficiency calculation mode (step S130), and CCD-RAW data of all pixels is acquired from the CCD 24 (step S132). Among the CCD-RAW data of all pixels, as described in FIG. 41, the CCD transfer efficiency calculation section 154 respectively loads the CCD-RAW data of the single pixel 27A on the effective pixel region-side and the CCD-RAW data of the single pixel 27B on the OB region-side (steps S134 and S136), and calculates transfer efficiency based on these CCD-RAW data.

The calculated transfer efficiency is acquired via the CCD transfer efficiency detection section 52 to be used for signal processing during actual photography (step S140).

Nineteenth Embodiment

Figure 43:
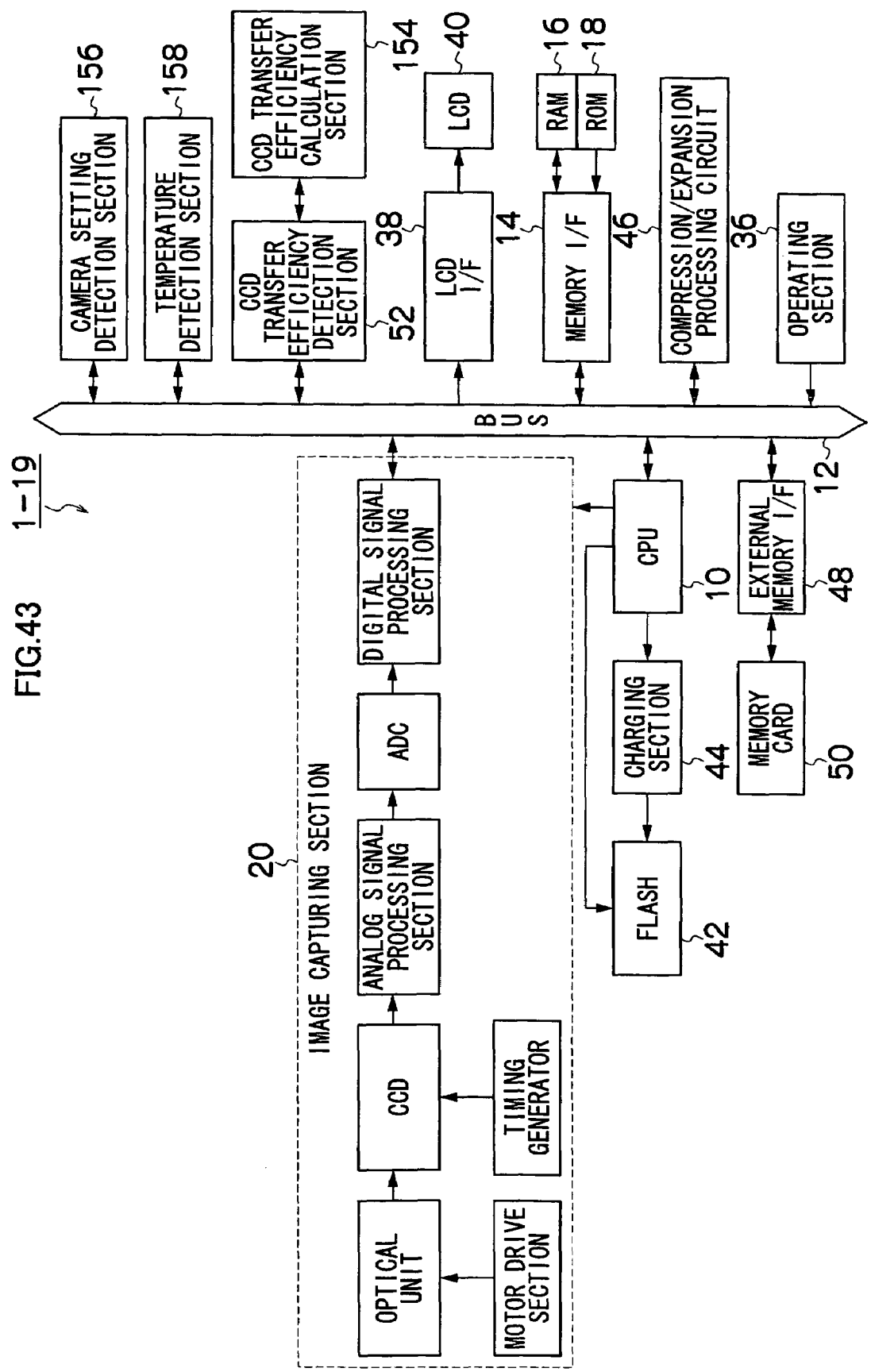
FIG. 43 is a block diagram showing a nineteenth embodiment of an image capturing apparatus according to the present invention.

FIG. 43 is a block diagram showing a nineteenth embodiment of an image capturing apparatus according to the present invention. Incidentally, like portions to the eighteenth embodiment shown in FIG. 40 are assigned like reference characters, and detailed descriptions thereof will be omitted.

A camera 1-19 of the nineteenth embodiment shown in FIG. 43 differs from the camera 1-18 of the eighteenth embodiment in that the camera 1-19 further comprises a camera setting detection section 156 and a temperature detection section 158.

The camera setting detection section 156 detects, for instance, camera sensitivity, CCD drive frequency, WB gain and the like, while the temperature detection section 158 detects the temperature of the CCD 24. Incidentally, when the temperature of the CCD 24 cannot be detected directly, the temperature detection section 158 may be arranged to detect an internal temperature of the camera chassis as a temperature corresponding to the temperature of the CCD 24.

As is apparent from the graph shown in FIG. 4, transfer efficiency is reduced when the signal quantity S0 to be transferred is small. Transfer efficiency is also reduced when the CCD drive frequency is high or when the CCD temperature is low.

Therefore, since the signal amount transferred by the CCD 24 is reduced when the camera sensitivity is high compared to cases where the camera sensitivity is low, transfer efficiency is reduced. Similarly, in images photographed under light sources such as tungsten lamps, the WB gain to the B signal becomes significantly larger than the WB gain to the R signal, resulting in reduced transfer efficiency.

When the photography setting conditions acquired from the camera setting detection section 156 and the temperature detection section 158 has been changed from the conditions during the previous transfer efficiency calculation, the CCD transfer efficiency calculation section 154 of the camera 1-19 calculates transfer efficiency. The transfer efficiency calculation method used in this case will be described later.

The CCD transfer efficiency detection section 52 acquires transfer efficiency calculated by the CCD transfer efficiency calculation section 154 when the photography setting conditions are changed from the CCD transfer efficiency calculation section 154. The digital signal processing section 30 acquires the transfer efficiency from the CCD transfer efficiency detection section 52, and performs signal processing according to the transfer efficiency.

Second Embodiment of a Transfer Efficiency Calculation Method

Figure 44:
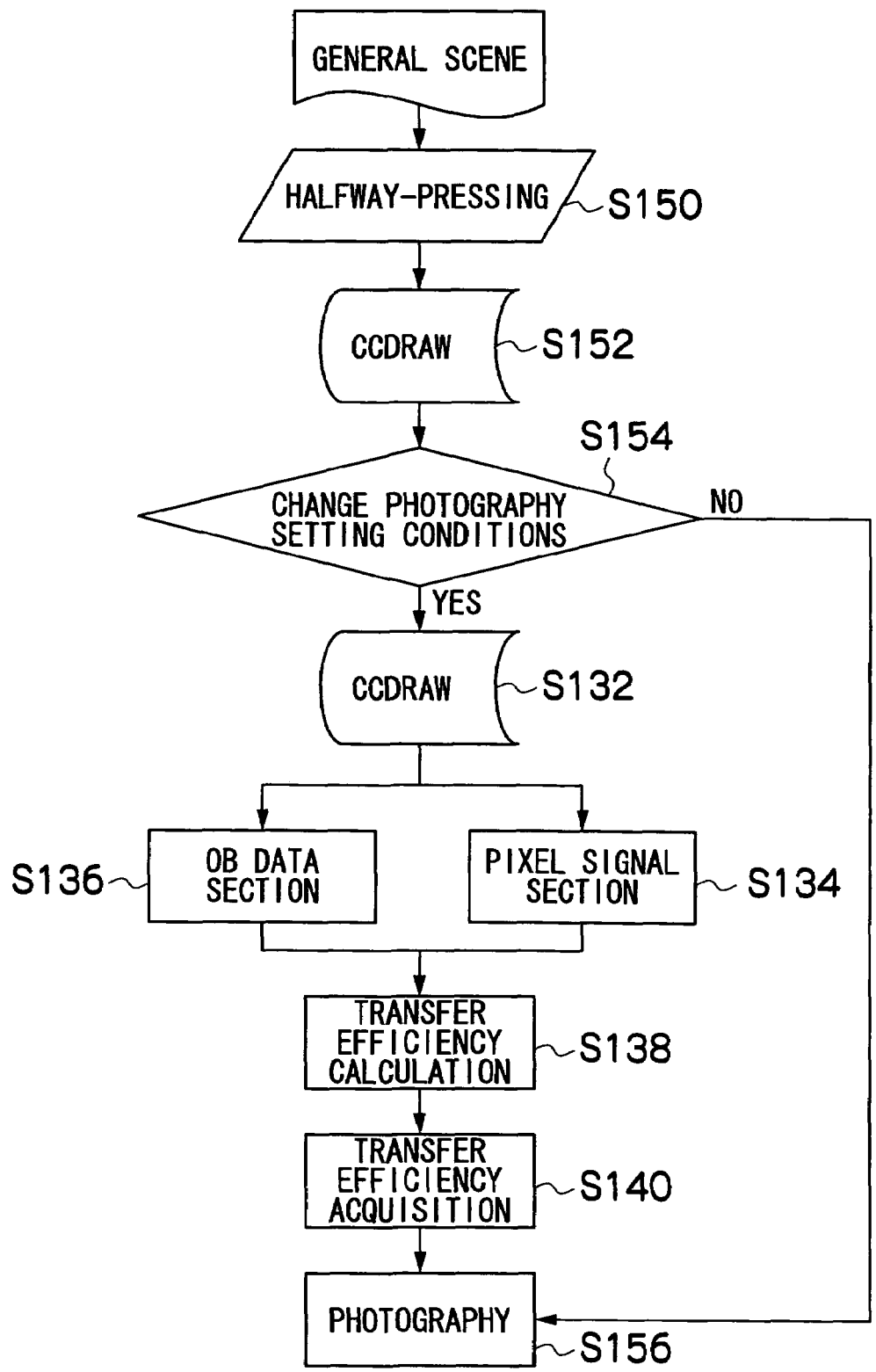
FIG. 44 is a flowchart showing a second embodiment of a transfer efficiency calculation method in an image capturing apparatus according to the present invention.

FIG. 44 is a flowchart showing a second embodiment of a transfer efficiency calculation method in the camera 1-19. Incidentally, like portions to the flowchart shown in FIG. 42 are assigned like step numerals, and detailed descriptions thereof will be omitted.

The shutter button of the operating section 36 is composed of a two-stage stroke-type switch comprising so-called "halfway-pressing" and "fully-pressing". Halfway-pressing activates AE (automatic exposure) and AF (automatic focusing), while fully-pressing executes actual photography and recording of images.

In FIG. 44, when the shutter button is halfway-pressed (step S150), CCD-RAW data is acquired from the CCD 24 for AE and AF (step S152). Next, determination is performed on whether photography setting conditions acquired from the camera setting detection section 156 and the temperature detection section 158 has been changed (step S154). Incidentally, when the camera sensitivity is set in advance through manual operation, changes to the camera sensitivity and the like may be determined based on the preset contents. Otherwise, changes to the camera sensitivity and the like may be determined based on a camera sensitivity automatically set during actual photography based on CCD-RAW data acquired in step S152.

When it has been determined that the photography setting conditions have been changed, transfer efficiency is calculated in the steps S132 to S140 as described in FIG. 42, followed by a transition to actual photography caused by fully-pressing the shutter button (step S156).

On the other hand, when it has been determined that the photography setting conditions have not been changed, since the previously calculated transfer efficiency may be used, the steps S132 to S140 are skipped, and a transition is made to step S156.

As seen, when there are changes in the photography setting conditions, which in turn cause changes in transfer efficiency, transfer efficiency is newly calculated prior to actual photography.

Twentieth Embodiment

Figure 45:
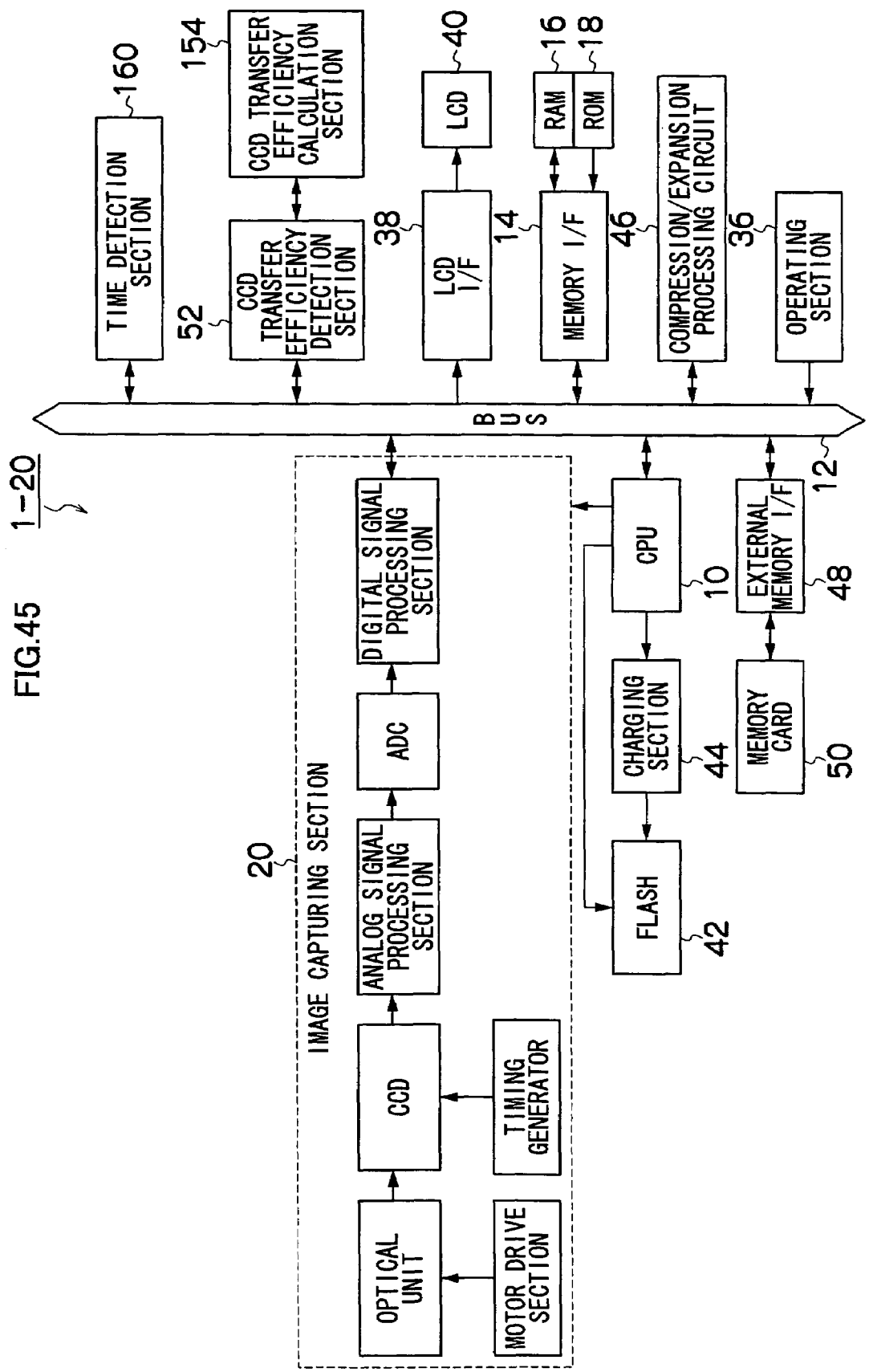
FIG. 45 is a block diagram showing a twentieth embodiment of an image capturing apparatus according to the present invention.

FIG. 45 is a block diagram showing a twentieth embodiment of an image capturing apparatus according to the present invention. Incidentally, like portions to the eighteenth embodiment shown in FIG. 40 are assigned like reference characters, and detailed descriptions thereof will be omitted.

A camera 1-20 of the twentieth embodiment shown in FIG. 45 differs from the camera 1-18 of the eighteenth embodiment in that the camera 1-20 further comprises a time detection section 160.

The time detection section 160 detects the elapsed time from the moment the last transfer efficiency was calculated. The temperature of the CCD 24 fluctuates with the lapse of time, and transfer efficiency fluctuates accordingly.

When the elapsed time acquired from the time detection section 160 reaches or exceeds a predetermined threshold X (a predetermined time during which transfer efficiency fluctuates with the lapse of time), the CCD transfer efficiency calculation section 154 of the camera 1-20 calculates the transfer efficiency. The transfer efficiency calculation method used in this case will be described later.

The CCD transfer efficiency detection section 52 acquires transfer efficiency calculated by the CCD transfer efficiency calculation section 154 for each lapse of a predetermined time from the CCD transfer efficiency calculation section 154. The digital signal processing section 30 acquires the transfer efficiency from the CCD transfer efficiency detection section 52, and performs signal processing according to the transfer efficiency.

Third Embodiment of a Transfer Efficiency Calculation Method

Figure 46:
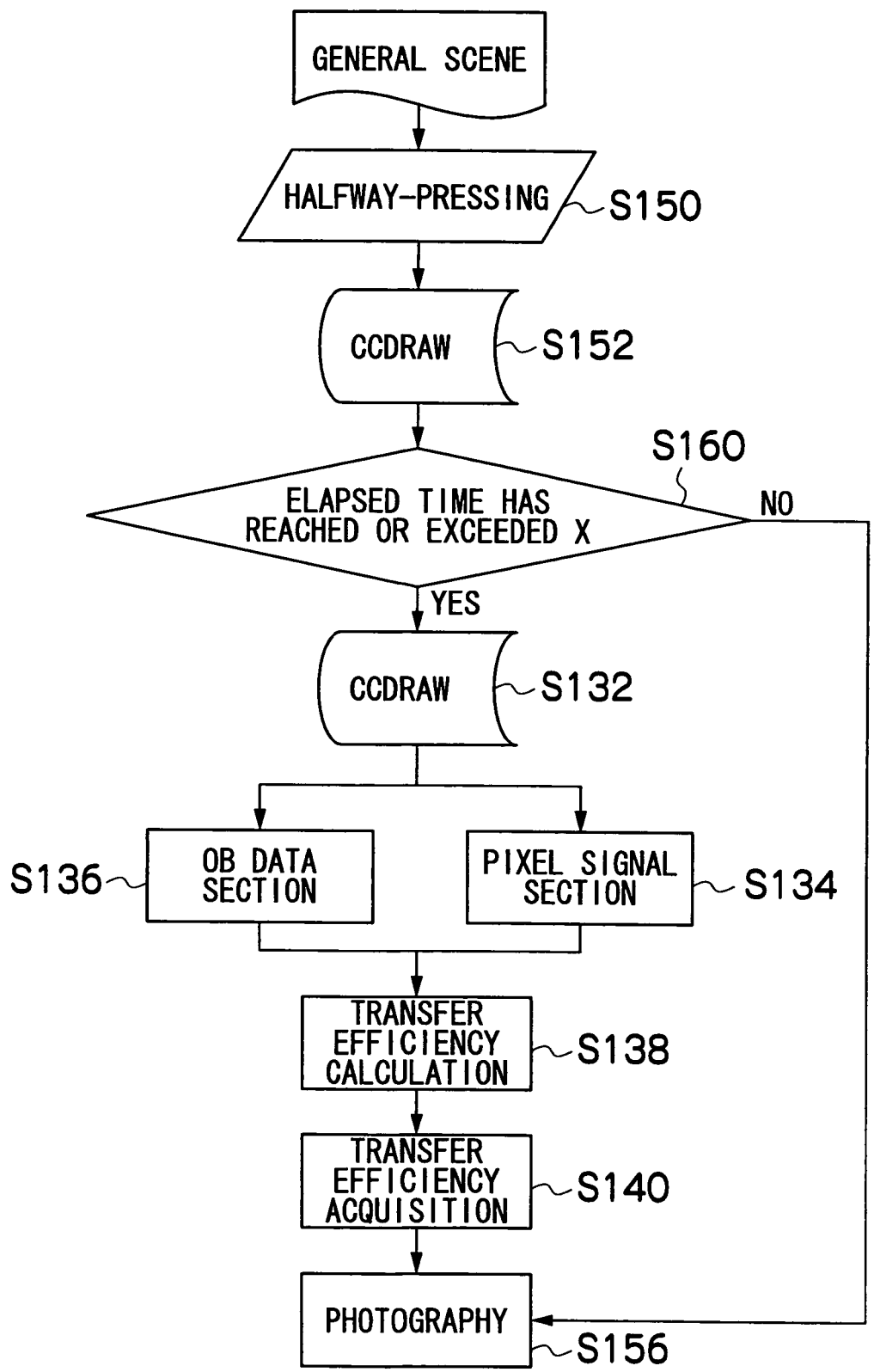
FIG. 46 is a flowchart showing a third embodiment of a transfer efficiency calculation method in an image capturing apparatus according to the present invention.

FIG. 46 is a flowchart showing a third embodiment of a transfer efficiency calculation method in the camera 1-20. Incidentally, like portions to the flowchart shown in FIG. 44 are assigned like step numerals, and detailed descriptions thereof will be omitted.

In FIG. 46, when the shutter button is halfway-pressed and CCD-RAW data is acquired from the CCD 24 for AE and AF (step S150 and S152), the elapsed time from the moment the last transfer efficiency calculation is read in from the time detection section 160 to determine whether the elapsed time has reached or exceeded a threshold X (step S160).

When it has been determined that the elapsed time has reached or exceeded the threshold X, transfer efficiency is calculated in the steps S132 to S140 as described in FIG. 42, followed by a transition to actual photography caused by fully-pressing the shutter button (step S156).

On the other hand, when it has been determined that elapsed time has not exceeded the threshold X, since the previously calculated transfer efficiency may be used, the steps S132 to S140 are skipped, and a transition is made to step S156.

As seen, when elapsed time, which may cause changes in transfer efficiency, reaches or exceeds a threshold X, transfer efficiency is newly calculated prior to actual photography.

Twenty-First Embodiment

Figure 47:
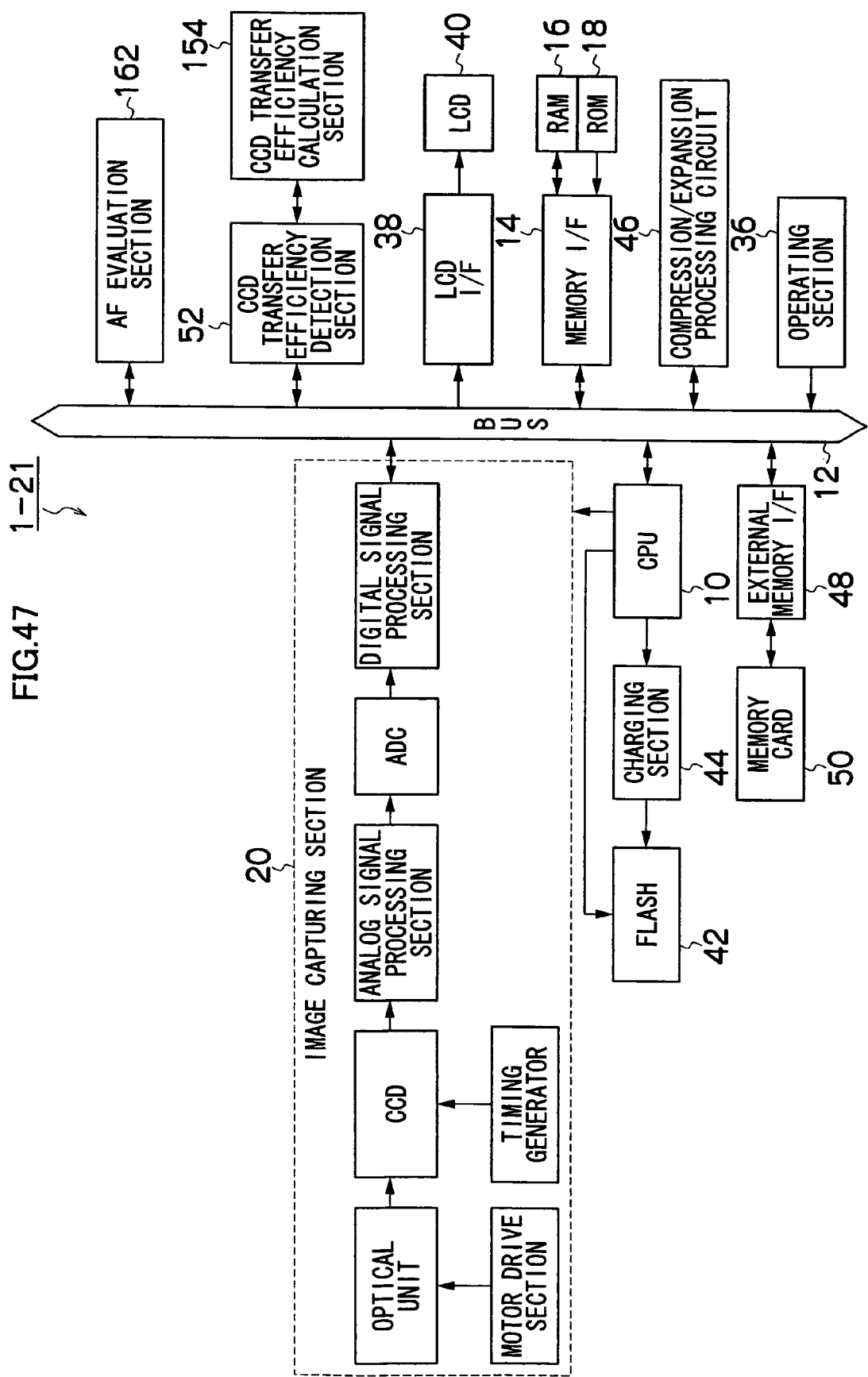
FIG. 47 is a block diagram showing a twenty-first embodiment of an image capturing apparatus according to the present invention.

FIG. 47 is a block diagram showing a twenty-first embodiment of an image capturing apparatus according to the present invention. Incidentally, like portions to the eighteenth embodiment shown in FIG. 40 are assigned like reference characters, and detailed descriptions thereof will be omitted.

A camera 1-21 of the twenty-first embodiment shown in FIG. 47 differs from the camera 1-18 of the eighteenth embodiment in that the camera 1-21 further comprises an AF evaluation section 162.

The camera 1-21 comprises an AF apparatus, and the AF evaluation section 162 calculates an AF evaluation value included in the AF apparatus.

The AF apparatus used in camera 1-21 will now be described.

The AF apparatus is an apparatus which automatically adjusts the lens position of a focus lens so that the contrast of a subject becomes maximum (contrast AF), and initiates contrast AF when the shutter button is halfway-pressed.

Figure 48:
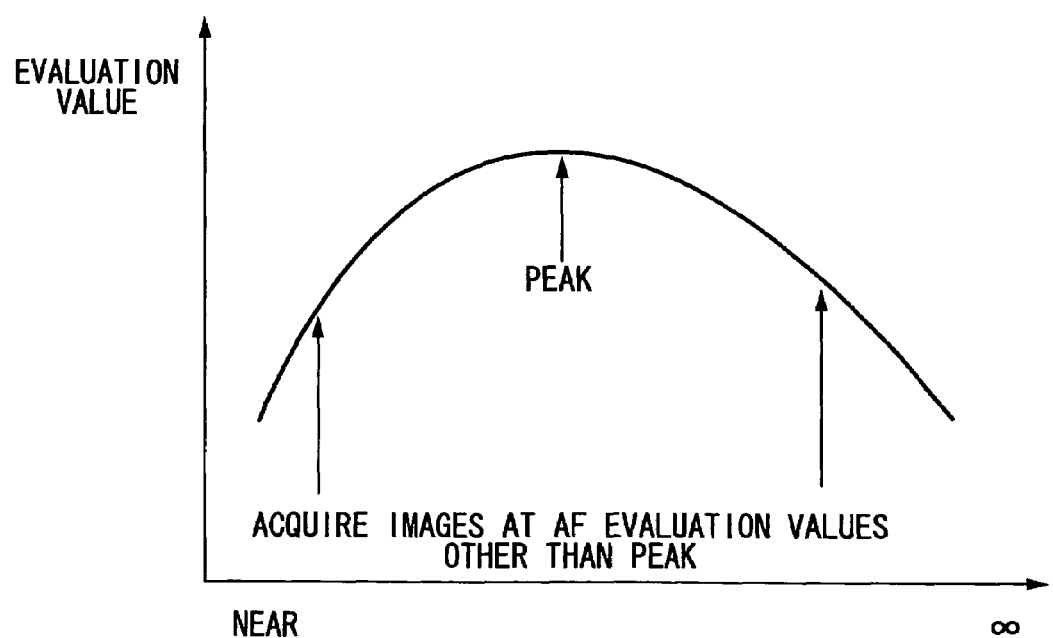
FIG. 48 is a graph showing an example of AF evaluation characteristics of an AF evaluation value at an AF search position.

In other words, AF search is performed when the shutter button is halfway-pressed. As shown in FIG. 48, an AF search sequentially moves the focus lens across a focus adjustment range which ranges from near to infinity, and calculates an evaluation value every time the focus lens moves a predetermined amount.

The AF evaluation section 162 loads G signals from an AF area (for instance, a central region) of the CCD 24, extracts high frequency components from the G signal via a high pass filter (HPF), and calculates an evaluation value by integrating the high frequency components.

Based on evaluation values loaded during AF search, the CPU 10 calculates a lens position of the focus lens where the evaluation value is at its peak (maximum), and performs automatic focus adjustment by moving the focus lens to this lens position (focusing operation).

The CCD transfer efficiency calculation section 154 of the camera 1-21 calculates transfer efficiency during the AF search. The transfer efficiency calculation method used in this case will be described later.

The CCD transfer efficiency detection section 52 acquires transfer efficiency calculated by the CCD transfer efficiency calculation section 154 during AF search from the CCD transfer efficiency calculation section 154. The digital signal processing section 30 acquires the transfer efficiency from the CCD transfer efficiency detection section 52, and performs signal processing according to the transfer efficiency.

Fourth Embodiment of a Transfer Efficiency Calculation Method

Figure 49:
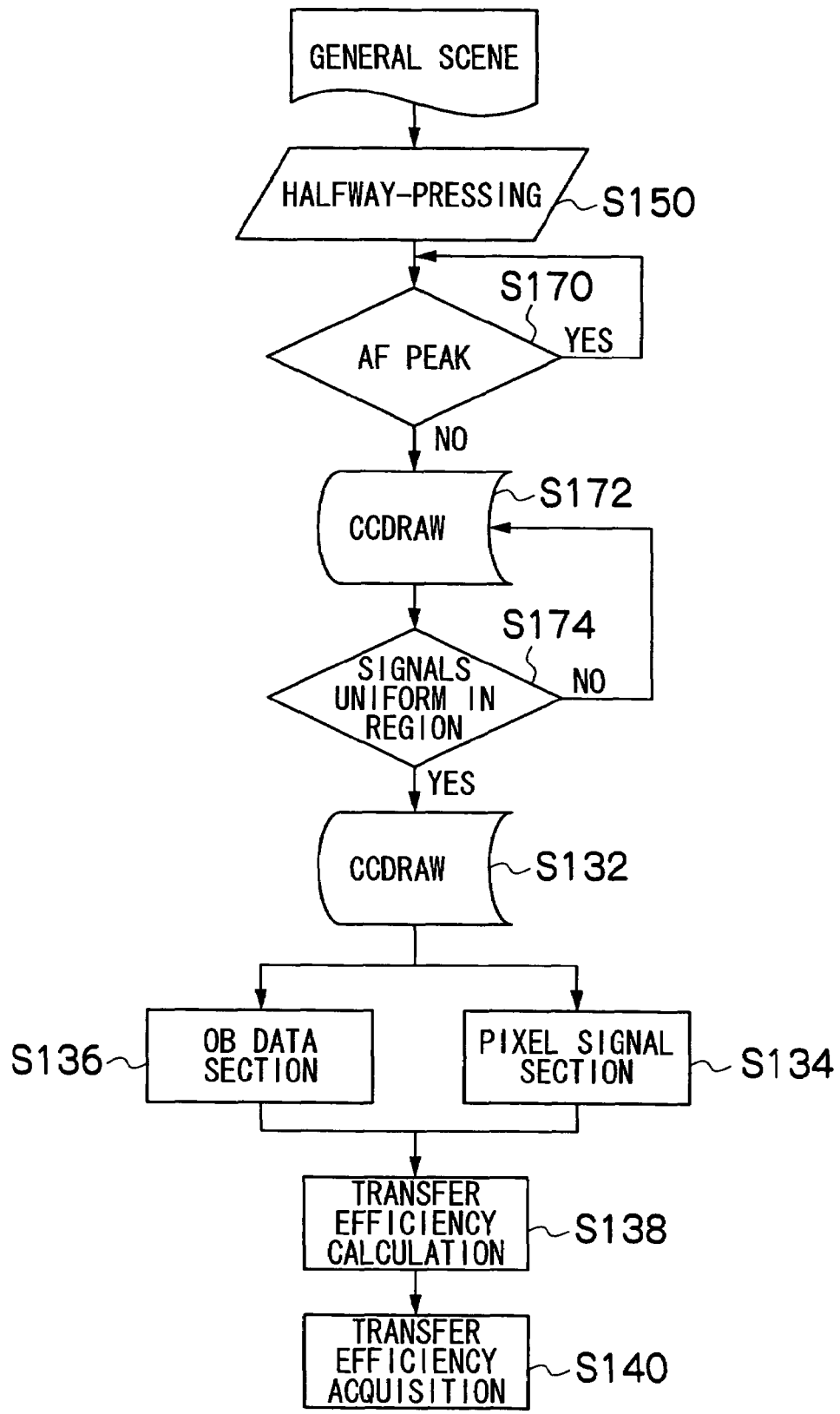
FIG. 49 is a flowchart showing a fourth embodiment of a transfer efficiency calculation method in an image capturing apparatus according to the present invention.

FIG. 49 is a flowchart showing a fourth embodiment of a transfer efficiency calculation method in the camera 1-21. Incidentally, like portions to the flowchart shown in FIG. 46 are assigned like step numerals, and detailed descriptions thereof will be omitted.

In FIG. 49, as described above, AF search is performed when the shutter button is halfway-pressed (step S150). However, when the evaluation value detected during AF search is found to be a value other then a peak value (step S170), CCD-RAW data is acquired from the CCD 24 (step S172). While CCD-RAW data is acquired from the AF area of the CCD 24 during AF search, CCD-RAW data from all the pixels of the CCD 24 is acquired in step S172.

Next, determination is performed on whether the pixel values in a vertical direction of the single pixel 27A on the effective pixel region-side of the CCD 24 shown in FIG. 41 are approximately uniform. If so, the process proceeds to step S132. In other words, when the evaluation value detected during AF search is a value other then a peak value, the image is blurred. In particular, when the evaluation value detected during AF search is significantly deviated from the peak value, as indicated by the arrow in FIG. 48, the pixel values in a vertical direction of the single pixel 27A becomes approximately uniform.

CCD-RAW data for transfer efficiency calculation is loaded only when the pixel values in a vertical direction of the single pixel 27A are approximately uniform, and calculation/acquisition of transfer efficiency is performed (steps S132 to S140).

Incidentally, while the present embodiment was arranged to change a color correction matrix coefficient of the linear matrix circuit 30C and/or the color difference matrix circuit 30H according to transfer efficiency, correction is not limited to this arrangement. Alternatively, various processing such as processing for changing the frequency band of the low pass filter (LPF) or processing for changing contour enhancement by the contour correction circuit 30G may be performed instead of, or in combination with the correction.

What is claimed is:

1. A signal processing method for an image capturing apparatus, the signal processing method comprising:
    an image signal acquisition step for acquiring image signals from an image capturing element;
    an information acquisition step for acquiring one or more pieces of information among:
    transfer efficiency of the image capturing element, sensitivity of a camera upon photography, a drive frequency of the image capturing element, a WB parameter related to white balance correction of the acquired image signal, a number of pixels of the acquired image signal, an interior temperature of the camera or the temperature of the image capturing element upon photography, a CCD color filter array of the image capturing element; wherein the information acquisition step acquires at least the transfer efficiency; and
    a signal processing step for performing signal processing on the acquired image signals, the signal processing step which includes a processing for performing a matrix processing of the acquired image signals and a matrix coefficient to perform color correction, and changes the matrix coefficient of the matrix processing according to one or more pieces of acquired information among the transfer efficiency, the camera sensitivity, the drive frequency, the WB parameter, the number of pixels, the temperature and the CCD color filter array to suppress deterioration of image quality due to degradation of the transfer efficiency.

2. An image capturing apparatus comprising:
    a photographic optical system;
    an image capturing element onto which a subject image is formed by the photographic optical system;
    an image acquisition device which acquires image signals from the image capturing element;
    an information acquisition device which acquires one or more pieces of information among: transfer efficiency of the image capturing element, sensitivity of a camera upon photography, a drive frequency of the image capturing element, a WB parameter related to white balance correction of the acquired image signal, a number of pixels of the acquired image signal, an interior temperature of the camera or the temperature of the image capturing element upon photography, a CCD color filter array of the image capturing element; wherein the information acquisition device acquires at least the transfer efficiency; and
    a signal processing device which performs signal processing on the acquired image signals, the signal processing device which comprises a matrix circuit which performs color correction, and which changes a matrix coefficient of the matrix circuit according to one or more pieces of acquired information among the transfer efficiency, the camera sensitivity, the drive frequency, the WB parameter, the number of pixels, the temperature, and the CCD color filter array to reduce deterioration of image quality due to degradation of the transfer efficiency.

3. The image capturing apparatus according to claim 2, wherein the image acquisition device comprises a storage device which stores transfer efficiencies measured in advance, and a readout device which reads out the transfer efficiencies from the storage device.

4. The image capturing apparatus according to claim 2, wherein the matrix circuit is at least one of a linear matrix circuit and a color difference matrix circuit.

5. A signal processing method for an image capturing apparatus, the signal processing method comprising:
    an acquisition step for acquiring an image signal from an image capturing element;
    a transfer efficiency calculation step for calculating transfer efficiency of the image capturing element based on at least signals of pixels in an effective pixel region of the image capturing element; and
    a processing step for processing the acquired image signal based on the calculated transfer efficiency,
    wherein the transfer efficiency calculation step performs calculations based on signals of pixels in an effective pixel region and signals of pixels in an optical black region of the image capturing element.

6. A signal processing method for an image capturing apparatus, the signal processing method comprising:
    an acquisition step for acquiring an image signal from an image capturing element;
    a transfer efficiency calculation step for calculating transfer efficiency of the image capturing element based on at least signals of pixels in an effective pixel region of the image capturing element; and
    a processing step for processing the acquired image signal based on the calculated transfer efficiency, wherein the transfer efficiency calculation step performs calculations based on signals of each single pixel on either side (in a horizontal direction) of a vertical boundary of the effective pixel region and an optical black region of the image capturing element, or on signals of a plurality of pixels in vertical directions of each single pixel on either side of the vertical boundary of the image capturing element.

7. A signal processing method for an image capturing apparatus, the signal processing method comprising:
an acquisition step for acquiring an image signal from an image capturing element;
a transfer efficiency calculation step for calculating transfer efficiency of the image capturing element based on at least signals of pixels in an effective pixel region of the image capturing element;
a processing step for processing the acquired image signal based on the calculated transfer efficiency; and
a detection step for detecting changes in photography setting conditions related to transfer efficiency,
wherein when a change in the photography setting conditions is detected, the transfer efficiency calculation step acquires image signals from the image capturing element and calculates transfer efficiency based on the acquired image signals before commencement of actual photography.

8. A signal processing method for an image capturing apparatus, the signal processing method comprising:
an acquisition step for acquiring an image signal from an image capturing element;
a transfer efficiency calculation step for calculating transfer efficiency of the image capturing element based on at least signals of pixels in an effective pixel region of the image capturing element;
a processing step for processing the acquired image signal based on the calculated transfer efficiency; and
a measurement step for measuring elapsed time,
wherein when the measured elapsed time exceeds a predetermined threshold, the transfer efficiency calculation step acquires image signals from the image capturing element and calculates transfer efficiency based on the acquired image signals before commencement of actual photography.

9. A signal processing method for an image capturing apparatus, the signal processing method comprising:
an acquisition step for acquiring an image signal from an image capturing element;
a transfer efficiency calculation step for calculating transfer efficiency of the image capturing element based on at least signals of pixels in an effective pixel region of the image capturing element;
a processing step for processing the acquired image signal based on the calculated transfer efficiency; and
an automatic focus adjustment step which performs automatic focus adjustment prior to actual photography based on image signals from the image capturing element,
wherein the transfer efficiency calculation step calculates transfer efficiency based on the image signals acquired from the image capturing element prior to conclusion of the focus adjustment in performing automatic focus adjustment.

10. An image capturing apparatus comprising:
a photographic optical system;
an image capturing element onto which a subject image is formed by the photographic optical system;
an image acquisition device which acquires image signals from the image capturing element;
a transfer efficiency calculation device which calculates transfer efficiency of the image capturing element based on at least signals of pixels in an effective pixel region of the image capturing element;
a transfer efficiency acquisition device which acquires transfer efficiency of the image capturing element from the transfer efficiency calculation device; and
a signal processing device which performs signal processing on the acquired image signals based on the transfer efficiency acquired by the transfer efficiency acquisition device,
wherein the transfer efficiency calculation step performs calculations based on signals of pixels in an effective pixel region and signals of pixels in an optical black region of the image capturing element.

11. An image capturing apparatus comprising:
a photographic optical system;
an image capturing element onto which a subject image is formed by the photographic optical system;
an image acquisition device which acquires image signals from the image capturing element;
a transfer efficiency calculation device which calculates transfer efficiency of the image capturing element based on at least signals of pixels in an effective pixel region of the image capturing element;
a transfer efficiency acquisition device which acquires transfer efficiency of the image capturing element from the transfer efficiency calculation device; and
a signal processing device which performs signal processing on the acquired image signals based on the transfer efficiency acquired by the transfer efficiency acquisition device,
wherein the transfer efficiency calculation device performs measurements based on signals of each single pixel on either side (in a horizontal direction) of a vertical boundary of the effective pixel region and an optical black region of the image capturing element, or on signals of a plurality of pixels in vertical directions of each single pixel on either side of the vertical boundary of the image capturing element.

12. An image capturing apparatus comprising;
a photographic optical system;
an image capturing element onto which a subject image is formed by the photographic optical system;
an image acquisition device which acquires image signals from the image capturing element;
a transfer efficiency calculation device which calculates transfer efficiency of the image capturing element based on at least signals of pixels in an effective pixel region of the image capturing element;
a transfer efficiency acquisition device which acquires transfer efficiency of the image capturing element from the transfer efficiency calculation device;
a signal processing device which performs signal processing on the acquired image signals based on the transfer efficiency acquired by the transfer efficiency acquisition device; and
a detection device which detects changes in photography setting conditions related to transfer efficiency,
wherein when a change in the photography setting conditions is detected by the detection device, the transfer efficiency calculation device acquires image signals from the image capturing element and calculates transfer efficiency based on the acquired image signals before commencement of actual photography.

13. The image capturing apparatus comprising:
a photographic optical system;
an image capturing element onto which a subject image is formed by the photographic optical system;
an image acquisition device which acquires image signals from the image capturing element;
a transfer efficiency calculation device which calculates transfer efficiency of the image capturing element based on at least signals of pixels in an effective pixel region of the image capturing element;
a transfer efficiency acquisition device which acquires transfer efficiency of the image capturing element from the transfer efficiency calculation device;
a signal processing device which performs signal processing on the acquired image signals based on the transfer efficiency acquired by the transfer efficiency acquisition device; and
a measurement device which measures elapsed time,
wherein when the measured elapsed time exceeds a predetermined threshold, the transfer efficiency calculation device acquires image signals from the image capturing element and calculates transfer efficiency based on the acquired image signals before commencement of actual photography.

14. The image capturing apparatus comprising:
a photographic optical system;
an image capturing element onto which a subject image is formed by the photographic optical system;
an image acquisition device which acquires image signals from the image capturing element;
a transfer efficiency calculation device which calculates transfer efficiency of the image capturing element based on at least signals of pixels in an effective pixel region of the image capturing element;
a transfer efficiency acquisition device which acquires transfer efficiency of the image capturing element from the transfer efficiency calculation device;
a signal processing device which performs signal processing on the acquired image signals based on the transfer efficiency acquired by the transfer efficiency acquisition device; and
an automatic focus adjustment device which performs automatic focus adjustment prior to actual photography based on image signals from the image capturing element,
wherein the transfer efficiency calculation device calculates transfer efficiency based on the image signals acquired from the image capturing element prior to conclusion of the focus adjustment in performing automatic focus adjustment.

15. An image capturing apparatus comprising:
a photographic optical system;
an image capturing element onto which a subject image is formed by the photographic optical system;
an image acquisition device which acquires image signals from the image capturing element;
a transfer efficiency calculation device which calculates transfer efficiency of the image capturing element based on at least signals of pixels in an effective pixel region of the image capturing element;
a transfer efficiency acquisition device which acquires transfer efficiency of the image capturing element from the transfer efficiency calculation device; and
a signal processing device which performs signal processing on the acquired image signals based on the transfer efficiency acquired by the transfer efficiency acquisition device,
wherein the signal processing device comprises a matrix circuit which performs color correction, and controls a matrix coefficient of the matrix circuit according to the transfer efficiency acquired by the transfer efficiency acquisition device.

16. The image capturing apparatus according to claim 15, wherein the matrix circuit is at least one of a linear matrix circuit and a color difference matrix circuit.

17. The image capturing apparatus according to claim 15, wherein
the storage device stores and retains the transfer efficiency calculated, in advance, based on the signals of pixels in the effective pixel region and the signals of pixels in the optical black region of the image capturing element.

* * * * *